United States Patent
Kim et al.

(10) Patent No.: US 12,456,509 B2
(45) Date of Patent: Oct. 28, 2025

(54) SEMICONDUCTOR MEMORY DEVICE AND MEMORY SYSTEM INCLUDING THE SAME

(71) Applicant: SAMSUNG ELECTRONICS CO., LTD., Suwon-si (KR)

(72) Inventors: Jongcheol Kim, Suwon-si (KR); Kiheung Kim, Suwon-si (KR); Taeyoung Oh, Suwon-si (KR); Kyungho Lee, Suwon-si (KR); Hyongryol Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 251 days.

(21) Appl. No.: 18/196,703

(22) Filed: May 12, 2023

(65) Prior Publication Data
US 2023/0420033 A1 Dec. 28, 2023

(30) Foreign Application Priority Data

Jun. 28, 2022 (KR) .................. 10-2022-0078650
Sep. 28, 2022 (KR) .................. 10-2022-0123005

(51) Int. Cl.
*G11C 11/406* (2006.01)
*G11C 11/4078* (2006.01)
(Continued)

(52) U.S. Cl.
CPC ...... *G11C 11/4078* (2013.01); *G11C 11/4087* (2013.01); *G11C 11/4094* (2013.01); *G11C 11/4096* (2013.01)

(58) Field of Classification Search
CPC ............ G11C 11/4078; G11C 11/4087; G11C 11/4094; G11C 11/4096; G11C 5/025;
(Continued)

(56) References Cited

U.S. PATENT DOCUMENTS 7,154,788 B2  12/2006  Takemura et al.
7,257,034 B2   8/2007  Takemura et al.
(Continued)

FOREIGN PATENT DOCUMENTS

JP          4322645 B2     9/2009
WO     2017/127193 A1     7/2017

OTHER PUBLICATIONS

European Extended Search Report issued Nov. 9, 2023 issued by the European Patent Office for EP Patent Application No. 23168283.2.

*Primary Examiner* — Huan Hoang
(74) *Attorney, Agent, or Firm* — Sughrue Mion, PLLC

(57) ABSTRACT

A semiconductor memory device, including a memory cell array; a row hammer management circuit configured to: count a number of accesses based on an active command, and based on a first command applied after the active command, perform an internal read-update-write operation to read the count data from the count cells of a target memory cell row, and to write updated count data in the count cells of the target memory cell row; and a column decoder configured to: access a first memory cell using a first bit-line; and store data in the first memory cell using a first voltage, or perform an internal write operation to store the count data in the first memory cell using a second voltage greater than the first voltage during an internal write time interval smaller than a reference write time interval.

20 Claims, 39 Drawing Sheets

(51) Int. Cl.
  *G11C 11/408*    (2006.01)
  *G11C 11/4094*   (2006.01)
  *G11C 11/4096*   (2006.01)

(58) Field of Classification Search
  CPC .............. G11C 11/4097; G11C 7/1063; G11C
            11/40611; G11C 11/40615; G11C
                              11/40622
  USPC ..................................... 365/185.04
  See application file for complete search history.

(56)            References Cited

U.S. PATENT DOCUMENTS

| | | |
|---|---|---|
| 7,492,644 B2 | 2/2009 | Takemura et al. |
| 7,613,038 B2 | 11/2009 | Takemura et al. |
| 9,865,316 B2 | 1/2018 | Gupta et al. |
| 10,014,069 B2 | 7/2018 | Park |
| 10,825,534 B2 | 11/2020 | Nale |
| 11,257,535 B2 | 2/2022 | Shore et al. |
| 2014/0078845 A1 | 3/2014 | Song |
| 2021/0272620 A1 | 9/2021 | Barry |
| 2022/0121398 A1 | 4/2022 | Nale et al. |
| 2022/0165347 A1 | 5/2022 | Pan |
| 2023/0186971 A1* | 6/2023 | Takahashi ......... G11C 11/40618 365/230.03 |

* cited by examiner

FIG. 23

| CMD | CS_n | CA0 | CA1 | CA2 | CA3 | CA4 | CA5 | CA6 | CA7 | CA8 | CA9 | CA10 | CA11 | CA12 | CA13 |
|---|---|---|---|---|---|---|---|---|---|---|---|---|---|---|---|
| ACT | L | L | L | R0 | R1 | R2 | R3 | BA0 | BA1 | BG0 | BG1 | BG2 | CID0 | CID1 | CID2 |
|  | H | R4 | R5 | R6 | R7 | R8 | R9 | R10 | R11 | R12 | R13 | R14 | R15 | R16 | CID3/R17 |
| WR | L | H | L | H | H | L | BL | BA0 | BA1 | BG0 | BG1 | BG2 | CID0 | CID1 | CID2 |
|  | H | V | C3 | C4 | C5 | C6 | C7 | C8 | C9 | C10 | V | H | L | V | CID3 |
| RD | L | H | L | H | H | H | BLT | BA0 | BA1 | BG0 | BG1 | BG2 | CID0 | CID1 | CID2 |
|  | H | C2 | C3 | C4 | C5 | C6 | C7 | C8 | C9 | C10 | V | H | V | V | CID3 |

FIG. 24

| CMD | CS_n | CA0 | CA1 | CA2 | CA3 | CA4 | CA5 | CA6 | CA7 | CA8 | CA9 | CA10 | CA11 | CA12 | CA13 |
|---|---|---|---|---|---|---|---|---|---|---|---|---|---|---|---|
| WRA | L | H | L | H | H | L | BL | BA0 | BA1 | BG0 | BG1 | BG2 | CID0 | CID1 | CID2 |
|  | H | V | C3 | C4 | C5 | C6 | C7 | C8 | C9 | C10 | V | AP | L | V | CID3 |
| RDA | L | H | L | H | H | H | BLT | BA0 | BA1 | BG0 | BG1 | BG2 | CID0 | CID1 | CID2 |
|  | H | C2 | C3 | C4 | C5 | C6 | C7 | C8 | C9 | C10 | V | AP | V | V | CID3 |

FIG. 25

| CMD | CS_n | CA0 | CA1 | CA2 | CA3 | CA4 | CA5 | CA6 | CA7 | CA8 | CA9 | CA10 | CA11 | CA12 | CA13 |
|---|---|---|---|---|---|---|---|---|---|---|---|---|---|---|---|
| PREab | L | H | H | L | H | L | CID3 | V | V | V | V | L | CID0 | CID1 | CID2 |
| PREsb | L | H | H | L | H | L | CID3 | BA0 | BA1 | V | V | H | CID0 | CID1 | CID2 |
| PREpb | L | H | H | L | H | h | CID3 | BA0 | BA1 | BG0 | BG1 | BG2 | CID0 | CID1 | CID2 |

SEMICONDUCTOR MEMORY DEVICE AND MEMORY SYSTEM INCLUDING THE SAME

CROSS-REFERENCE TO RELATED APPLICATIONS

This application claims priority under 35 U.S.C. § 119 to Korean Patent Application No. 10-2022-0078650, filed on Jun. 28, 2022 and to Korean Patent Application No. 10-2022-0123005, filed on Sep. 28, 2022, in the Korean Intellectual Property Office, the disclosures of which are incorporated by reference herein in their entireties.

BACKGROUND

1. Field

The disclosure relates to memories, and more particularly to semiconductor memory devices to defend a row hammer attack and memory systems including the same.

2. Description of Related Art

A semiconductor memory device may be classified as a volatile memory device or a nonvolatile memory device. A volatile memory device may refer to a memory device that loses data stored therein at power-off. As an example of a volatile memory device, a dynamic random access memory (DRAM) may be used in various devices such as a mobile system, a server, or a graphic device.

In volatile memory devices such as dynamic random access memory (DRAM) devices, cell charges stored in a memory cell may be lost by a leakage current. In addition, when a word-line is transitioned frequently between an active state and a precharged state (e.g., when the word-line has been accessed intensively or frequently), an affected memory cell connected to a word-line that is adjacent to the frequently accessed word-line may lose stored charges. Charges stored in a memory cell may be maintained by recharging before data is lost by leakage of cell charges. Such recharge of cell charges is referred to as a refresh operation, and a refresh operation may be performed repeatedly before lost cell charges become significant.

SUMMARY

Provided is a semiconductor memory device capable of reducing internal write time interval.

Also provided is a semiconductor memory device capable of reducing write time interval.

Also provided is a memory system capable of reducing internal write time interval.

Additional aspects will be set forth in part in the description which follows and, in part, will be apparent from the description, or may be learned by practice of the presented embodiments.

In accordance with an aspect of the disclosure, a semiconductor memory device includes a memory cell array including a plurality of memory cell rows, wherein each memory cell row of the plurality of memory cell rows includes a plurality of memory cells; a row hammer management circuit configured to: count a number of accesses to the each memory cell row based on an active command received from an external memory controller to store the counted number of at least one count cell in the each memory cell row as count data, and based on a first command applied after the active command, perform an internal read-update-write operation to read the count data from the count cells of a target memory cell row from among the plurality of memory cell rows, to update the count data, and to write the updated count data in the at least one count cell in the target memory cell row; and a column decoder configured to: access a first memory cell from among the plurality of memory cells using a first bit-line, based on a column address; and store data in the first memory cell using a first power supply voltage, or perform an internal write operation to store the count data in the first memory cell using a second power supply voltage during an internal write time interval smaller than a reference write time interval, wherein a voltage level of the second power supply voltage is greater than a voltage level of the first power supply voltage.

In accordance with an aspect of the disclosure, a semiconductor memory device includes a memory cell array including a plurality of memory cell rows, wherein each memory cell row of the plurality of memory cell rows includes a plurality of memory cells; a row decoder configured to enable a first word-line connected to a target memory cell row from among the plurality of memory cell rows, based on a row address accompanied by a write command received from an external memory controller; and a column decoder configured to: access first memory cells in the target memory cell row using first bit-lines, based on a column address; perform a first write operation to store data in the first memory cells using a first power supply voltage until a precharge command is applied to the semiconductor memory device; and perform a second write operation to store the data in the first memory cells using a second power supply voltage from a first time point at which that the precharge command is applied to the semiconductor memory device until a second time point at which the first word-line is disabled, wherein a voltage level of the second power supply voltage is greater than a voltage level of the first power supply voltage.

In accordance with an aspect of the disclosure, a memory system includes a semiconductor memory device; and a memory controller configured to control the semiconductor memory device, wherein the semiconductor memory device includes: a memory cell array including a plurality of memory cell rows, wherein each memory cell row of the plurality of memory cell rows includes a plurality of memory cells; a row hammer management circuit configured to: count a number of accesses to the each memory cell row based on an active command received from an external memory controller to store the counted number in at least one count cell in the each memory cell row as count data, and based on a first command applied after the active command, perform an internal read-update-write operation to read the count data from the count cells of a target memory cell row from among the plurality of memory cell rows, to update the count data, and to store the updated count data in the count cells of the target memory cell row; and a column decoder configured to: access a first memory cell from among the plurality of memory cells using a first bit-line, based on a column address; and store data in the first memory cell using a first power supply voltage or perform an internal write operation to store the count data in the first memory cell using a second power supply voltage during an internal write time interval smaller than a reference write time interval, wherein a voltage level of the second power supply voltage is greater than a voltage level of the first power supply voltage.

BRIEF DESCRIPTION OF DRAWINGS

The above and other aspects, features, and advantages of certain embodiments of the present disclosure will be more apparent from the following description taken in conjunction with the accompanying drawings, in which:

FIGS. 23 through 25 illustrate example commands which may be used in the memory system of FIG. 1, according to an embodiment;

DETAILED DESCRIPTION

Various example embodiments of the present disclosure are described more fully hereinafter with reference to the accompanying drawings, in which example embodiments are shown.

Figure 1:
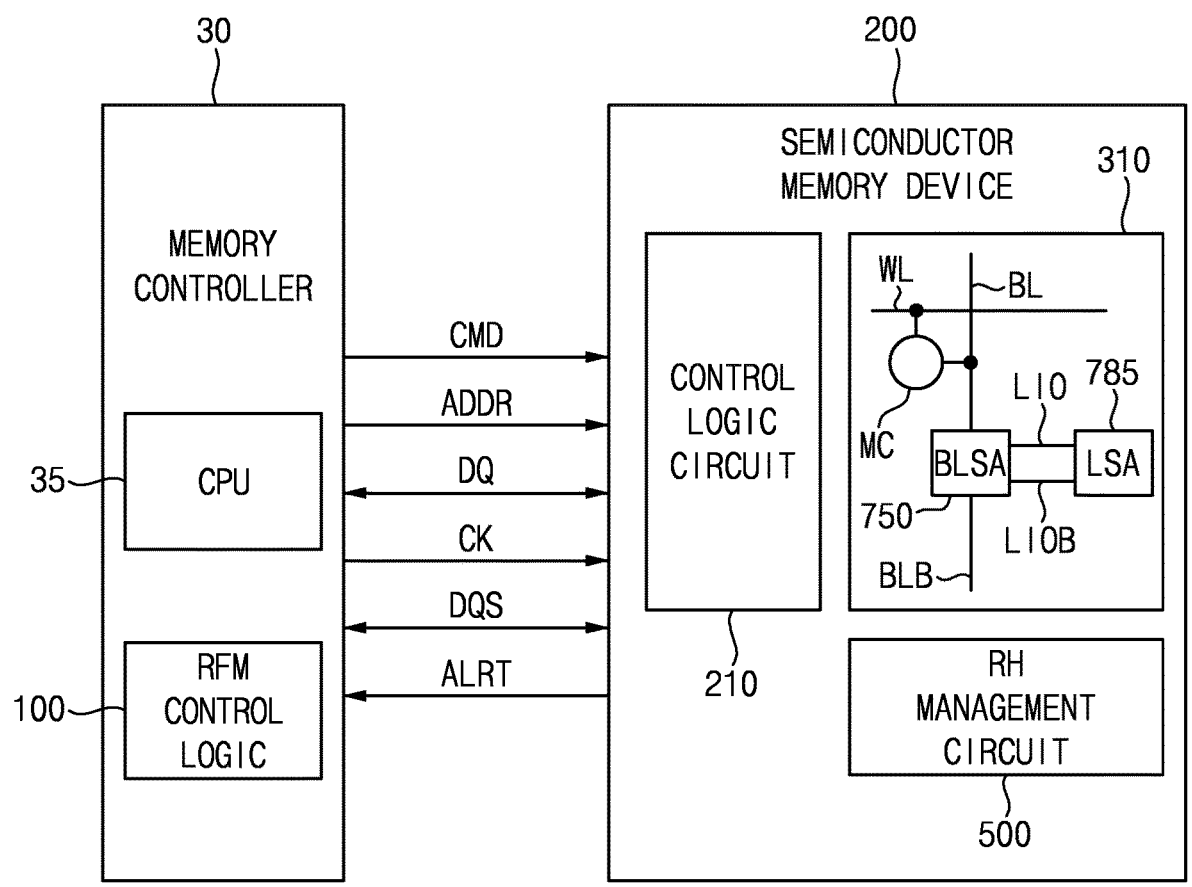
FIG. 1 is a block diagram illustrating a memory system according to an embodiment.

FIG. 1 is a block diagram illustrating a memory system according to example embodiments.

Referring to FIG. 1, a memory system 20 may include a memory controller 30 and a semiconductor memory device 200.

The memory controller 30 may control overall operation of the memory system 20. The memory controller 30 may control overall data exchange between an external host and the semiconductor memory device 200. For example, the memory controller 30 may write data in the semiconductor memory device 200 or read data from the semiconductor memory device 200 in response to request from the host.

In addition, the memory controller 30 may issue operation commands to the semiconductor memory device 200 for controlling the semiconductor memory device 200. In some example embodiments, the semiconductor memory device 200 is a memory device including dynamic memory cells such as a dynamic random access memory (DRAM), double data rate 5 (DDR5) synchronous DRAM (SDRAM), a DDR6 SDRAM or the like.

The memory controller 30 may transmit a clock signal CK, which may be referred to a command clock signal, a command CMD, and an address signal including an address ADDR to the semiconductor memory device 200. Herein, for convenience of description, the terms of a clock signal CK, a command CMD, and an address ADDR and the terms of clock signals CK, commands CMD, and addresses ADDR may be used interchangeably. The memory controller 30 may transmit a data strobe signal DQS to the semiconductor memory device 200 when the memory controller 30 writes data signal DQ in the semiconductor memory device 200. The semiconductor memory device 200 may transmit a data strobe signal DQS to the memory controller 30 when the memory controller 30 reads data signal DQ from the semiconductor memory device 200. The address ADDR may be accompanied by the command CMD and the address ADDR may be referred to as an access address.

The memory controller 30 may include a central processing unit (CPU) 35 that controls overall operation of the memory controller 30 and a refresh management (RFM) control logic 100 that generates a refresh management command associated with a row hammer of the plurality of memory cell rows of the semiconductor memory device 200.

The semiconductor memory device 200 may include a memory cell array 310 that stores the data signal DQ, a control logic circuit 210 and a row hammer (RH) management circuit 500.

The control logic circuit 210 may control operations of the semiconductor memory device 200. The memory cell array 310 may include a plurality of memory cell rows and each of the memory cell rows may include a plurality of memory cells, which may be for example volatile memory cells. The memory cell array 310 may include a bit-line sense amplifier (BLSA) 750, and a local sense amplifier (LSA) 785.

The memory cell MC may be connected to a word-line WL and a bit-line BL and the bit-line sense amplifier 750 may be connected to the memory cells MC through the bit-line BL and a complementary bit-line BLB and the local sense amplifier 785 may be connected to the bit-line sense amplifier 750 through a local input/output (I/O) line pair including a local I/O line and a complementary local I/O line.

The row hammer management circuit 500, in response to an active command from the memory controller 30, may count the number of access associated with each of the plurality of memory cell rows and store the counted values (for example, the counted values may be referred to as the counted number) in count cells of each of the plurality of memory cell rows as count data. In embodiments, the number of access associated with a memory cell row may refer to a number of times that the memory cell row is accessed, and may be referred to as a number of accesses to the memory cell row. The row hammer management circuit 500 may store one or more candidate hammer addresses up to a first number based on first-in first-out (FIFO), which are intensively accessed, from among the plurality of memory cell rows, based on a comparison of the counted value with a reference number of times, may transition or otherwise change a logic level of an alert signal ALRT provided to the memory controller 30 in response to a number of the candidate hammer addresses stored therein reaching the first number, and may output one of the candidate hammer addresses stored therein as a hammer address, in response to the number of the candidate hammer addresses stored therein reaching the first number. Herein, the term "intensively accessed" may mean that a number of times that a particular memory cell row is accessed is equal to or greater than the first reference number of times.

In response to a subsequent command such as an active count update command or a precharge command applied after the active command, the row hammer management circuit 500 may perform an internal read-update-write operation, to read the count data from a target memory cell row from among the plurality of memory cell rows, to update the read count data, and to write the updated count data in the target memory cell row.

The row hammer management circuit 500 may update the counted values stored in the count cells of the target memory cell row in response to the subsequent command. The active count update command may be a dedicated command for designating the internal read-update-write operation, which is applied to the semiconductor memory device 200 after a read command or a write command on the target memory cell row and before precharging the target memory cell row.

In example embodiments, the row hammer management circuit 500 may perform the internal read-update-write operation based on a flag of a precharge command which is applied after the active command is applied and the control logic circuit 210 may precharge the target memory cell row.

In example embodiments, the row hammer management circuit 500 may perform the internal read-update-write operation before precharging the target memory cell row based on either a flag of a read command including an auto precharge or a flag of a write command including an auto precharge which is selectively applied after the active command is applied.

Figure 12:
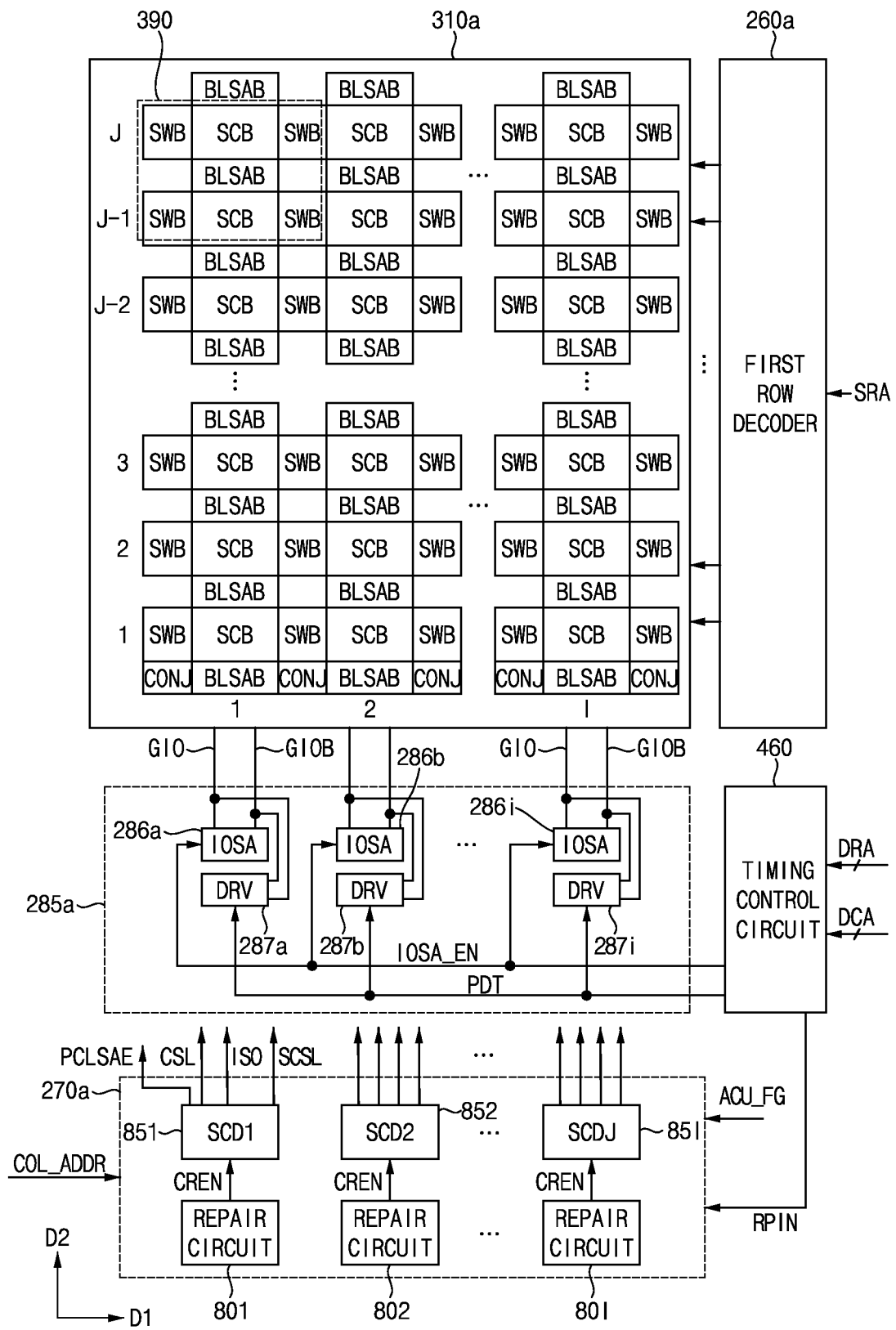
FIG. 12 illustrates a portion of the semiconductor memory device of FIG. 3 according to an embodiment.

The control logic circuit 210 may control a first column decoder 270a, as shown for example in FIG. 12, such that the first column decoder 270a performs a normal write operation to write data in normal cells in each of the plurality of memory cell rows, using a first power supply voltage provided to the bit-line sense amplifier 750 in response to a write command and performs an internal write operation to write the count data in the count cells in each of the plurality of memory cell rows, using a second power supply voltage provided to the local sense amplifier 785. A voltage level of the second power supply voltage may be greater than a voltage level of the first power supply voltage. Therefore, the column decoder 270a may perform the internal write operation to write the count data during an internal write time interval smaller than a reference write time interval and thus prevent degradation of a performance in the internal write operation.

The semiconductor memory device 200 performs a refresh operation periodically due to charge leakage of memory cells storing data. Due to scale down of the manufacturing process of the semiconductor memory device 200, the storage capacitance of the memory cell may be decreased and the refresh period may be shortened. The refresh period may be further shortened because the entire refresh time may be increased as the memory capacity of the semiconductor memory device 200 is increased.

To compensate for degradation of adjacent memory cells due to the intensive access to a particular row or a hammer address, a target row refresh (TRR) scheme may be adopted and an in-memory refresh scheme may be used to reduce the burden of the memory controller. The memory controller may be totally responsible for the hammer refresh operation in the TRR scheme and the semiconductor memory device may be totally responsible for the hammer refresh operation in the in-memory refresh scheme.

The chip size overhead for the in-memory refresh may be serious as the memory capacity is increased and demands on low power consumption of the semiconductor memory device is increased. In addition, the power consumption may be increased because the semiconductor memory device may perform the hammer refresh operation even though there is no intensive access. In addition, a row hammer of some of memory cell row selected from the plurality of the memory cell rows may be managed.

In the memory system 20 according to example embodiments, while the row hammer management circuit 500 counts each of active numbers associated with the plurality of memory cell rows and stores the counted values in the count cells of each of the plurality of memory cell rows as count data and may manage the row hammer of all of the memory cell rows based on the counted values, the semiconductor memory device may prevent performance of the memory system from being degraded by reducing the internal write time interval.

Figure 2:
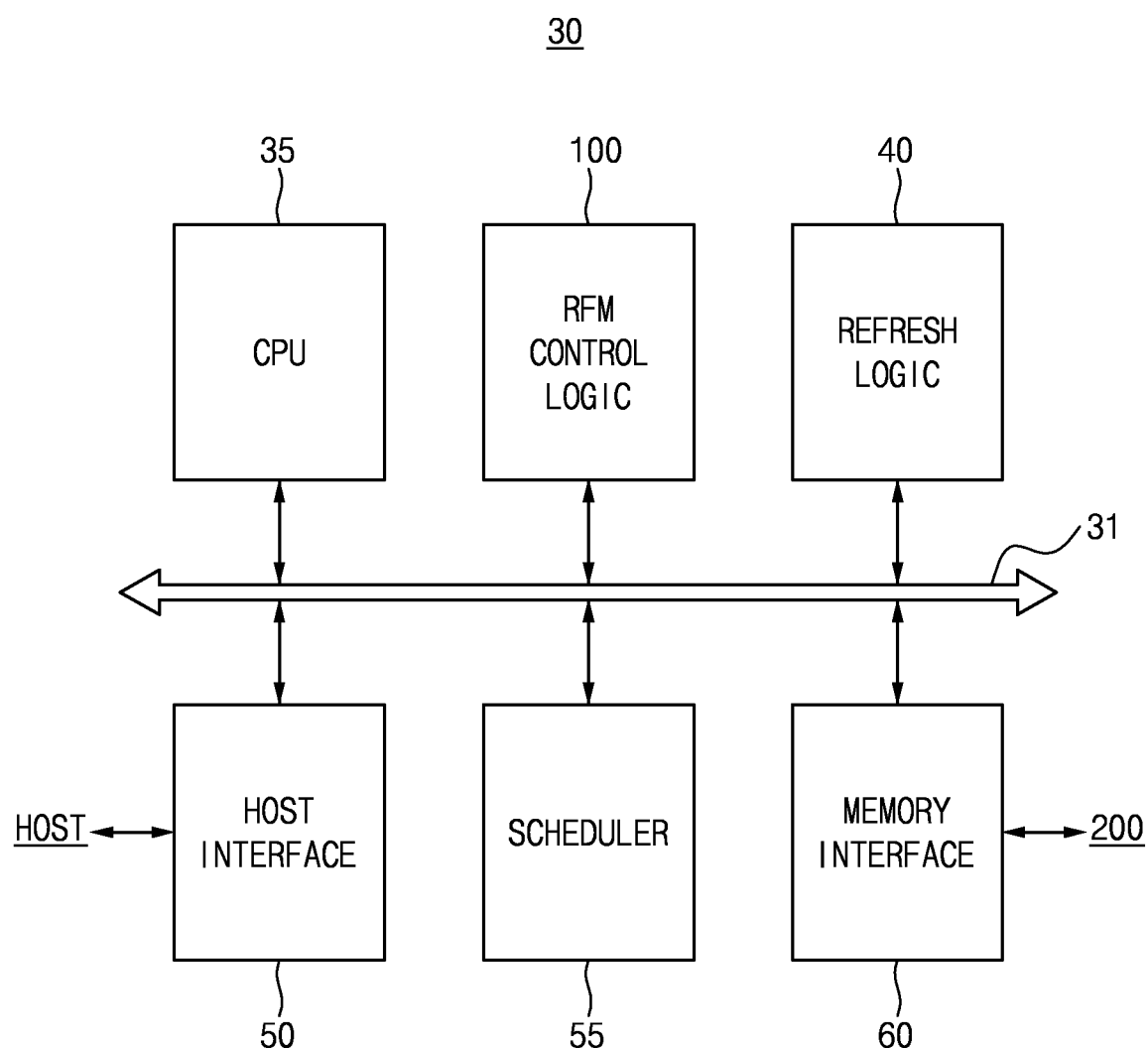
FIG. 2 is a block diagram illustrating the memory controller of FIG. 1 according to an embodiment.

FIG. 2 is a block diagram illustrating the memory controller of FIG. 1 according to example embodiments.

Referring to FIG. 2, the memory controller 30 may include the CPU 35, the RFM control logic 100, a refresh logic 40, a host interface 50, a scheduler 55 and a memory interface 60 which are connected to each other through a bus 31.

The CPU 35 may control overall operation of the memory controller 30. The CPU 35 may control the RFM control logic 100, the refresh logic 40, the host interface 50, the scheduler 55 and the memory interface 60 through the bus 31.

The refresh logic 40 may generate auto refresh command for refreshing memory cells of the plurality of memory cell rows based on a refresh interval of the semiconductor memory device 200.

The host interface 50 may perform interfacing with a host. The memory interface 60 may perform interfacing with the semiconductor memory device 200.

The scheduler 55 may manage scheduling and transmission of sequences of commands generated in the memory controller 30. The scheduler 55 may transmit the active command and subsequent commands to the semiconductor memory device 200 via the memory interface 60 and the semiconductor memory device 200 may update active count of each of the memory cell rows to may manage the row hammer of all of the memory cell rows.

The RFM control logic 100 may apply a refresh management command to the semiconductor memory device 200 through the memory interface 60 in response to a transition of the alert signal ALRT from the semiconductor memory device 200 such that the semiconductor memory device 200 performs a hammer refresh operation on one or more victim memory cell rows which are physically adjacent to a memory cell row corresponding to the hammer address.

Figure 3:
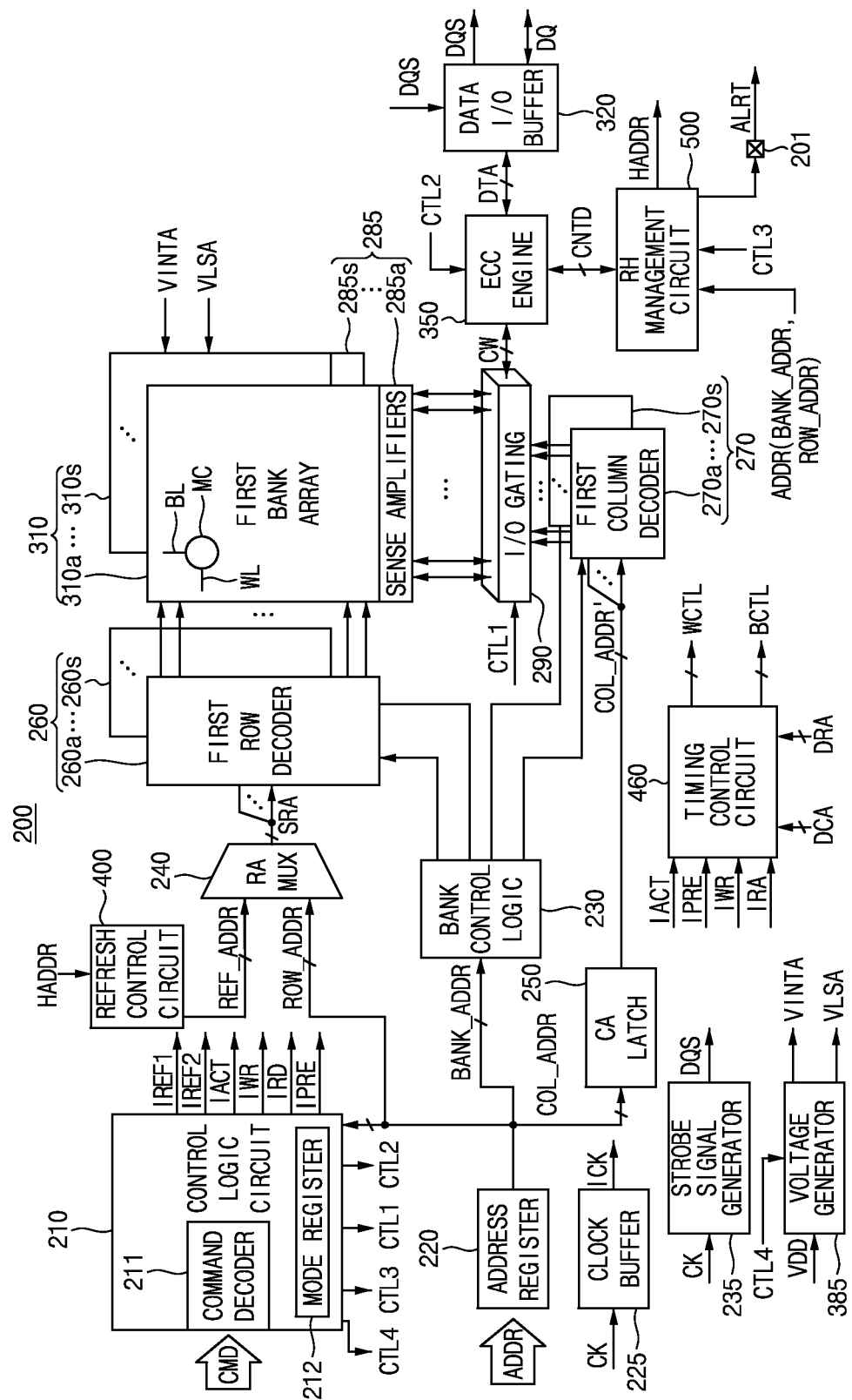
FIG. 3 is a block diagram illustrating an example of the semiconductor memory device of FIG. 1 according to an embodiment.

FIG. 3 is a block diagram illustrating an example of the semiconductor memory device of FIG. 1 according to example embodiments.

Referring to FIG. 3, the semiconductor memory device 200 may include the control logic circuit 210, an address register 220, a bank control logic 230, a refresh control circuit 400, a row address multiplexer 240, a column address latch 250, a row decoder 260, a column decoder 270, the memory cell array 310, a sense amplifier unit 285, an I/O gating circuit 290, an error correction code (ECC) engine 350, a clock buffer 225, a strobe signal generator 235, a voltage generator 385, a timing control circuit 460, the row hammer management circuit 500 and a data I/O buffer 320.

The memory cell array 310 may include first through sixteenth bank arrays 310a-310s. The row decoder 260 may include first through sixteenth row decoders 260a-260s respectively coupled to the first through sixteenth bank arrays 310a-310s, the column decoder 270 may include first through sixteenth column decoders 270a-270s respectively coupled to the first through sixteenth bank arrays 310a-310s, and the sense amplifier unit 285 may include first through sixteenth sense amplifiers 285a-285s respectively coupled to the first through sixteenth bank arrays 310a-310s.

The first through sixteenth bank arrays 310a-310s, the first through sixteenth row decoders 260a-260s, the first through sixteenth column decoders 270a-270s and first through sixteenth sense amplifiers 285a-285s may form first through sixteenth banks. Each of the first through sixteenth bank arrays 310a-310s includes a plurality of memory cells MC formed at intersections of a plurality of word-lines WL and a plurality of bit-lines BL.

The address register 220 may receive the address ADDR including a bank address BANK_ADDR, a row address ROW_ADDR and a column address COL_ADDR from the memory controller 30. The address register 220 may provide the received bank address BANK_ADDR to the bank control logic 230, may provide the received row address ROW_ADDR to the row address multiplexer 240, and may provide the received column address COL_ADDR to the column address latch 250. In addition, the address register 220 may provide the received bank address BANK_ADDR and the received row address ROW_ADDR to the row hammer management circuit 500.

The bank control logic 230 may generate bank control signals in response to the bank address BANK_ADDR. One of the first through sixteenth row decoders 260a-260s corresponding to the bank address BANK_ADDR is activated in response to the bank control signals, and one of the first through sixteenth column decoders 270a-270s corresponding to the bank address BANK_ADDR is activated in response to the bank control signals.

The row address multiplexer 240 may receive the row address ROW_ADDR from the address register 220, and may receive a refresh row address REF_ADDR from the refresh control circuit 400. The row address multiplexer 240 may selectively output the row address ROW_ADDR or the refresh row address REF_ADDR as a row address SRA. The row address SRA that is output from the row address multiplexer 240 is applied to the first through sixteenth row decoders 260a-260s.

The refresh control circuit 400 may sequentially increase or decrease the refresh row address REF_ADDR in a normal refresh mode in response to first and second refresh control signals IREF1 and IREF2 from the control logic circuit 210. The refresh control circuit 400 may receive a hammer address HADDR in a hammer refresh mode, and may output one or more hammer refresh addresses designating one or more victim memory cell rows physically adjacent to a memory cell row corresponding to the hammer address as the refresh row address REF_ADDR.

The row decoder that is activated by the bank control logic from among the first through sixteenth row decoders 260a-260s may decode the row address SRA that is output from the row address multiplexer 240, and may activate a word-line corresponding to the row address SRA. For example, the activated bank row decoder applies a word-line driving voltage to the word-line corresponding to the row address.

The column address latch 250 may receive the column address COL_ADDR from the address register 220, and may temporarily store the received column address COL_ADDR. In some embodiments, in a burst mode, the column address latch 250 may generate column address COL_ADDR' that is incremented from the received column address COL_ADDR. The column address latch 250 may apply the temporarily stored or generated column address COL_ADDR' to the first through sixteenth column decoders 270a-270s.

The activated column decoder from among the first through sixteenth column decoders 270a-270s activates a sense amplifier corresponding to the bank address BANK_ADDR and the column address COL_ADDR through the I/O gating circuit 290.

The I/O gating circuit 290 may include a circuitry for gating input/output data, and may further include input data mask logic, read data latches for storing data that is output from the first through sixteenth bank arrays 310a-310s, and write drivers for writing data to the first through sixteenth bank arrays 310a-310s.

A codeword CW (e.g., read codeword RCW of FIG. 20) read from a selected bank array of the first through sixteenth bank arrays 310a-310s is sensed by a sense amplifier coupled to the selected one bank array from which the data is to be read, and is stored in the read data latches. The codeword CW stored in the read data latches may be provided to the data I/O buffer 320 as data DTA (e.g., corrected data C_DTA of FIG. 20) after ECC decoding is performed on the codeword CW by the ECC engine 350. The data I/O buffer 320 may convert the data DTA into the data signal DQ and may transmit the data signal DQ along with the data strobe signal DQS to the memory controller 30.

The data signal DQ to be written in a selected bank array of the first through sixteenth bank arrays 310a-310s may be provided to the data I/O buffer 320 from the memory controller 30. The data I/O buffer 320 may convert the data signal DQ to the data DTA and may provide the data DTA to the ECC engine 350. The ECC engine 350 may perform an ECC encoding on the data DTA to generate parity bits, and the ECC engine 350 may provide the codeword CW including data DTA and the parity bits to the I/O gating circuit 290. The I/O gating circuit 290 may write the codeword CW in a sub-page in the selected one bank array through the write drivers.

The data I/O buffer 320 may provide the data signal DQ from the memory controller 30 to the ECC engine 350 by converting the data signal DQ to the data DTA in a write operation of the semiconductor memory device 200 and may convert the data DTA to the data signal DQ from the ECC engine 350 and may transmit the data signal DQ and the data strobe signal DQS to the memory controller 30 in a read operation of the semiconductor memory device 200.

The ECC engine 350 may perform an ECC encoding on the data DTA and may perform an ECC decoding on the codeword CW based on a second control signal CTL2 from the control logic circuit 210. The ECC engine 350 may perform an ECC encoding and an ECC decoding on count data CNTD provided from the row hammer management circuit 500 based on the second control signal CTL2 from the control logic circuit 210.

The clock buffer 225 may receive the clock signal CK, may generate an internal clock signal ICK by buffering the clock signal CK, and may provide the internal clock signal ICK to circuit components processing the command CMD and the address ADDR.

The strobe signal generator 235 may receive the clock signal CK, may generate the data strobe signal DQS based on the clock signal CK and may provide the data strobe signal DQS to the data I/O buffer 320.

The voltage generator 385 may generate a first power supply voltage VINTA and a second power supply voltage VLSA based on a power supply voltage VDD received from an outside device and may provide the first power supply voltage VINTA and a second power supply voltage VLSA to the memory cell array 310. The voltage generator 385 may adjust voltage levels of the first power supply voltage VINTA and a second power supply voltage VLSA based on a fourth control signal CTL4 provided from the control logic circuit 210.

The row hammer management circuit 500 may count the number of access associated with each of the plurality of memory cell rows, for example a number times that each of the plurality of memory cell rows is accessed, in response to an active command from the memory controller 30 to store the counted values in count cells of each of the plurality of memory cell rows as the count data CNTD. The row hammer management circuit 500 may store one or more candidate hammer addresses, which are intensively accessed, from among the plurality of memory cell rows, up to a first number based on first-in first-out (FIFO) scheme, based on a comparison of the counted value with a reference number of times, may transition a logic level of the alert signal ALRT provided to the memory controller 30 through an alert pin 201 in response to a number of the candidate hammer addresses stored therein reaching the first number, and may provide one of the candidate hammer addresses stored therein as a hammer address HADDR to the refresh control circuit 400.

The control logic circuit 210 may control operations of the semiconductor memory device 200. For example, the control logic circuit 210 may generate control signals for the semiconductor memory device 200 in order to perform a write operation, a read operation, a normal refresh operation and a hammer refresh operation. The control logic circuit 210 may include a command decoder 211 that decodes the command CMD received from the memory controller 30 and a mode register 212 that sets an operation mode of the semiconductor memory device 200.

For example, the command decoder 211 may generate the control signals corresponding to the command CMD by decoding a write enable signal, a row address strobe signal, a column address strobe signal, a chip select signal, etc. The control logic circuit 210 may provide a first control signal CTL1 to the I/O gating circuit, the second control signal CTL2 to the ECC engine 350, a third control signal CTL3 to the row hammer management circuit 500 and the fourth control signal CTL4 to the voltage generator 385. In addition, the command decoder 211 may generate internal command signals including the first refresh control signal IREF1, the second refresh control signal IREF2, an active signal IACT, a precharge signal IPRE, a read signal IRD and a write signal IWR by decoding the command CMD.

The timing control circuit 460 may receive the active signal IACT, the precharge signal IPRE, the read signal IRD, the write signal IWR, a decoded row address DRA and a decoded column address DRA and may generate a word-line control signal WCTL for controlling word-lines and a bit-line control signal BCTL for controlling bit-lines, and may provide the word-line control signal WCTL and the bit-line control signal BCTL to the memory cell array 310.

Figure 4:
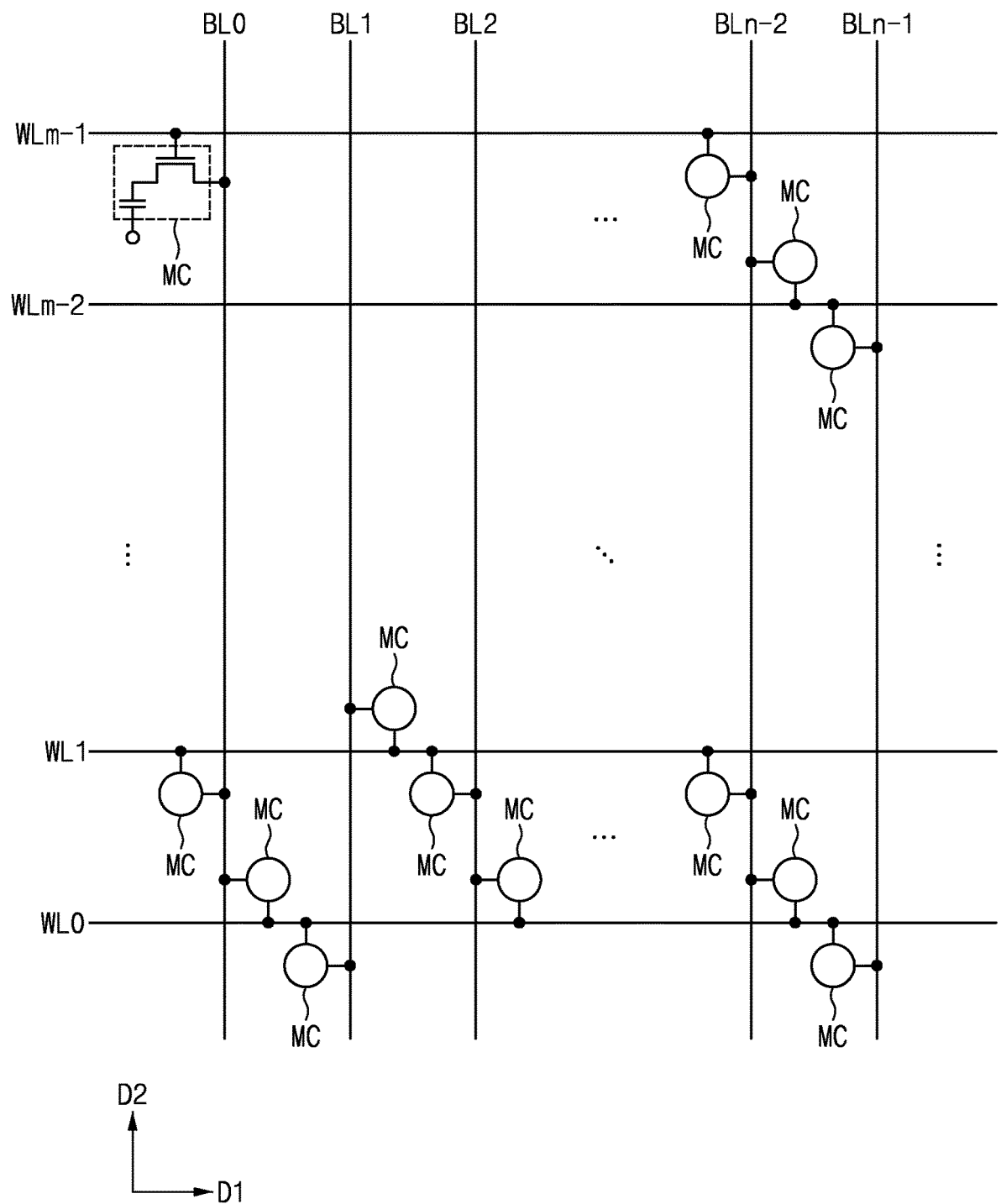
FIG. 4 illustrates an example of the first bank array in the semiconductor memory device of FIG. 3, according to an embodiment.

FIG. 4 illustrates an example of the first bank array in the semiconductor memory device of FIG. 3.

Referring to FIG. 4, the first bank array 310a includes a plurality of word-lines WL0-WLm−1, where m is a natural number greater than two, a plurality of bit-lines BL0-BLn−1, where n is a natural number greater than two, and a plurality of memory cells MC disposed at intersections between the word-lines WL0-WLm−1 and the bit-lines BL0-BLn−1. Each of the memory cells MC includes a cell transistor coupled to each of the word-lines WL0-WLm−1 and each of the bit-lines BL0-BLn−1 and a cell capacitor coupled to the cell transistor. Each of the memory cells MC may have a DRAM cell structure. Each of the word-lines WL0-WLm−1 extends in a first direction D1 and each of the bit-lines BL1-BLn−1 extends in a second direction D2 crossing the first direction D1.

The word-lines WL0-WLm−1 coupled to the plurality of memory cells MC may be referred to as rows of the first bank array 310a and the bit-lines BL0-BLn−1 coupled to the plurality of memory cells MC may be referred to as columns of the first bank array 310a.

Figure 5:
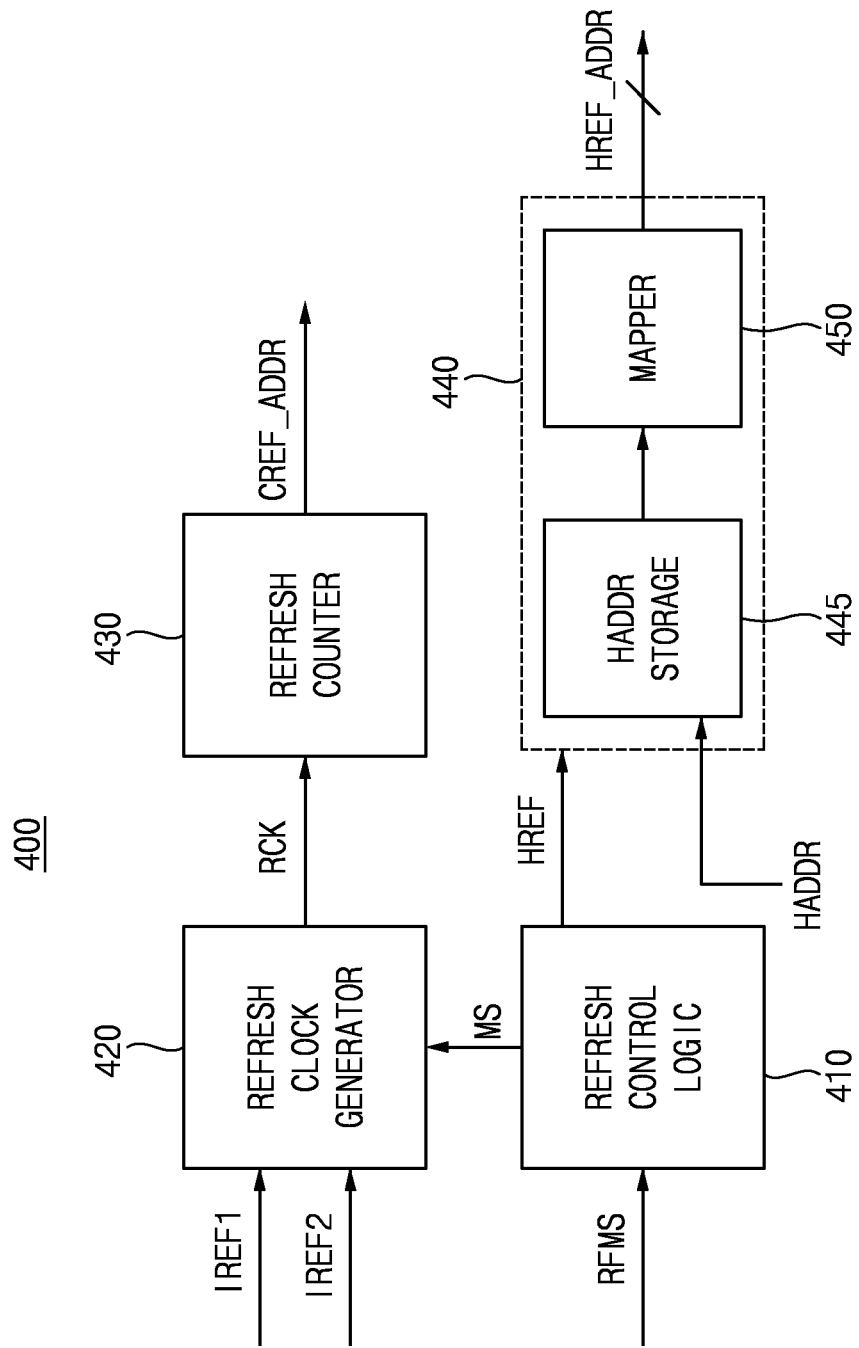
FIG. 5 is a block diagram illustrating an example of the refresh control circuit of FIG. 3 according to an embodiment.

FIG. 5 is a block diagram illustrating an example of the refresh control circuit of FIG. 3 according to example embodiments.

Referring to FIG. 5, the refresh control circuit 400 may include a refresh control logic 410, a refresh clock generator 420, a refresh counter 430 and a hammer refresh address generator 440.

The refresh control logic 410 may provide a mode signal MS in response to a refresh management signal RFMS. In addition, the refresh control logic 410 may provide the hammer refresh address generator 440 with a hammer refresh signal HREF to control output timing of the hammer address in response to one of the first refresh control signal IREF1 and the second refresh control signal IREF2.

The control logic circuit 210 of FIG. 3 may provide the refresh control circuit 400 with the refresh management signal RFMS based on a refresh management command from the memory controller 30.

The refresh clock generator 420 may generate a refresh clock signal RCK indicating a timing of a normal refresh operation based on the first refresh control signal IREF1, the second refresh control signal IREF2 and the mode signal MS. The refresh clock generator 420 may generate the refresh clock signal RCK in response to the receiving the first refresh control signal IREF1 or during the second refresh control signal IREF2 is activated.

When the command CMD from the memory controller 30 corresponds to an auto refresh command, the control logic circuit 210 of FIG. 3 may apply the first refresh control signal IREF1 to the refresh control circuit 400 whenever the control logic circuit 210 receives the auto refresh command. When the command CMD from the memory controller 30 corresponds to a self-refresh entry command, the control logic circuit 210 may apply the second refresh control signal IREF2 to the refresh control circuit 400 and the second refresh control signal IREF2 is activated from a time point when the control logic circuit 210 receives the self-refresh entry command to a time point when control logic circuit 210 receives a self-refresh exit command.

The refresh counter 430 may generate a counter refresh address CREF_ADDR designating sequentially the memory cell rows by performing counting operation at the period of the refresh clock signal RCK, and may provide the counter refresh address CREF_ADDR as the refresh row address REF_ADDR to the row address multiplexer 240 of FIG. 3.

The hammer refresh address generator 440 may include a hammer address storage 445 and an mapper 450.

The hammer address storage 445 may store the hammer address HADDR and may output the hammer address HADDR to the mapper 450 in response to the hammer refresh signal HREF. The mapper 450 may generate hammer refresh addresses HREF_ADDR designating one or more victim memory cell rows physically adjacent to a memory cell row corresponding to the hammer address HADDR.

The hammer refresh address generator 440 may provide the hammer refresh address HREF_ADDR as the refresh row address REF_ADDR to the row address multiplexer 240 of FIG. 3.

Figure 6:
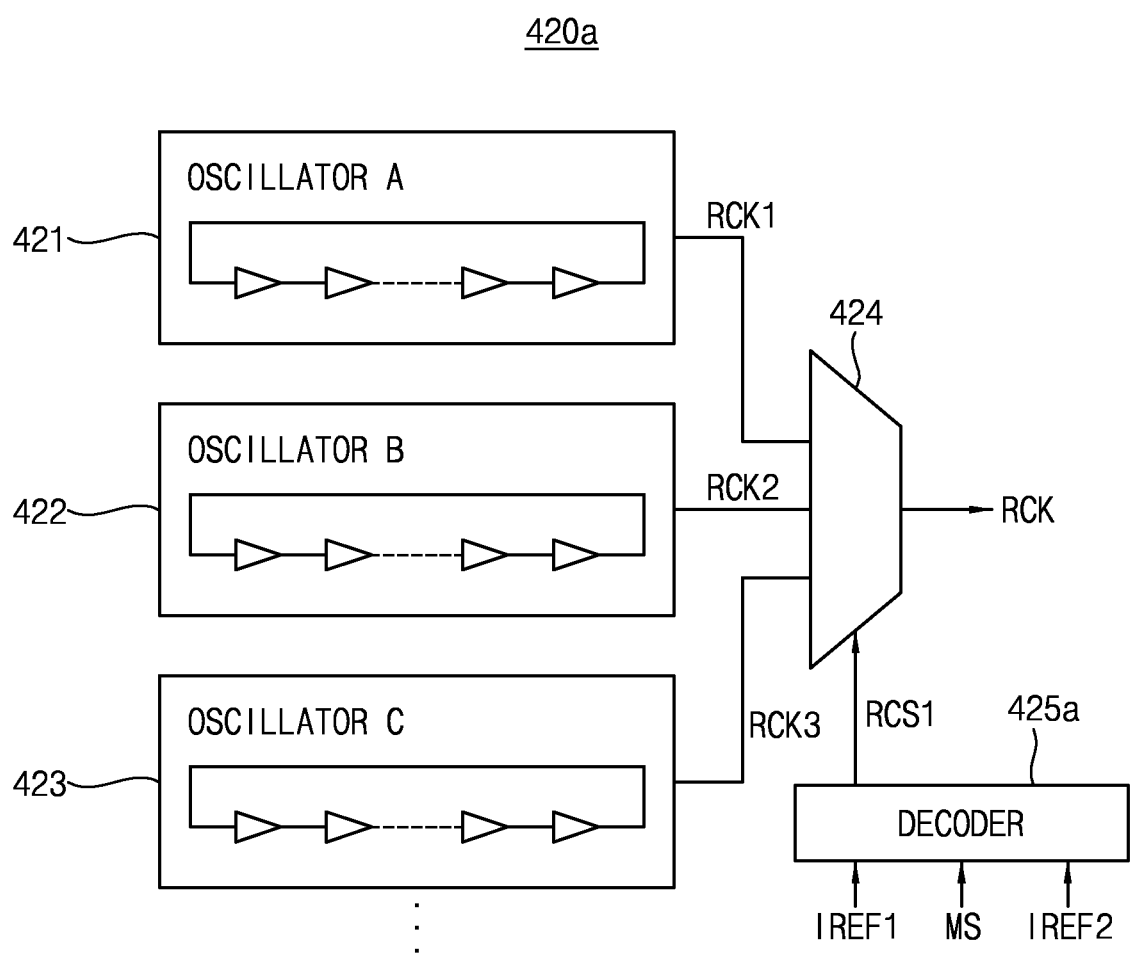
FIG. 6 is a circuit diagram illustrating an example of the refresh clock generator shown in FIG. 5 according to an embodiment.

FIG. 6 is a circuit diagram illustrating an example of the refresh clock generator shown in FIG. 5 according to example embodiments.

Referring to FIG. 6, a refresh clock generator 420a may include a plurality of oscillators 421, 422 and 423, a multiplexer 424 and a decoder 425a. The decoder 425a may decode the first refresh control signal IREF1, the second refresh control signal IREF2 and the mode signal MS to output a clock control signal RCS1. The oscillators 421, 422, and 423 generate refresh clock signals RCK1, RCK2 and RCK3 having different periods. The multiplexer 424 selects one of the refresh clock signals RCK1, RCK2 and RCK3 to provide the refresh clock signal RCK in response to the clock control signal RCS1.

Because the mode signal MS indicates that the row hammer event occurs, the refresh clock generator 420a may adjust a refresh cycle by selecting one of the refresh clock signals RCK1, RCK2 and RCK3.

Figure 7:
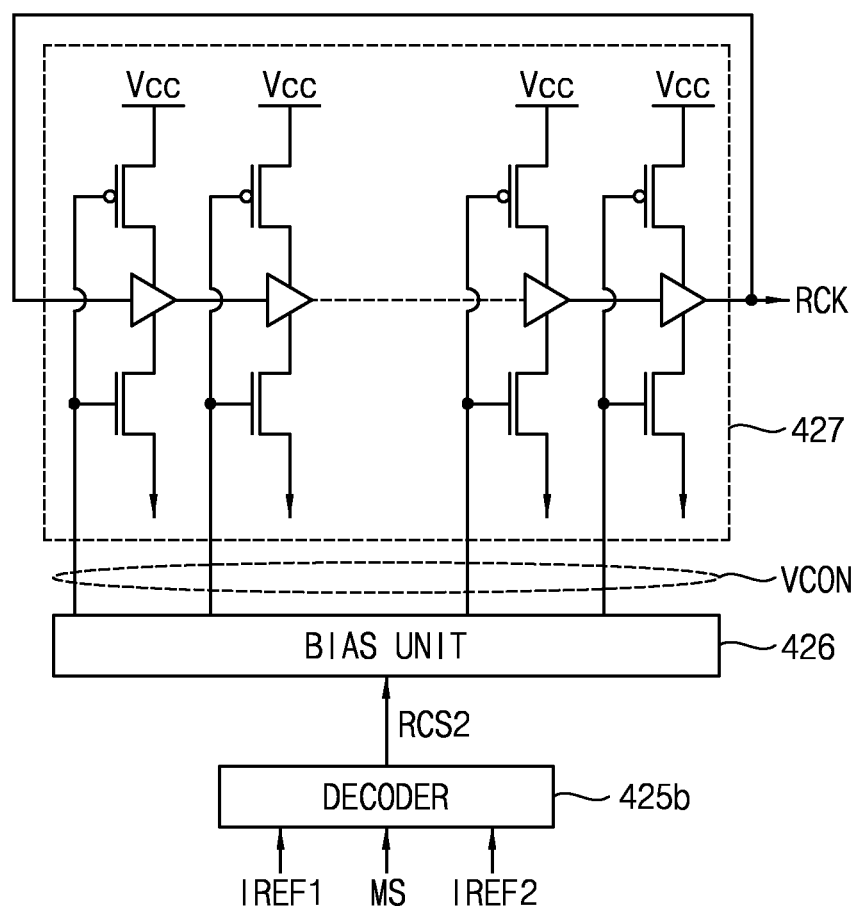
FIG. 7 is a circuit diagram illustrating another example of the refresh clock generator of FIG. 5 according to an embodiment.

FIG. 7 is a circuit diagram illustrating another example of the refresh clock generator of FIG. 5 according to example embodiments.

Figure 8:
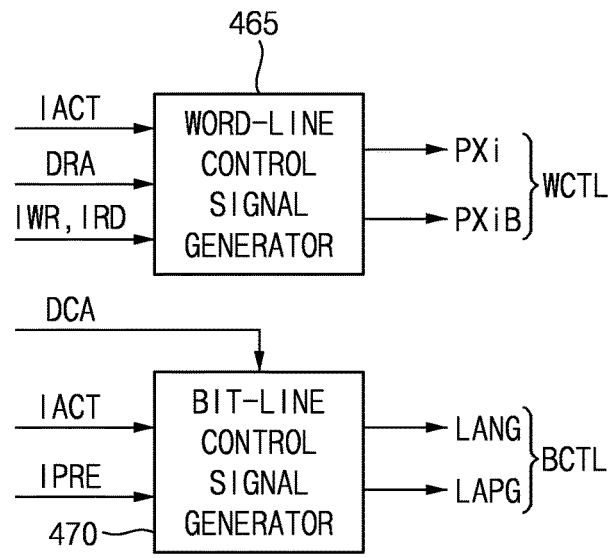
FIG. 8 is a block diagram illustrating an example of the timing control circuit of FIG. 3 according to an embodiment.

Referring to FIG. 8, a refresh clock generator 420b may include a decoder 425b, a bias unit 426 and an oscillator 427. The oscillator 427 may include a plurality of delay cells connected in series. Each of the plurality of delay cells may be connected between a power supply voltage Vcc and a ground voltage and each of the plurality of delay cells may include a p-channel metal-oxide semiconductor (PMOS) transistor, a buffer and an n-channel metal-oxide semiconductor (NMOS) transistor connected in series between the power supply voltage Vcc and the ground voltage.

The decoder 425b may decode the first refresh control signal IREF1, the second refresh control signal IREF2 and the mode signal MS to output a clock control signal RCS2. The bias unit 426 generates a control voltage VCON in response to the clock control signal RCS2. The oscillator 427 generates the refresh clock signal RCK having a variable period, according to the control voltage VCON applied to gates of the PMOS transistors and the NMOS transistors.

Because the mode signal MS indicates that the refresh management signal RFMS has been received (for example, based on the row hammer event occurring), the refresh clock generator 420b may adjust a refresh cycle by varying a period of the refresh clock signal RCK based on the clock control signal RCS2.

FIG. 8 is a block diagram illustrating an example of the timing control circuit of FIG. 3 according to example embodiments.

Referring to FIG. 8, the timing control circuit 460 may include a word-line control signal generator 465 and a bit-line control signal generator 470.

The word-line control signal generator 465 may generate a word-line control signal WCTL including first and second word-line control signals PXi and PXiB to control a word-line based on the internal command signals IACT, IWR and IRD corresponding to the command CMD a decoded row address DRA. In addition, the word-line control signal generator 465 may provide the first and second word-line control signals PXi and PXiB to the memory cell array 310.

The bit-line control signal generator 470 may generate the bit-line control signal BCTL including second control signals LANG and LAPG to control voltage levels of a bit-line pair of a selected memory cell, in response to the internal command signals IACT and IPRE and a decoded column address DCA and may provide the second control signals LANG and LAPG to the memory cell array 310.

Figure 9:
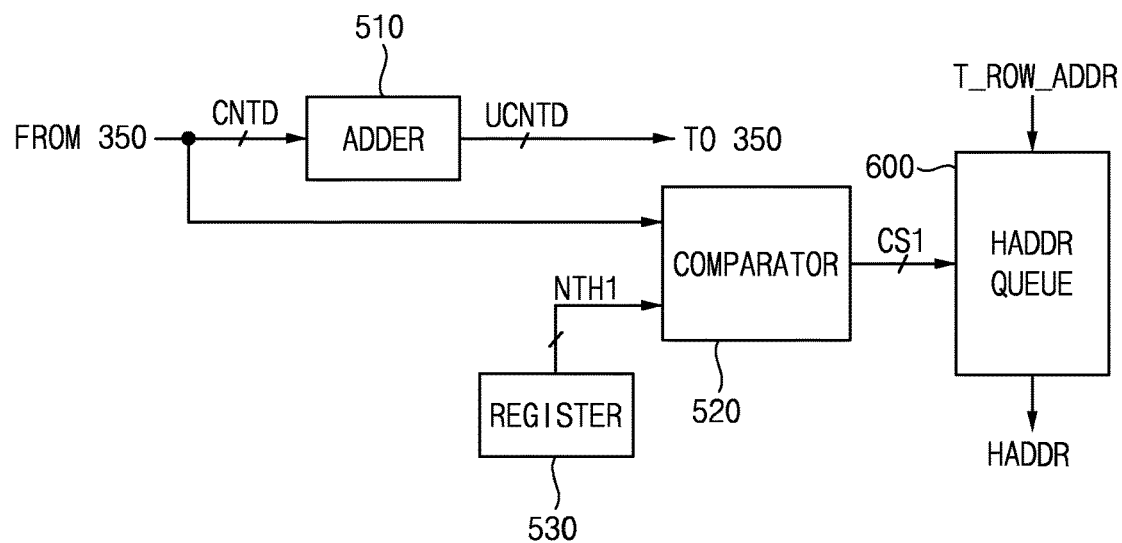
FIG. 9 is a block diagram illustrating an example of the row hammer management circuit in the semiconductor memory device of FIG. 3 according to an embodiment.

FIG. 9 is a block diagram illustrating an example of the row hammer management circuit in the semiconductor memory device of FIG. 3 according to example embodiments.

Referring to FIG. 9, the row hammer management circuit 500 may include an adder 510, a comparator 520, a register 530 and a hammer address queue 600.

The adder 510 may update the count data CNTD read from the count cells of the target memory cell row to provide an updated count data UCNTD by increasing the count data CNTD by one, which is read from the count cells of the target memory cell row and an ECC decoding operation is performed on. The adder 510 may update the read count data CNTD. The adder 510 may be implemented with an up-counter.

The updated count data UCNTD is provided to the ECC engine 350 and the ECC engine 350 performs an ECC encoding operation on the updated count data UCNTD.

The register 530 may store a reference number of times NTH1. The comparator 520 may compare the read count data CNTD with the reference number of times NTH1 to output a first comparison signal CS1 indicating a result of the comparison.

The reference number of times NTH1 may include default reference number of times and multiples of the default reference number of times and thus, the first comparison signal CS1 may include a plurality of bits.

The hammer address queue 600, in response to the first comparison signal CS1 indicating that the read count data CNTD is equal to or greater than the reference number of times NTH1, may store a target access address T_ROW_ADDR designating the target memory cell row as a candidate hammer address and may provide the refresh control circuit 400 of FIG. 3 with one of candidate hammer addresses stored therein as the hammer address HADDR. The hammer address queue 600, may store the target access addresses T_ROW_ADDR whose number of access is equal to or greater than the reference number of times NTH1 as the candidate hammer addresses and may indicate a state of the hammer address queue 600 as a logic level of the alert signal ALRT based on a number of the candidate hammer addresses stored therein.

Figure 10:
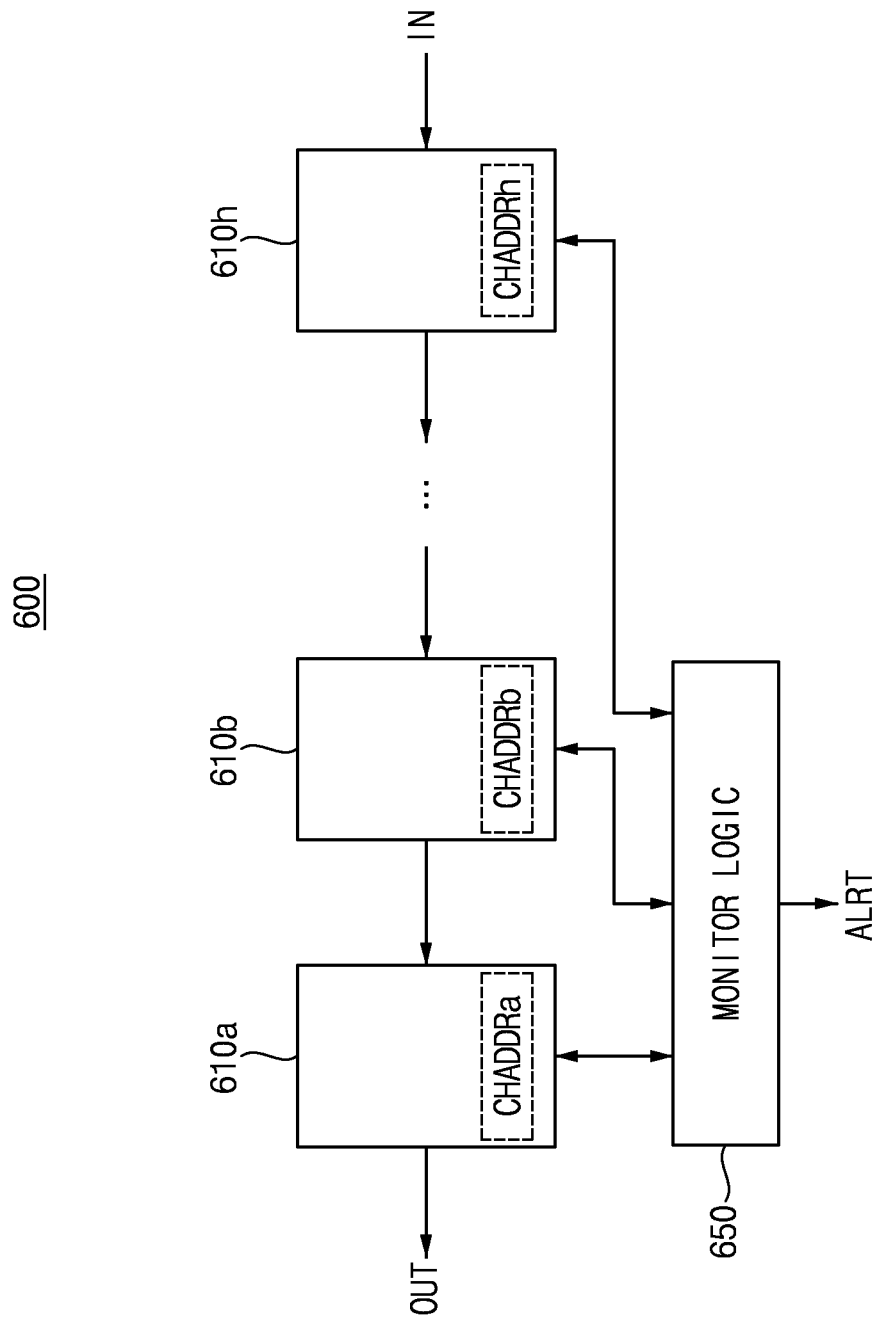
FIG. 10 illustrates an example of the hammer address queue in the row hammer management circuit of FIG. 9 according to an embodiment.

FIG. 10 illustrates an example of the hammer address queue in the row hammer management circuit of FIG. 9 according to example embodiments.

Referring to FIG. 10, a hammer address queue 600 may include a plurality of FIFO registers 610a, 610b, . . . , 610h, and a monitor logic 650. A number of the plurality of FIFO registers 610a, 610b, . . . , 610h may correspond to a first number.

The plurality of FIFO registers 610a, 610b, . . . , 610h may store a plurality of candidate hammer addresses CHADDRa, CHADDRb, . . . , CHADDRh up to the first number based on FIFO scheme from an input terminal IN to an output terminal OUT.

The monitor logic 650 may be connected to the plurality of FIFO registers 610a, 610b, . . . , 610h, may manage the plurality of FIFO registers 610a, 610b, . . . , 610h and may monitor whether each of the plurality of FIFO registers 610a, 610b, . . . , 610h stores a candidate hammer address. In response to the number of the candidate hammer addresses stored in the plurality of FIFO registers FIFO registers 610a, 610b, . . . , 610h reaching the first number (for example, in response to the plurality of FIFO registers being full), the monitor logic 650 may output a candidate hammer address which was input first from among the candidate hammer addresses as the hammer address HADDR and may notify the memory controller 30 of a state of the hammer address queue 600 by transitioning a logic level of the alert signal ALRT from a first logic level to a second logic level different from the first logic level in response to outputting the hammer address HADDR.

In response to a transition of the alert signal ALRT, the memory controller 30 of FIG. 2 applies a refresh management command to the semiconductor memory device 200, and the monitor logic 650 may transition the alert signal ALRT to the first logic level in response to the hammer refresh operation based on the hammer address HADDR is completed. For example, the monitor logic 650 may transition the alert signal ALRT to the first logic level in response to the hammer refresh operation after a predetermined time interval elapses from a time point at which the monitor logic 650 outputs the hammer address HADDR.

Figure 11:
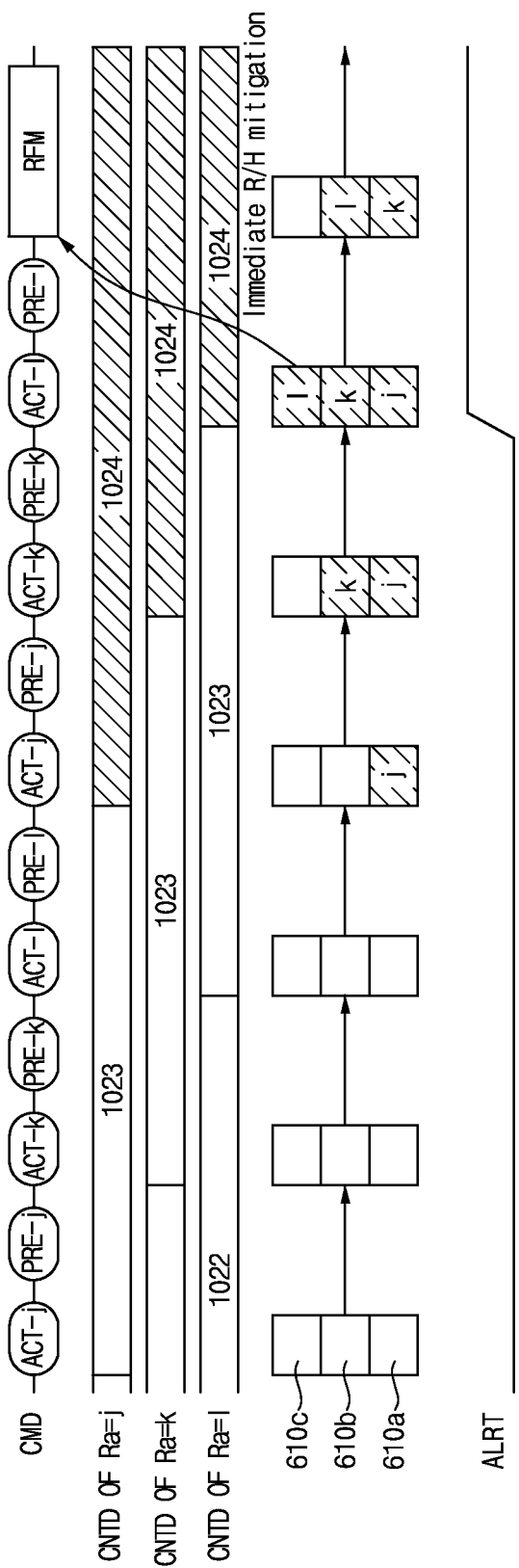
FIG. 11 is a timing diagram illustrating an example operation of the hammer address queue of FIG. 10 according to an embodiment.

FIG. 11 is a timing diagram illustrating an example operation of the hammer address queue of FIG. 10 according to example embodiments.

In the example illustrated in FIG. 11, the plurality of FIFO registers 610a, 610b, . . . , 610h of FIG. 10 include three FIFO registers 610a, 610b and 610c, accesses on memory cell rows designated by a row address RA=j, a row address RA=k and a row address RA=l are repeated, and the reference number of times NTH1 corresponds to 1024.

In FIG. 11, ACT-j denotes an active command accompanying the row address RA=j, PRE-j denotes a precharge command on a memory cell row designated by the row address RA=j, ACT-k denotes an active command accompanying the row address RA=k PRE-k denotes a precharge command on a memory cell row designated by the row address RA=k, ACT-l denotes an active command accompanying the row address RA=l, and PRE-l denotes a precharge command on a memory cell row designated by the row address RA=l.

Referring to FIGS. 10 and 11, in response to the counted value (e.g., the count data CNTD) associated with the memory cell row designated by the row address RA=j reaching 1024, the row address RA=j is stored in the FIFO register 610a as a candidate hammer address, in response to the counted value (e.g., the count data CNTD) associated with the memory cell row designated by the row address RA=k reaching 1024, the row address RA=k is stored in the FIFO register 610b as a candidate hammer address, and in response to the counted value (e.g., the count data CNTD) associated with the memory cell row designated by the row address RA=l reaching 1024, the row address RA=l is stored in the FIFO register 610a as a candidate hammer address.

Because all of the FIFO registers 610a, 610b and 610c store candidate hammer addresses, the monitor logic 65a notifies the memory controller 30 that the hammer address queue 600 is full (or for example that there is no available space in the hammer address queue 600) by transitioning the alert signal ALRT to the second logic level. The memory controller 30, in response to transition of the alert signal ALRT, may withhold application of the active command to the semiconductor memory device 200 and may apply a refresh management command RFM to the semiconductor memory device 200. The monitor logic 650 may transition the alert signal ALRT from the first logic level (e.g., a logic high level) to the second logic level (e.g., a logic low level) in response to the row address RA=j stored in the FIFO register 610a being output as the hammer address.

The refresh control circuit 400 of FIG. 5 may perform a hammer refresh operation on one or more victim memory cell rows which are physically adjacent to a memory cell row corresponding to the hammer address and the monitor logic 650 may transition the alert signal ALRT to the first logic level after the hammer refresh operation is completed. The hammer refresh operation is represented by "Immediate R/H mitigation" in FIG. 11.

FIG. 12 illustrates a portion of the semiconductor memory device of FIG. 3 according to example embodiments.

In FIG. 12, the first bank array 310a, the first row decoder 260a, the first sense amplifier 285a, the first column decoder 270a and the timing control circuit 460 are illustrated.

Referring to FIG. 12, in the first bank array 310a, I sub-array blocks SCB may be disposed in the first direction D1, and J sub-array blocks SCB may be disposed in the second direction D2 perpendicular to the first direction D1. I and J represent a number of the sub-array blocks SCB in the first direction D1 and the second direction D2, respectively, and are natural numbers greater than two.

I sub-array blocks SCB disposed in the first direction D1 in one row may be referred to as a row block. A plurality of bit-lines, a plurality of word-lines and a plurality of memory cells connected to the bit-lines and the word-lines are disposed in each of the sub-array blocks SCB.

I+1 sub word-line driver regions SWB may be disposed between the sub-array blocks SCB in the first direction D1 as well on each side of each of the sub-array blocks SCB in the first direction D1. Sub word-line drivers may be disposed in the sub word-line driver regions SWB. J+1 bit-line sense amplifier regions BLSAB may be disposed, for example, between the sub-array blocks SCB in the second direction D2 and above and below each of the sub-array blocks SCB in the second direction D2. Bit-line sense amplifiers to sense data stored in the memory cells may be disposed in the bit-line sense amplifier regions BLSAB.

A plurality of sub word-line drivers may be provided in each of the sub word-line driver regions SWB. One sub word-line driver region SWB may be associated with two sub-array blocks SCB adjacent to the sub word-line driver region SWB in the first direction D1.

A plurality of conjunction regions CONJ may be disposed adjacent the sub word-line driver regions SWB and the bit-line sense amplifier regions BLSAB. A voltage generator may be disposed in each of the conjunction regions CONJ.

The first sense amplifier 285a may be disposed in the first direction D1 with respect to the first bank array 310a and the first sense amplifier 285a may include I I/O sense amplifiers IOSA 286a, IOSA 286b, . . . , IOSA 286i, and I drivers DRV 287a, DRV 287b, . . . , DRV 287i. Each of the I I/O sense amplifiers IOSA 286a, IOSA 286b, . . . , IOSA 286i and each of the I drivers DRV 287a, DRV 287b, . . . , DRV 287i may be connected to global I/O lines GIO and GIOB.

The timing control circuit 460 may control the I I/O sense amplifiers IOSA 286a, IOSA 286b, . . . , IOSA 286i and the I drivers DRV 287a, DRV 287b, . . . , DRV 287i based on the decoded row address DRA and the decoded column address DCA. The timing control circuit 460 may provide the I/O sense enable signal IOSA_EN to the I/O sense amplifiers IOSA 286a, IOSA 286b, . . . , IOSA 286i in a read operation and may provide a driving signal PDT to the I drivers DRV 287a, DRV 287b, . . . , DRV 287i. The timing control circuit 460 may provide the first column decoder 270 with repair information RPIN associated with defective memory cells in each sub array block SCB.

The first row decoder 260a may select one of word-lines based on the row address SRA.

The first column decoder 270a may include a plurality of sub column decoders SCD1 851, SCD2 852, . . . , -SCDI 85I and a plurality of repair circuits 801, 802, . . . , 80I. Each of the sub column decoders SCD1 851, SCD2 852, . . . , SCDI 85I may be connected to corresponding one of the sub array blocks and the plurality of repair circuits 801, 802, . . . , 80I may correspond to the plurality of sub column decoders SCD1 851, SCD2 852, . . . , SCDI 85I-. Each of the repair circuits 801, 802, . . . , 80I may selectively activate a repair signal CREN in response to the column address COL_ADDR and the repair information RPIN to provide the repair signal CREN to corresponding one of the sub column decoders SCD1 851, SCD2 852, . . . , SCDI 85I. Each of the sub column decoders SCD1 851, SCD2 852, . . . , SCDI 85I may selectively activate column selection signals CSL or spare column selection signals SCSL in response to the repair signal CREN. When the repair signal CREN is deactivated, each of the sub column decoders SCD1 851, SCD2 852, . . . , SCDI 85I may activate (or, select) the column selection signals CSL. When the repair signal CREN is activated, each of the sub column decoders SCD1 851, SCD2 852, . . . , SCDI 85I may activate the spare column selection signals SCSL. Each of the sub repair circuits 801, 802, . . . , 80I may provide a local sense enable signal PCLSAE and an isolation signal ISO to a corresponding sub array block SCB based on a first flag signal ACU_FG. The control logic circuit 210 may provide the first column decoder 270a with the first flag signal ACU_FG that is activated during a first time interval, in response to receiving the first command that designates updating the count data An example of a portion 390 in the first bank array 310a is described with reference to FIG. 13 below.

Figure 13:
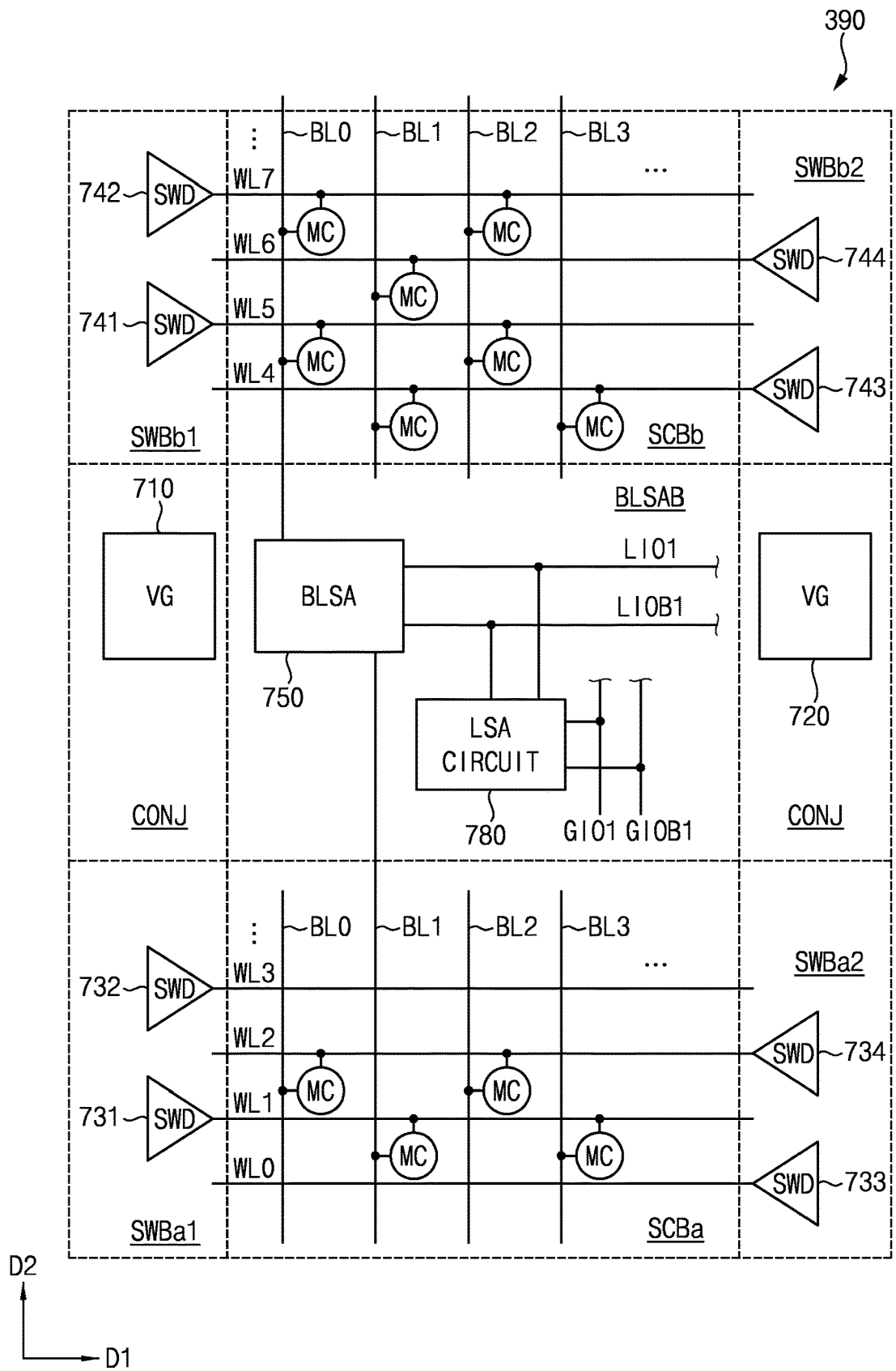
FIG. 13 illustrates a portion of the first bank array of FIG. 12 according to an embodiment.

FIG. 13 illustrates a portion of the first bank array of FIG. 12 according to example embodiments.

Referring to FIGS. 12 and 13, in the portion 390 of the first bank array 310a, sub-array blocks SCBa and SCBb, the bit-line sense amplifier regions BLSAB, four sub word-line driver regions SWBa1, SWBa2, SWBb1 and SWBb2 and two of the conjunction regions CONJ are disposed.

The sub-array block SCBa may include a plurality of word-lines WL0-WL3 extending in the second direction D2 and a plurality of bit-lines BL0-BL3 extending in the first direction D1. The sub-array block SCBa may include a plurality of memory cells MC disposed at intersections of the word-lines WL0-WL3 and the bit-lines BL0-BL3. The sub-array block SCBb may include a plurality of word-lines WL4-WL7 extending in the second direction D2 and the plurality of bit-lines BL0-BL3 extending in the first direction D1. The sub-array block SCBb may include a plurality of memory cells MC disposed at intersections of the word-lines WL4-WL7 and the bit-lines BL0-BL3.

With reference to FIG. 13, the sub word-line driver regions SWBa1 and SWBa2 may include a plurality of sub word-line drivers 731, 732, 733 and 734 that respectively drive the word-lines WL0-WL3. The sub word-line driver regions SWBb1 and SWBb2 may include a plurality of sub word-line drivers 741, 742, 743 and 744 that respectively drive the word-lines WL4-WL7.

The bit-line sense amplifier region BLSAB may include a bit-line sense amplifier BLSA 750 coupled to the bit-line BL0 in the sub array block SCBb and the bit-line BL1 in the sub array block SCBa, and a local sense amplifier LSA circuit 780. The bit-line sense amplifier 750 may sense and amplify a voltage difference between the bit-lines BL0 and BL1 to provide the amplified voltage difference to a local I/O line pair LIO1 and LIOB1.

The local sense amplifier circuit 780 may control electrical connection between the local I/O line pair LIO1 and LIOB1 and a global I/O line pair GIO1 and GIOB1.

As illustrated in FIG. 13, the conjunction regions CONJ may be disposed adjacent to the bit-line sense amplifier region BLSAB and the sub word-line driver regions SWBa1, SWBb1, SWBa2 and SWBb2. Voltage generators 710 and 720 may be disposed in the conjunction regions CONJ.

Figure 14:
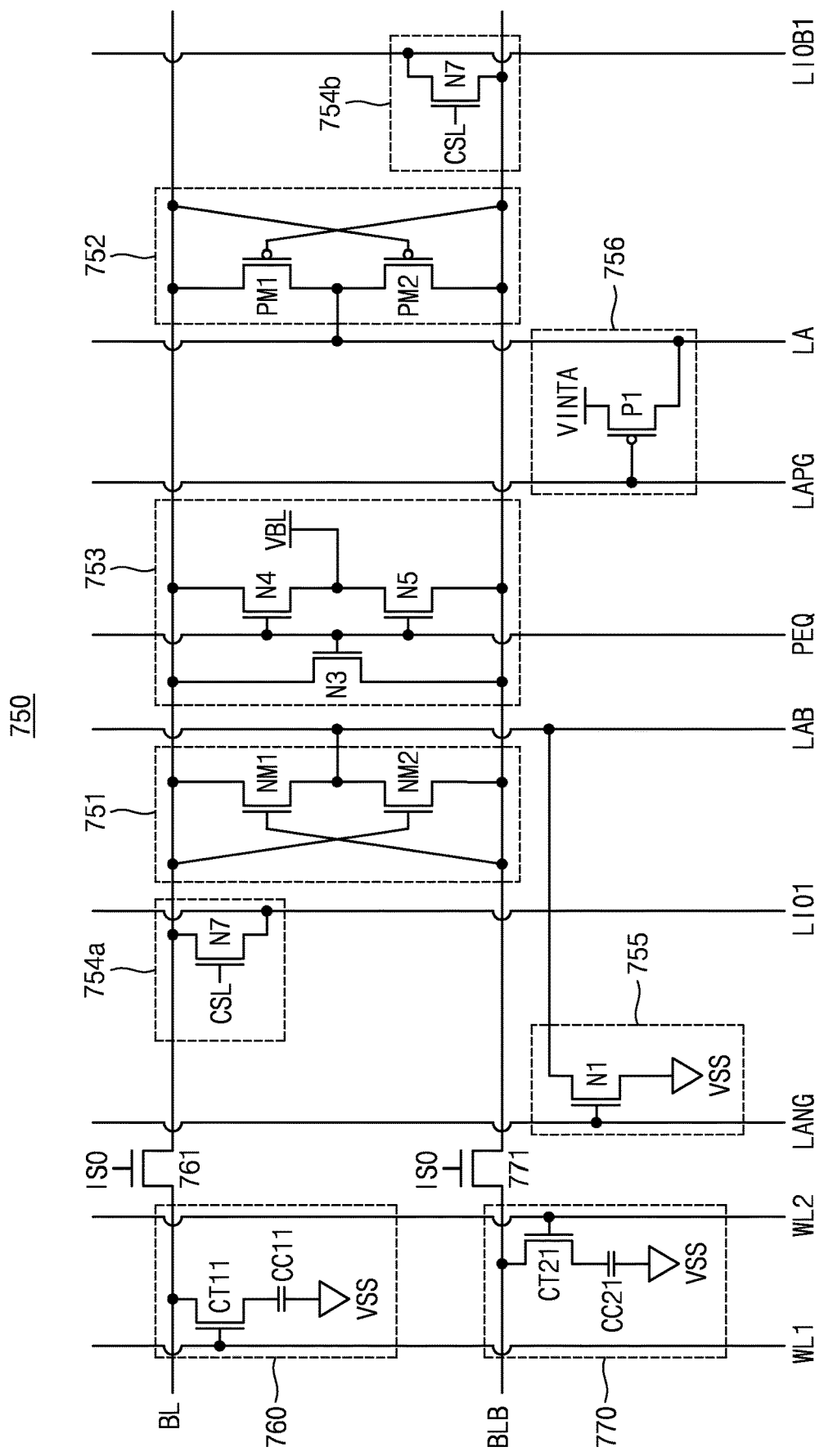
FIG. 14 is a circuit diagram illustrating the bit-line sense amplifiers of FIG. 13, according to an embodiment.

FIG. 14 is a circuit diagram illustrating the bit-line sense amplifiers of FIG. 13, according to example embodiments.

Referring to FIG. 14, the bit-line sense amplifier 750 is coupled to bit-lines BL and BLB of each of memory cells 760 and 770 in the memory cell array 310 through isolation transistors 761 and 771. The isolation transistors 761 and 771 may connect the bit-lines BL and BLB to the bit-line sense amplifier 750 in response to an isolation signal ISO. The memory cell 760 may be connected to the bit-line BL1 and a word-line WL1, and the memory cell 770 may be connected to the bit-line BLB and a word-line WL2. The bit-line sense amplifier 750 may include an N-type sense amplifier (NSA) 751, a P-type sense amplifier (PSA) 752, a pre-charge circuit 753, column select switches 754a and 754b, an NSA driver 755, and a PSA driver 756.

The NSA 751 discharges a low-level bit-line of the bit-lines BL1 and BLB1, which may be a bit-line pair, to a low level during a sensing operation. The NSA 751 includes two NMOS transistors NM1 and NM2. A gate of the NMOS transistor NM1 is connected to the bit-line BLB1, which may be a second bit line, and a drain of the NMOS transistor NM1 is connected to the bit-line BL1, which may be a first bit line, and a source of the NMOS transistor NM1 is connected to a sense enable line LAB. The NMOS transistor NM2 has a gate connected to the bit-line BL1, a drain connected to the sense enable line LAB, and a source connected to the bit-line BLB1. The NSA 751 connects a low-level bit-line to the sense enable line LAB. The sense enable line LAB is connected to the ground voltage VSS.

The PSA 752 charges a high-voltage bit-line of the bit-lines BL1 and BLB1 with a first power supply voltage VINTA level at a sensing operation. The PSA 752 includes two PMOS transistors PM1 and PM2. The PMOS transistor PM1 has a gate connected to the bit-line BLB1, a source connected to the bit-line BL1, and a drain connected to a sense enable line LA. The PMOS transistor PM2 has a gate connected to the bit-line BL1, a source connected to sense enable line LA, and a drain connected to the bit-line BLB1.

The PSA 752 charges a high-voltage bit-line of the bit-lines BL1 and BLB1 with the first power supply voltage VINTA provided to the sense enable line LA.

The PSA driver 756 provides a charging voltage VINTA to the sense enable line LA. Therefore, the transistor PM2 may be turned off because the gate of the transistor PM2 is coupled to the bit-line BL1 with a voltage increased by the charge sharing.

The pre-charge circuit 753 pre-charges the bit-lines BL1 and BLB1 with a half voltage VINTA/2 in response to a control signal PEQ in sensing operation. When the control signal PEQ is activated, the pre-charge circuit 753 supplies a bit-line pre-charge voltage VBL to the bit-lines BL1 and BLB1. The bit-line pre-charge voltage VBL may be a half voltage VDD/2. The bit-lines BL1 and BLB1 are connected such that their voltages are equalized. If the bit-lines BL1 and BLB1 are charged by the pre-charge level VBL, the control signal PEQ is inactivated or deactivated. The pre-charge circuit 653 includes NMOS transistors N3, N4, and N5.

The column select switches 754a and 754b provide data sensed by the NSA 751 and PSA 752 to local I/O lines LIO1 and LIOB1 in response to a column selection signal CSL. The column select switches 754a and 754b are turned on such that the sensed data is transferred to the local I/O lines LIO1 and LIOB1. For example, in a read operation when sensing levels of the NSA 751 and PSA 752 are stabilized, a column selection signal CSL is activated. Then the column select switches 754a and 754b are turned on such that the sensed data is transferred to the local I/O line pair LIO1 and LIOB1. Voltages of the bit-lines BL1 and BLB1 are varied when charges of bit-lines BL1 and BLB1 are shared with the local I/O lines LIO1 and LIOB1. The column select switch 754a includes NMOS transistor N6, and the column select switch 754b includes NMOS transistor N7.

The NSA driver 755 provides a driving signal to the sense enable line LAB of the NSA 751. Based on the control signal LANG, the NSA driver 755 grounds the sense enable line LAB. The NSA driver 755 includes the ground transistor N1 to control a voltage of the sense enable line LAB. The PSA driver 756 provides the charge voltage VINTA to the sense enable line LA of the PSA 752. The PSA driver 756 includes the PMOS transistor P1 to control a voltage of the sense enable line LA. The control signals LAPG and LANG are complementary to each other.

Figure 15:
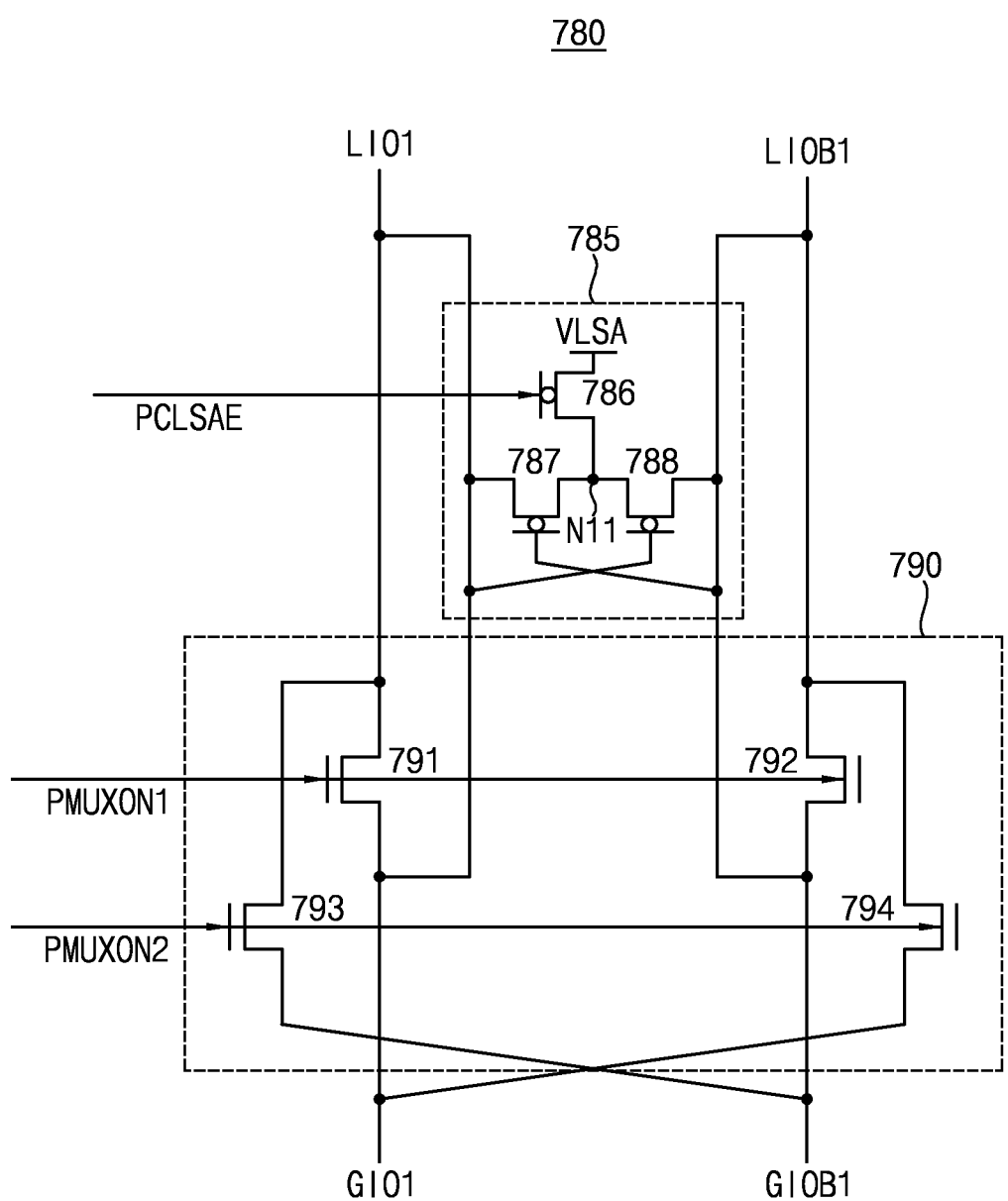
FIG. 15 illustrates an example of the local sense amplifier circuit of FIG. 13 according to an embodiment.

FIG. 15 illustrates an example of the local sense amplifier circuit of FIG. 13 according to example embodiments.

Referring to FIG. 15, the local sense amplifier circuit 780 includes a local sense amplifier 785 and a local I/O line controller 790.

The local sense amplifier 785 amplifies a voltage difference between the local I/O line pair LIO1 and LIOB1 in response to a local sense enable signal PCLSAE to provide the amplified voltage difference to a global I/O line pair GIO1 and GIOB1.

The local sense amplifier 785 may include first through third PMOS transistors 786, 787 and 788. The first PMOS transistor 786 may be coupled between a second power supply voltage VLSA and a first node N11, and may have a gate to receive the local sense amplifier signal PCLSAE. The second PMOS transistor 787 may be coupled between the first node N11 and the local I/O line LIO1, and may have a gate coupled to a complementary local I/O line LIOB1. The third PMOS transistor 788 may be coupled between the first node N11 and the complementary local I/O line LIOB1, and may have a gate coupled to the local I/O line LIO1.

The local I/O line controller 790 includes first through fourth NMOS transistors 791, 792, 793 and 794, and controls connection between the local I/O line pair LIO1 and LIOB1 and the global I/O line pair GIO1 and GIOB1 in response to a first connection control signal PMUXON1 and a second connection control signal PMUXON2.

For example, when each of the local sense enable signal PCLSAE, the first connection control signal PMUXON1, and the second connection control signal PMUXON2 is a low level the local sense amplifier 785 is disabled and the local I/O line controller 790 cuts off the connection between the local I/O line pair LIO1 and LIOB1 and the global I/O line pair GIO1 and GIOB1.

For example, when each of the first local sense enable signal PCLSAE, the first connection control signal PMUXON1, and the second connection control signal PMUXON2 has a logic high level, the local sense amplifier 785 is enabled and the local I/O line controller 790 provides the connection between the local I/O line pair LIO1 and LIOB1 and the global I/O line pair GIO1 and GIOB1.

Figure 16:
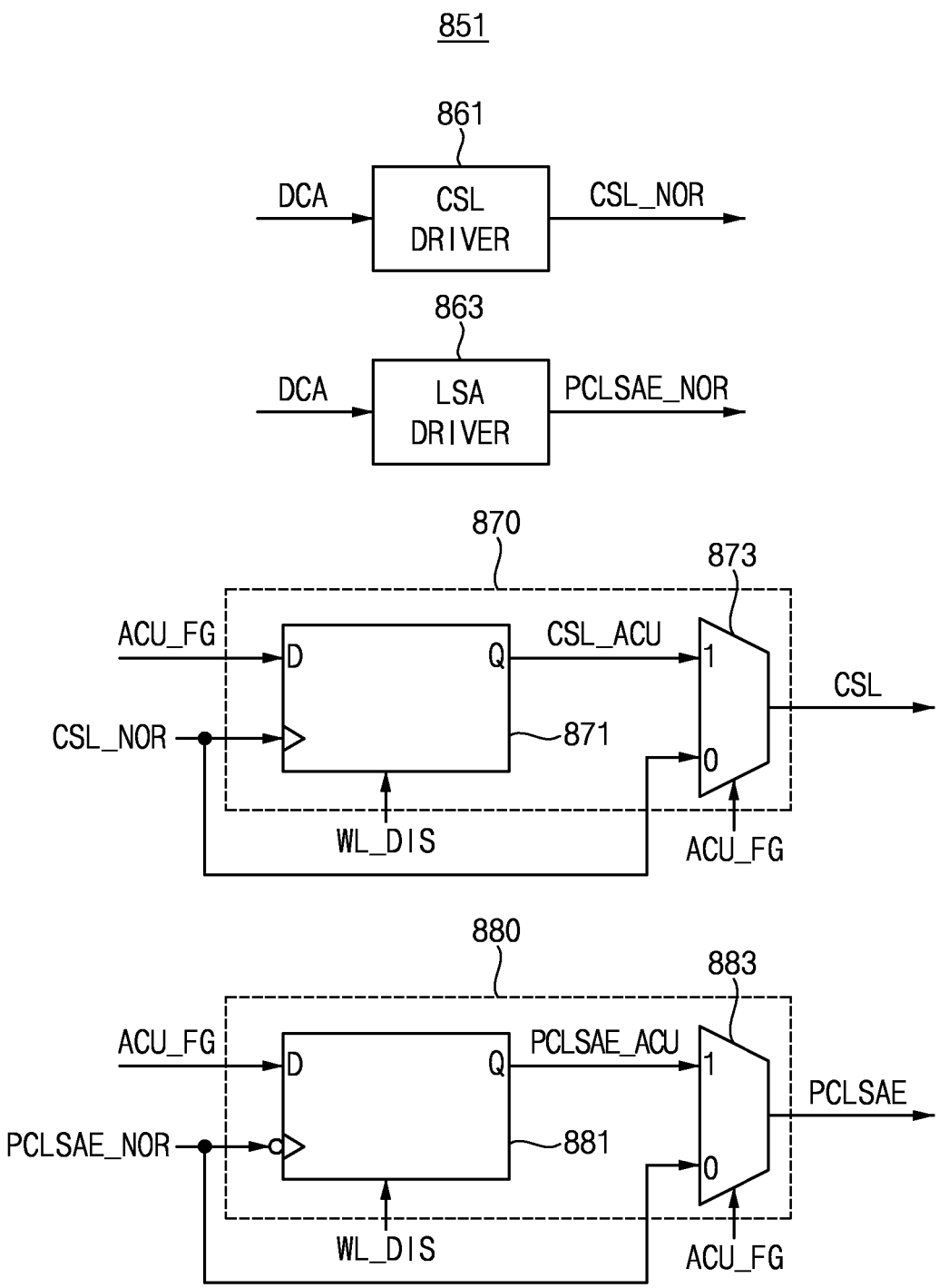
FIG. 16 illustrates one of the plurality of sub column decoders of FIG. 12 according to an embodiment.

FIG. 16 illustrates one of the plurality of sub column decoders of FIG. 12 according to example embodiments.

In particular, FIG. 16 illustrates a configuration of a first sub column decoder SDC1 851. In embodiments, a configuration of each of the sub column decoders SCD2 852-SCDI 851 may be substantially the same as the illustrated configuration of the first sub column decoder SCD1 851.

Referring to FIG. 16, the first sub column decoder SCD1 851 may include a column selection line (CSL) driver 861, an LSA driver 863, a first signal generator 870 and a second signal generator 880.

The CSL driver 861 may generate a first column selection CSL_NOR signal associated with storing the data. The LSA 863 may generate a first local sense enable signal PCLSAE_NOR associated with storing the data and enabling a first local sense amplifier.

The first signal generator 870 may generate a second column selection signal CSL_ACU associated with storing the count data based on the first column selection signal CSL_NOR and the first flag signal ACU_FG, and may provide one of the first column selection signal CSL_NOR and the second column selection signal CSL_ACU as a column selection signal CSL.

The second signal generator 880 may generate a second local sense enable signal PCLSAE_ACU associated with storing the count data and enabling the first local sense amplifier based on the first local sense enable signal PCLSAE_NOR and the first flag signal ACU_FG, and may provide one of the first local sense enable signal PCLSAE_NOR and the second local sense enable signal PCLSAE_ACU as a local sense enable signal PCLSAE.

The first signal generator 870 may include a first latch 871 and a first multiplexer 873.

The first latch 871 may have an input terminal D to receive the first flag signal ACU_FG, an output terminal Q to output the second column selection signal CSL_ACU and a clock terminal to receive the first column selection signal CSL_NOR. The first latch 871 may latch the first flag signal ACU_FG in response to a rising transition of the first column selection signal CSL_NOR to provide the second column selection signal CSL_ACU. The first multiplexer 873 may provide one of the first column selection signal CSL_NOR and the second column selection signal CSL_ACU as the column selection signal CSL based on the first flag signal ACU_FG. The first latch 871 may be disabled in response to a disablement WL_DIS of a word-line.

The first multiplexer 873 may select the first column selection signal CSL_NOR as the column selection signal CSL in response to the flag signal ACU_FG having a second logic level (e.g., a logic low level) and may select the second column selection signal CSL_ACU as the column selection signal CSL in response to the flag signal ACU_FG having a first logic level (e.g., a logic high level).

The second signal generator 880 may include a second latch 881 and a second multiplexer 883.

The second latch 881 may have an input terminal D to receive the first flag signal ACU_FG, an output terminal Q to output the second local sense enable signal PCLSAE_ACU and an inverted clock terminal to receive the first local sense enable signal PCLSAE_NOR. The second latch 881 may latch the first flag signal ACU_FG in response to a falling transition of the first local sense enable signal PCLSAE_NOR to provide the second local sense enable signal PCLSAE_ACU. The second multiplexer 883 may provide one of the first local sense enable signal PCLSAE_NOR and the second local sense enable signal PCLSAE_ACU as the local sense enable signal PCLSAE based on the first flag signal ACU_FG. The second latch 881 may be disabled in response to a disablement WL_DIS of a word-line.

The second multiplexer 883 may select the first local sense enable signal PCLSAE_NOR as the local sense enable signal PCLSAE in response to the flag signal ACU_FG having a second logic level (e.g., a logic low level) and may select the second local sense enable signal PCLSAE_ACU as the local sense enable signal PCLSAE in response to the flag signal ACU_FG having a first logic level (e.g., a logic high level).

Figure 17:
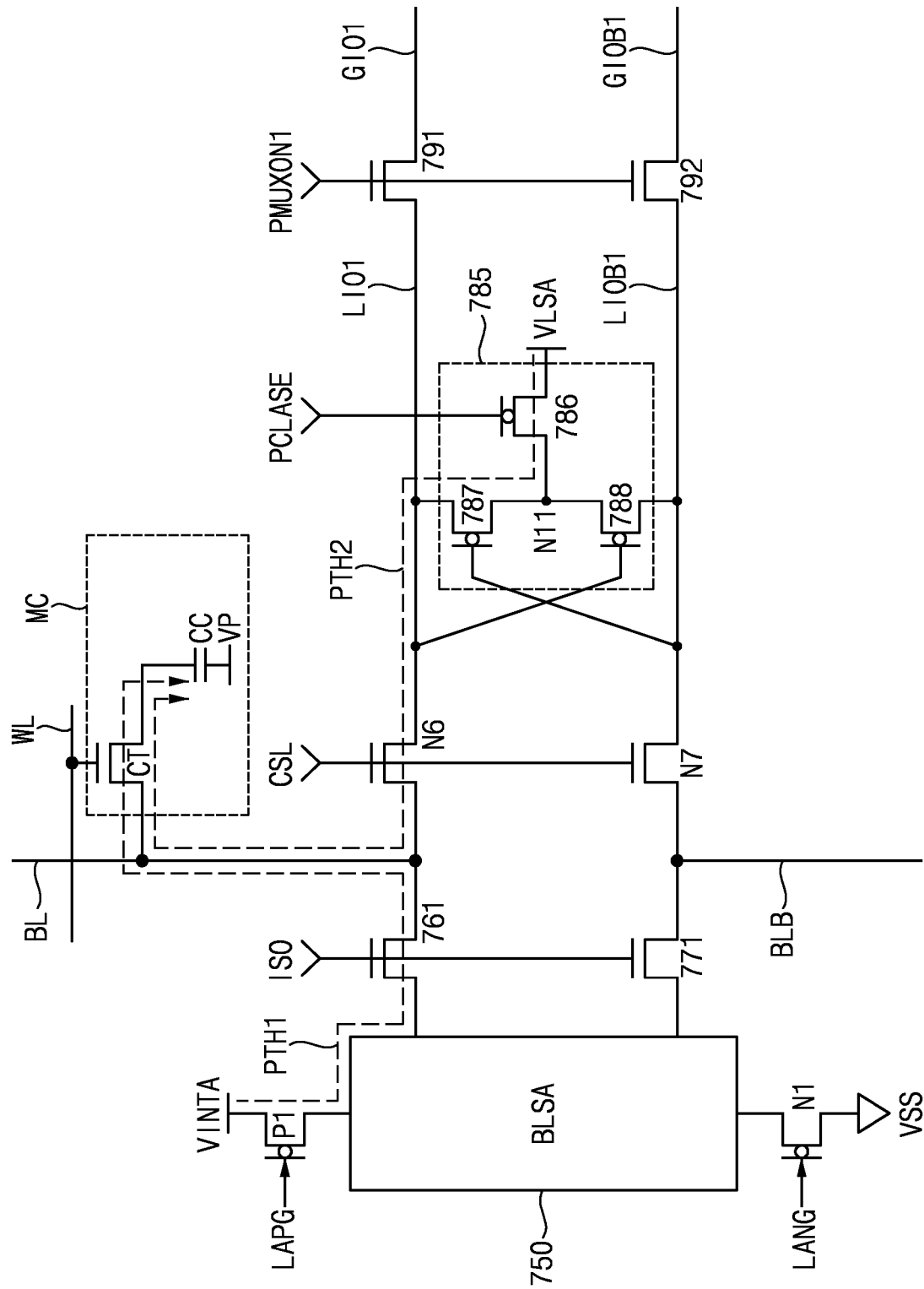
FIG. 17 illustrates a portion of the semiconductor memory device of FIG. 12 according to an embodiment.

FIG. 17 illustrates a portion of the semiconductor memory device of FIG. 12 according to example embodiments.

In FIG. 17, the memory cell MC, the bit-line sense amplifier 750, the local sense amplifier 785 and NMOS transistors 791 and 792 in the local I/O line controller 790 of FIG. 15.

The bit-line sense amplifier 750 may be coupled between the first power supply voltage VINTA and a ground voltage VSS through the PMOS transistor P1 and the NMOS transistor N1, respectively, the control signal LAPG is applied to the gate of the PMOS transistor P1 and the control signal LANG is applied to the gate of the NMOS transistor N1.

The bit-line sense amplifier 750 may be coupled to the bit-line BL and the complementary bit-line BLB through the isolation transistors 761 and 771, and the isolation transistors 761 and 771 may be selectively turned-on, or otherwise activated, in response to the isolation signal ISO.

The local sense amplifier 785 may be coupled to the bit-line BL and the complementary bit-line BLB through the column selection switches N6 and N7, and the column selection switches N6 and N7 may be selectively turned-on or activated in response to the column selection signal CSL.

The memory cell MC may be coupled to the bit-line BL and the word-line WL. The memory cell MC may include a cell transistor CT coupled to the bit-line BL and the word-line WL and a cell capacitor CC coupled between the cell transistor CT and a plate voltage VP. A logic level of a data bit stored in the cell capacitor CC may be determined based on whether charges are stored in the cell capacitor CC or not.

The local sense amplifier 785 amplifies a voltage difference between the local I/O line pair LIO1 and LIOB1 in response to the local sense enable signal PCLSAE to provide the amplified voltage difference to the global I/O line pair GIO1 and GIOB1.

The local sense amplifier 785 may include the first through third PMOS transistors 786, 787 and 788. The first PMOS transistor 786 may be coupled between the second power supply voltage VLSA and the first node N11, and may have a gate to receive the local sense amplifier signal PCLSAE. The second PMOS transistor 787 may be coupled between the first node N11 and the local I/O line LIO1, and may have a gate coupled to a complementary local I/O line LIOB1. The third PMOS transistor 788 may be coupled between the first node N11 and the complementary local I/O line LIOB1, and may have a gate coupled to the local I/O line LIO1.

When the memory cell MC is selected as a normal memory cell to store data having a logic high level, the sub column decoder 851 of FIG. 12 may perform a normal write operation to store charges based on the first power supply voltage VINTA in the cell transistor CC through a first path PTH1 by turning on the PMOS transistor P1 using the control signal LAPG and by turning on the isolation transistor 761 using the isolation signal ISO.

When the memory cell MC is selected as a count cell to store count data having a logic high level, the sub column decoder 851 of FIG. 12 may perform an internal write operation to store charges based on the second power supply voltage VLSA in the cell transistor CC through a second path PTH2 by turning on the column selection switch N6 using the column selection signal CSL and by activating the local sense enable signal PCLASE with a logic low level to turn on the first PMOS transistor 786.

Because a voltage level of the second power supply voltage VLSA is greater than a voltage level of the first power supply voltage VINTA, an amount of the charges based on the second power supply voltage VLSA is greater than an amount of the charges based on the first power supply voltage VINTA, and thus the internal write operation may be performed during a second write time interval smaller than a first write time interval during which the normal write operation is performed.

In addition, when the memory cell MC is selected as the count cell to store the count data having a logic high level, the sub column decoder 851 of FIG. 12 may increase a voltage level of the column selection signal CSL and thus, may reduce the second write time interval associated with the internal write operation.

Figure 18A:
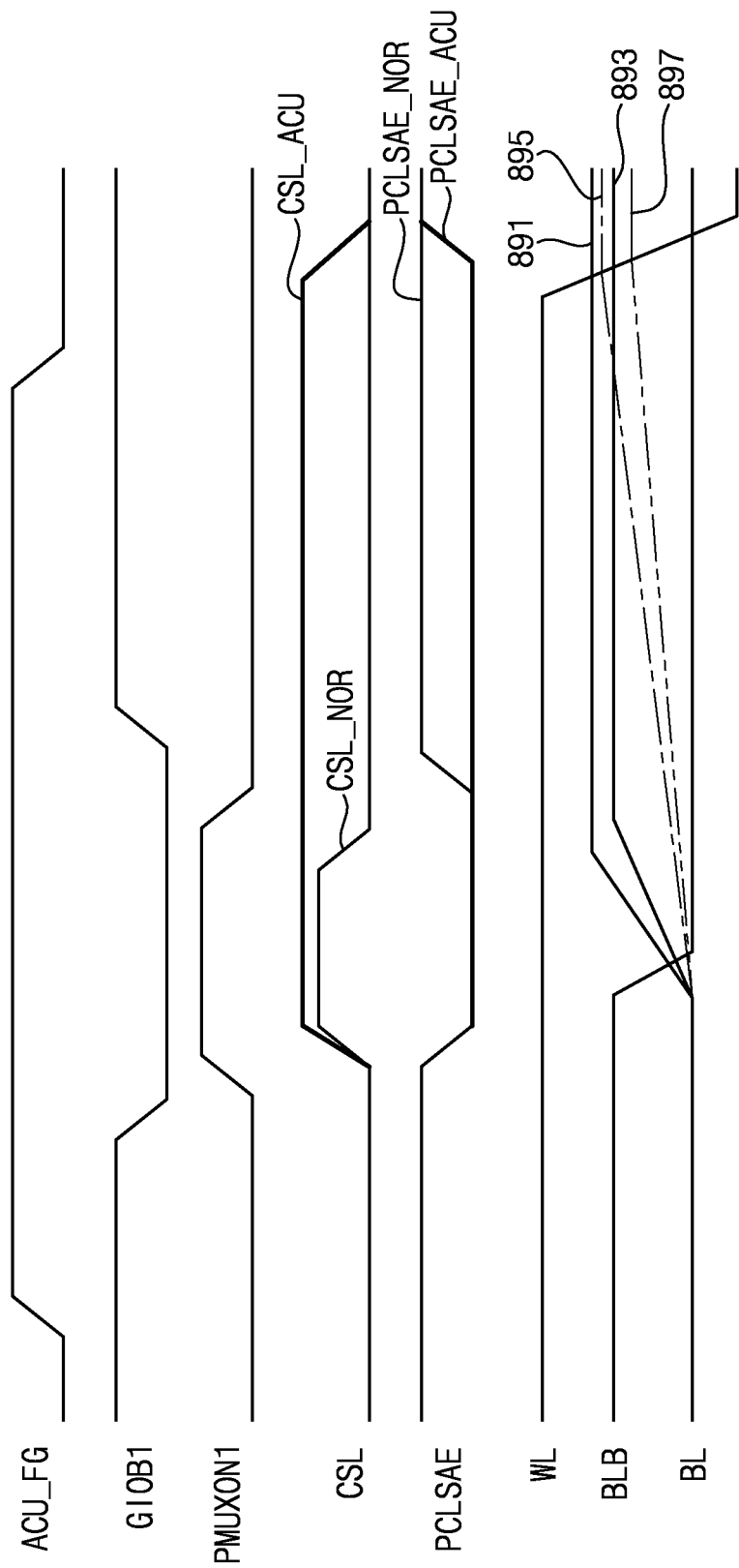
FIG. 18A is a timing diagram illustrating an operation of the semiconductor memory device according to an embodiment.

FIG. 18A is a timing diagram illustrating an operation of the semiconductor memory device according to example embodiments.

Referring to FIGS. 3 and 16 through 18A, when the word-line WL coupled to the memory cell MC is enabled and the memory cell MC is selected as a count cell, the first flag signal ACU_FG is activated during a first time interval. While data having a logic low level is input through the complementary global I/O line GIOB1 (and data having a logic high level is input through the global I/O line GIO1), the first connection control signal PMUXON1 is activated with a logic high level and the NMOS transistors 791 and 792 are turned-on or activated. Accordingly, the global I/O line GIO1 is connected to the local I/O line LIO1 and the complementary global I/O line GIO1B is connected to the complementary local I/O line LIO1B. In addition, when the column selection switches N6 and N7 are turned-on or activated in response to the column selection signal CSL, the local I/O line LIO1 is connected to the bit-line BL and the complementary local I/O line LIO1B is connected to the complementary bit-line BLB. When the second local sense enable signal PCLSAE_ACU, selected as the local sense enable signal PCLSAE, is activated with a logic low level, the charges based on the second power supply voltage VLSA are stored in the cell capacitor CC through the second path PTH2 and thus, the count data may be stored in the memory cell MC selected as the count cell during the second write time interval. Accordingly, a voltage level of the cell capacitor CC may increase as indicated by reference numeral 895. Reference numeral 891 denotes a voltage level of the bit-line BL when the second power supply voltage VLSA is used.

When the memory cell MC is selected as a normal memory cell, the first column selection signal CSL_NOR selected as the column selection signal CSL is activated and the column selection transistors N6 and N7 are turned-on or activated. Accordingly, the local I/O line LIO1 is connected to the bit-line BL and the complementary local I/O line LIO1B is connected to the complementary bit-line BLB. When the first local sense enable signal PCLSAE_NOR, selected as the local sense enable signal PCLSAE, is activated with a logic low level, the charges based on the first power supply voltage VINTA are stored in the cell capacitor CC through the first path PTH1 and thus, the data may be stored in the memory cell MC selected as the normal memory cell during the first write time interval. Accordingly, a voltage level of the cell capacitor CC may increase as indicated by reference numeral 897. Reference numeral 893 denotes a voltage level of the bit-line BL when the first power supply voltage VINTA is used.

As shown in FIG. 18A, an activation interval of the second column selection signal CSL_ACU may be greater than an activation interval of the first column selection signal CSL_NOR and an activation interval of the second local sense enable signal PCLSAE_ACU may be greater than an activation interval of the first local sense enable signal PCLSAE_NOR.

Figure 18B:
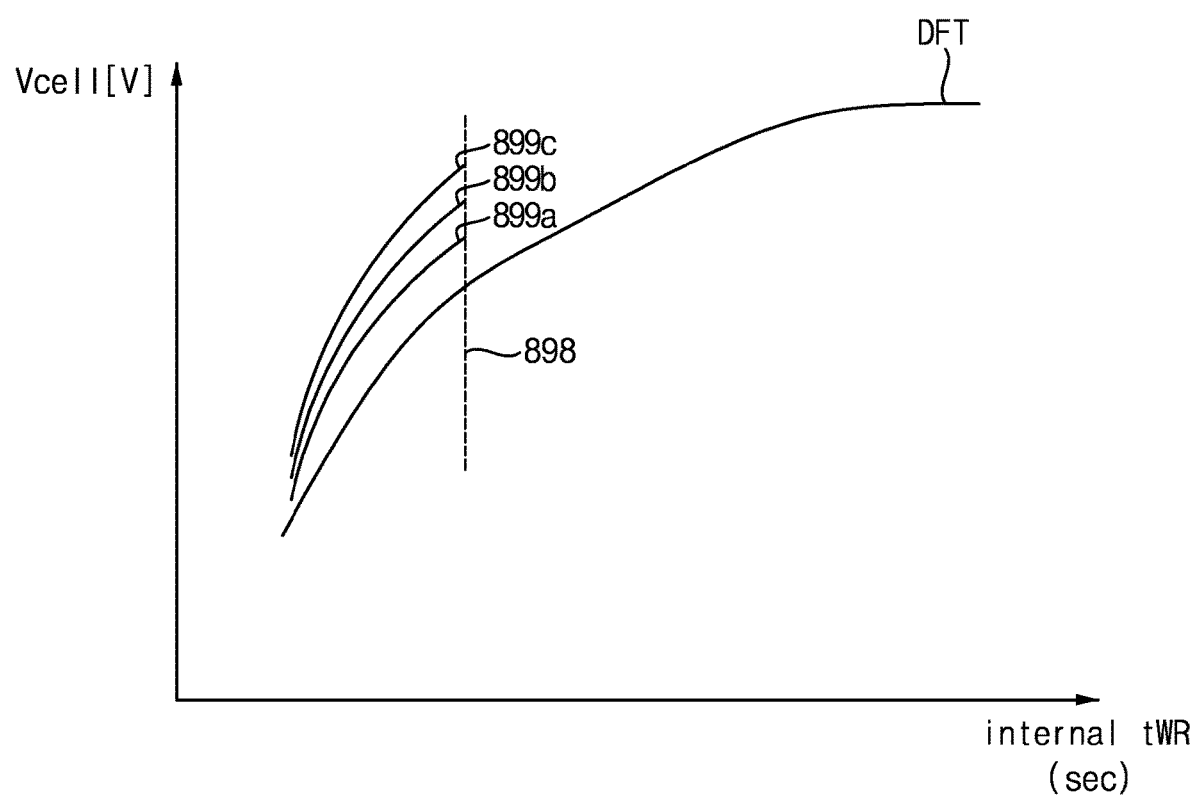
FIG. 18B is a graph illustrating a voltage level of the cell capacitor as a voltage level of the column selection signal varies in FIG. 17, according to an embodiment.

FIG. 18B is a graph illustrating a voltage level of the cell capacitor as a voltage level of the column selection signal varies in FIG. 17.

In FIG. 18B, reference numeral DFT denotes a voltage level Vcell of the cell capacitor CC when a voltage level of the column selection signal CSL is maintained, reference numerals 899a, 899b and 899c denote the voltage level Vcell of the cell capacitor CC when a voltage level of the column selection signal CSL increases gradually, respectively, and internal tWR denotes a time interval from a time point at which the column selection switch N6 is turned-on or activated to a time point at which charges are stored in the cell capacitor CC in the memory cell MC up to a predetermined capacity of the cell capacitor CC (for example, 95% capacity of the cell capacitor CC). The internal tWR may indicate an internal write time interval and may be represented as tRDL.

Referring to FIGS. 17 and 18B, the internal write time interval may be reduced as a voltage level of the column selection signal CSL increases. At a time interval indicated by reference numeral 898, the voltage level Vcell of the cell capacitor CC increases rapidly as the voltage level of the column selection signal CSL increases.

Figure 19:
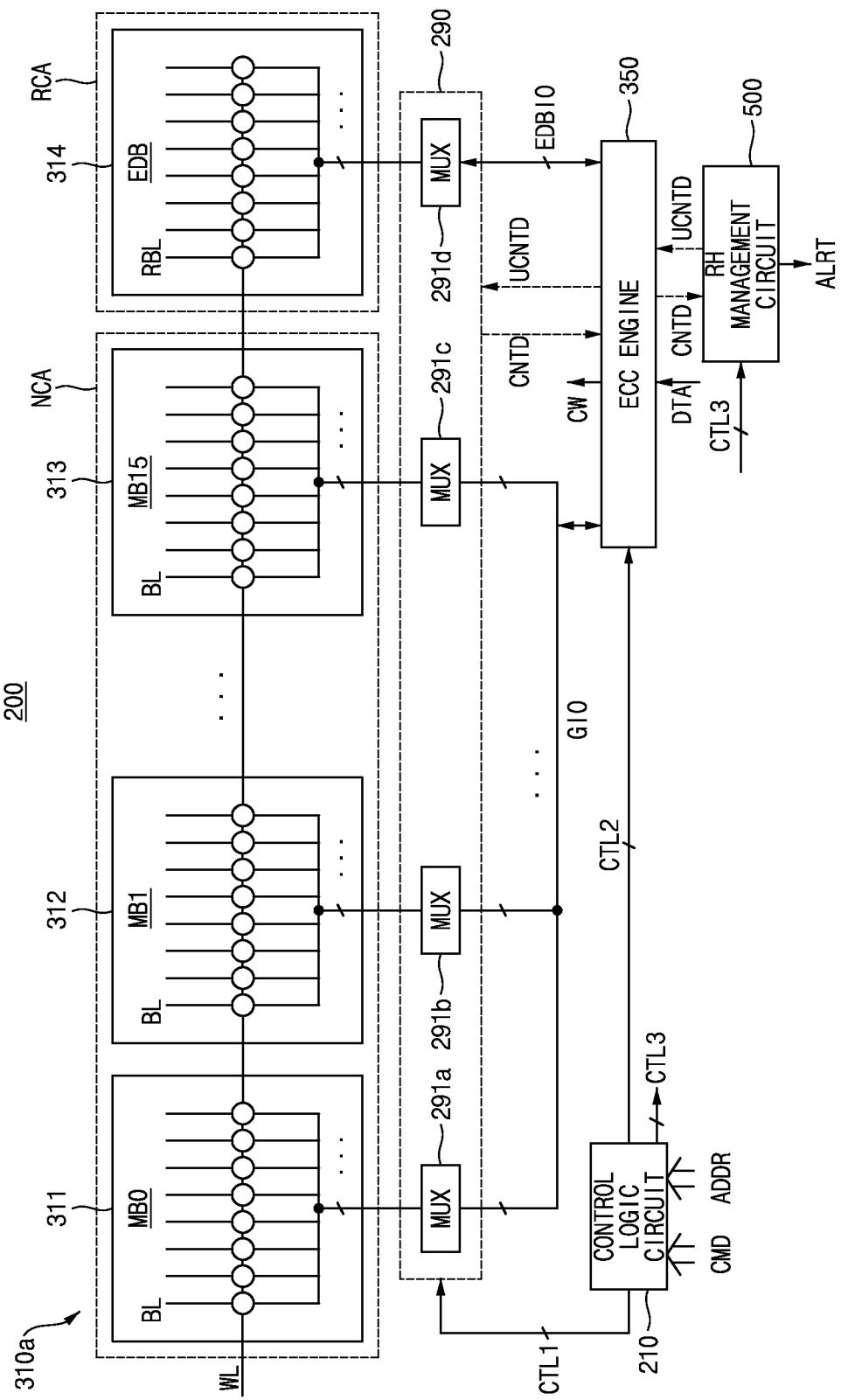
FIG. 19 illustrates a portion of the semiconductor memory device of FIG. 3 for explaining a write operation, according to an embodiment.

FIG. 19 illustrates a portion of the semiconductor memory device of FIG. 3 for explaining a write operation.

In particular, FIG. 19 illustrates examples of the control logic circuit 210, the first bank array 310a, the I/O gating circuit 290, the ECC engine 350 and the row hammer management circuit 500.

Referring to FIG. 19, the first bank array 310a includes a normal cell array NCA and a redundancy cell array RCA.

The normal cell array NCA includes a plurality of first memory blocks MB0 311, MB1 312, . . . MB15 313—and the redundancy cell array RCA includes at least a second memory block 314. The first memory blocks MB0 311, MB1 312, . . . MB15 313—are memory blocks that determine or are used to determine a memory capacity of the semiconductor memory device 200. The second memory block 314 is for ECC and/or redundancy repair. Because the second memory block 314 is used for ECC, data line repair and block repair to repair 'failed' cells generated in the first memory blocks MB0 311, MB1 312, . . . MB15 313—the second memory block 314 is also referred to as an EDB block. Each of the first memory blocks MB0 311, MB1 312, . . . MB15 313—includes memory cells coupled to a word-line WL and bit-lines BL and the second memory block EDB 314 includes memory cells coupled to word-line WL and redundancy bit-lines RBL. The first memory blocks MB0 311, MB1 312, . . . MB15 313—and the second memory block 314 may each correspond to a sub array block SCB of FIG. 12.

The I/O gating circuit 290 includes a plurality of switching circuits 291a-291d respectively connected to the first memory blocks MB0 311, MB1 312, . . . MB15 313—and the second memory block 314.

The ECC engine 350 may be connected to the switching circuits 291a-291d through first data lines GIO and second data lines EDBIO. The control logic circuit 210 may receive the command CMD and the address ADDR and may decode the command CMD to generate the first control signal CTL1 for controlling the switching circuits 291a-291d, the second control signal CTL2 for controlling the ECC engine 350 and the third control signal CTL3 for controlling the row hammer management circuit 500.

When the command CMD is a write command, the control logic circuit 210 provides the second control signal CTL2 to the ECC engine 350. The ECC engine 350 performs the ECC encoding on the data DTA to generate parity data associated with the data DTA and provides the I/O gating circuit 290 with the codeword CW including the data DTA and the parity data. The control logic circuit 210 provides the first control signal CTL1 to the I/O gating circuit 290 such that the codeword CW is stored in a sub-page of the target page in the first bank array 310a.

When the command CMD that is received after the write command corresponds to the active count update command, the control logic circuit 210 provides the first control signal CTL1 to the I/O gating circuit 290 such that the I/O gating circuit 290 reads the count data CNTD and a count parity data associated with the count data CNTD from the target page of the first bank array 310a and provides the count data CNTD and the count parity data to the ECC engine 350. The ECC engine 350 performs an ECC decoding operation on the count data CNTD and the count parity data, corrects an error bit in the count data CNTD and provides the count data CNTD as a corrected count data to the row hammer management circuit 500, based on the second control signal CTL2.

The row hammer management circuit 500 updates the count data CNTD to provide the updated count data UCNTD to the ECC engine 350. The ECC engine 350 performs an ECC encoding on the updated count data UCNTD to generate updated count parity data and stores the updated count data UCNTD and the updated count parity data in the target page through the I/O gating circuit 290.

In embodiments, the ECC engine 350 and row hammer management circuit 500 may perform the internal read-update-write operation to read the count data CNTD, to update the read count data and to write the updated count data, in response to the active count update command and the column decoder 270a of FIG. 12 may reduce the internal write time interval using the second power supply voltage VLSA. In addition, the row hammer management circuit 500, in response to all of the FIFO registers storing the candidate hammer addresses, each of whose number of access is equal to or greater than the reference number of times, may notify the memory controller 30 of states of the FIFO registers by transitioning a logic level of the alert signal ALRT from the first logic level to the second logic level.

Figure 20:
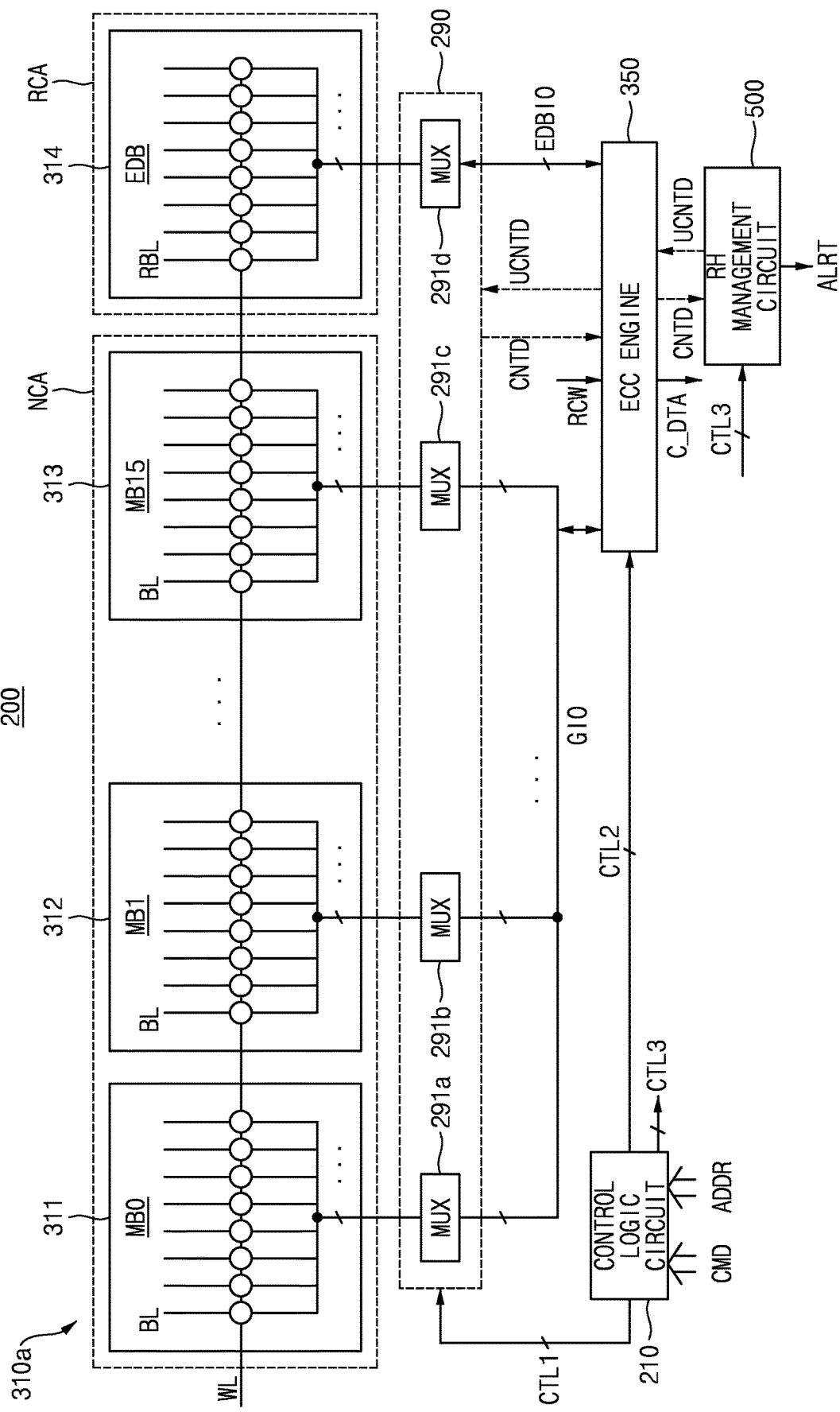
FIG. 20 illustrates a portion of the semiconductor memory device of FIG. 3 for explaining a read operation, according to an embodiment.

FIG. 20 illustrates a portion of the semiconductor memory device of FIG. 3 for explaining a read operation. Description repeated with respect to FIG. 19 may be omitted.

Referring to FIG. 20, when the command CMD is a read command to designate a read operation, the control logic circuit 210 provides the first control signal CTL1 to the I/O gating circuit 290 such that a (read) codeword RCW stored in the sub-page of the target page in the first bank array 310a is provided to the ECC engine 350.

When the command CMD that is received after the write command corresponds to the active count update command, the control logic circuit 210 provides the first control signal CTL1 to the I/O gating circuit 290 such that the I/O gating circuit 290 reads the count data CNTD and a count parity data associated with the count data CNTD from the target page of the first bank array 310a and provides the count data CNTD and the count parity data to the ECC engine 350. The ECC engine 350 performs an ECC decoding operation on the count data CNTD and the count parity data, corrects an error bit in the count data CNTD and provides the count data CNTD as a corrected count data to the row hammer management circuit 500, based on the second control signal CTL2.

The row hammer management circuit 500 updates the count data CNTD to provide the updated count data UCNTD to the ECC engine 350. The ECC engine 350 performs an ECC encoding on the updated count data UCNTD to generate updated count parity data and stores the updated count data UCNTD and the updated count parity data in the target page through the I/O gating circuit 290.

For example, the ECC engine 350 and row hammer management circuit 500 may perform the internal read-update-write operation to read the count data CNTD, to update the read count data and to write the updated count data, in response to the active count update command, and the column decoder 270a of FIG. 12 may reduce the internal write time interval using the second power supply voltage VLSA. In addition, the row hammer management circuit 500, in response to all of the FIFO registers storing the candidate hammer addresses, each of which have been accessed a number of times equal to or greater than the reference number of times, may notify the memory controller 30 of states of the FIFO registers by transitioning a logic level of the alert signal ALRT from the first logic level to the second logic level.

Figure 21:
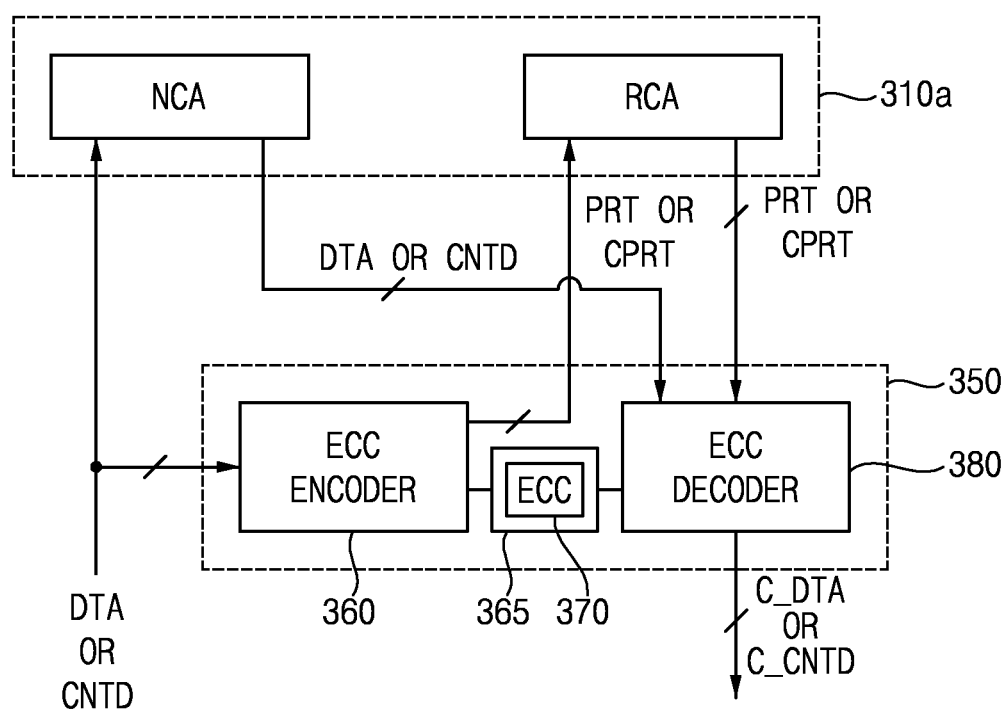
FIG. 21 is a block diagram illustrating an example of the ECC engine in the semiconductor memory device of FIG. 19 or FIG. 20 according to an embodiment.

FIG. 21 is a block diagram illustrating an example of the ECC engine in the semiconductor memory device of FIG. 19 or FIG. 20 according to example embodiments.

Referring to FIG. 21, the ECC engine 350 may include an ECC encoder 360, an ECC decoder 380 and an ECC memory 365. The ECC memory 365 may store an ECC 370. The ECC 370 may be a single error correction (SEC) code or a single error correction/double error detection (SECDED) code.

The ECC encoder 360 may receive the data DTA from the data I/O buffer 320 and generate parity data PRT using the ECC 370, associated with the data DTA to be stored in the normal cell array NCA of the first bank array 310a. The parity data PRT may be stored in the redundancy cell array RCA of the first bank array 310a. In addition, the ECC encoder 360 may receive the count data CNTD as an updated count data UCNTD from the row hammer management circuit 500 and generate count parity data CPRT using the ECC 370, associated with the count data CNTD (e.g., updated count data UCNTD) to be stored in the normal cell array NCA of the first bank array 310a. The count parity data CPRT may be stored in the redundancy cell array RCA of the first bank array 310a.

The ECC decoder 380 may perform an ECC decoding operation on a read data DTA based on the read data DTA and the parity data PRT read from the first bank array 310a using the ECC 370. When the read data DTA includes an error bit as a result of the ECC decoding, the ECC decoder 380 may correct the error bit in the read data DTA and may provide a corrected data C_DTA to the data I/O buffer 320.

In addition, the ECC decoder 380 may perform an ECC decoding operation on the count data CNTD based on the count data CNTD and the count parity data CPRT read from the first bank array 310a using the ECC 370. When the count data CNTD includes an error bit as a result of the ECC decoding, the ECC decoder 380 may correct the error bit in the count data CNTD and may provide a corrected count data C_CNTD to the row hammer management circuit 500.

Figure 22:
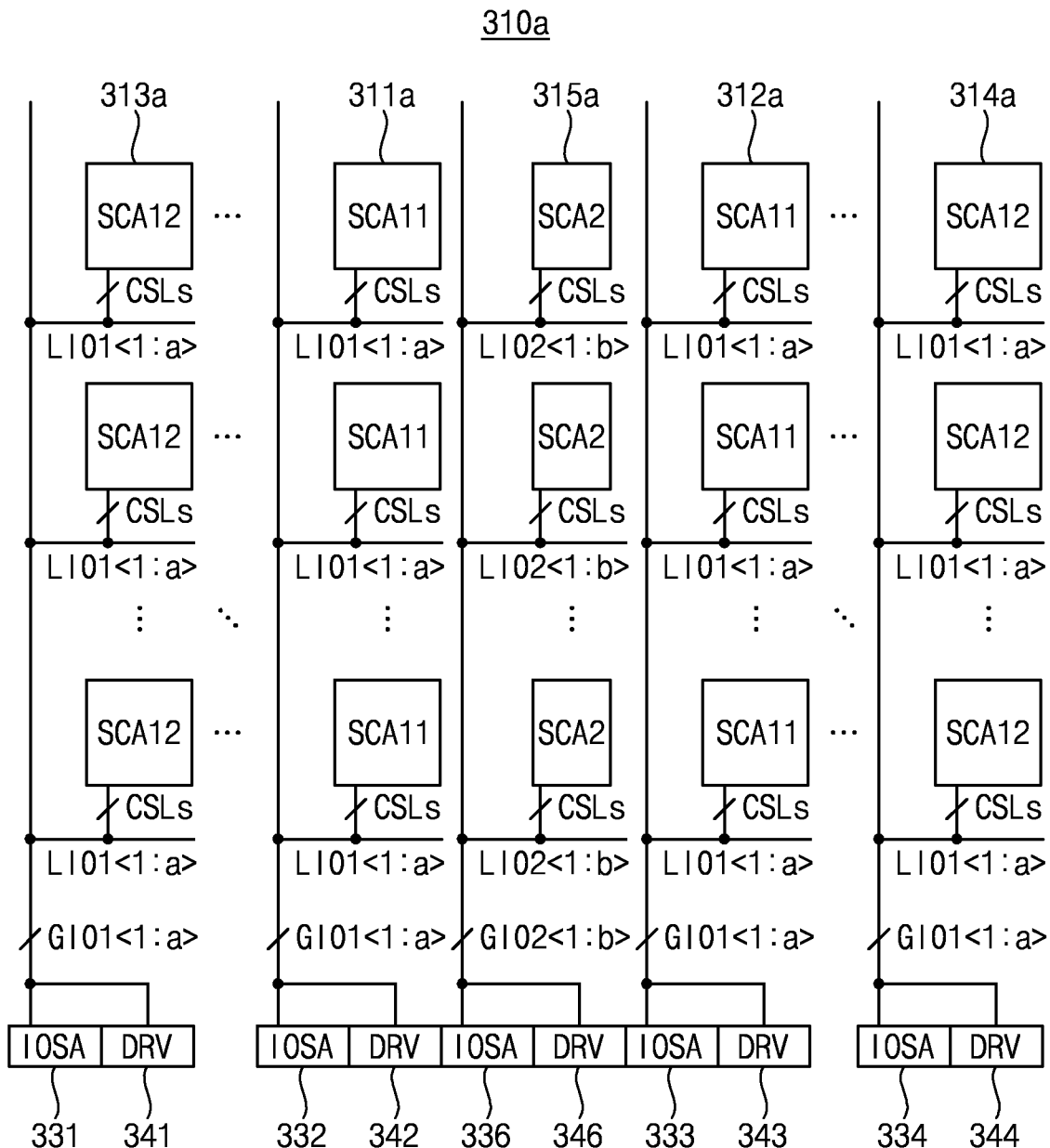
FIG. 22 is a block diagram illustrating an example of the first bank array of FIG. 3 according to an embodiment.

FIG. 22 is a block diagram illustrating an example of the first bank array of FIG. 3 according to example embodiments.

Referring to FIG. 22, a first bank array 310a may include first sub array blocks SCA11 311a and 312a, second sub array blocks SCA12 313a and 314a, third sub array blocks SCA2 315a, I/O sense amplifiers 331, 332, 333, 334 and 336 and drivers 341, 342, 343, 344 and 346.

Data I/O for each of the first sub array blocks SCA11 311a and 312a and the second sub array blocks SCA12 313a and 314a may be performed through first global I/O lines GIO1<1:a> and first local I/O lines LIO1<1:a>. Here, a may be a natural number equal to or greater than 8. Depending on a read command or a write command, a number a of bit-lines of each of the first sub array blocks SCA11 311a and 312a and the second sub array blocks SCA12 313a and 314a disposed in the first direction D1 may be selected by a column select signal transmitted through one of column select lines CSLs. The number of the first sub array blocks SCA11 311a and 312a and the second sub array blocks SCA12 313a and 314a may be different in other embodiments and, for example, may be determined depending on the number of bits of data the semiconductor memory device 200 is able to process.

Data I/O for the third sub array blocks SCA2 315a may be performed through second global I/O lines G1O2<1:b> and second local I/O lines LIO2<1:b>. Here, b may be a natural number smaller than a. Depending on a read command or a write command, a number b of bit-lines of the third sub array blocks SCA2 315a may be selected by a column select signal that is transmitted through one of the column select lines CSLs. The number of the third sub array blocks SCA2 315a may be different in other embodiments.

In example embodiments, the first bank array 310a may further include first sub array blocks, second sub array blocks and third sub array blocks disposed in the second direction D2.

In example embodiments, the first sub array blocks SCA11 311a and 312a may store normal data and the count data, the second sub array blocks SCA12 313a and 314a may store the normal data and the third sub array blocks SCA2 315a may store the parity data and the count parity data. The normal data may be, for example, data that the semiconductor memory device 200 receives from an external device or data that the semiconductor memory device 200 will provide to the external device.

The I/O sense amplifier 331 may sense and amplify voltages of the first global I/O lines GIO1<1:a>, which are determined depending on bits output through the first global I/O lines GIO1<1:a>. Each of the I/O sense amplifiers 332, 333, 334 and 336 may operate in a manner similar to the I/O sense amplifier 331. The I/O sense amplifier 336 may sense and amplify voltages of the second global I/O lines GIO2<1:b>, which are determined depending on bits output through the second global I/O lines GIO2<1:b>.

The driver 341 may provide data to memory cells of the second sub array blocks SCA12 313a through the first global I/O lines GIO1<1:a>, the first local I/O lines LIO1<1:a>, and a number a of bit-lines selected by a column select signal transmitted through one of column select lines CSLs based on a write command. The data may include bits received through one data I/O pin, or may include bits received through a plurality of data I/O pins) aligned at a rising edge or a falling edge of a data strobe signal.

The drivers 342, 343, 344 and 346 may operate in a manner substantially similar to the driver 341. The driver 346 may transmit the parity data or the count parity data to memory cells of the third sub array blocks 315a through the second global I/O lines GIO2<1:b>, the second local I/O lines LIO2<1:b>, and a number b of bit-lines selected by a column select signal transmitted through one of column select lines CSLs.

FIGS. 23 through 25 illustrate example commands which may be used in the memory system of FIG. 1.

FIG. 23 illustrates combinations of a chip selection signal CS_n and first through fourteenth command-address signals CA0-CA13 representing an active command ACT, a write command WR, and a read command RD. FIG. 24 illustrates combinations of the chip selection signal CS_n and the first through fourteenth command-address signals CA0-CA13 representing a write command WRA including an auto precharge and a read command RDA including an auto precharge, and FIG. 25 illustrates combinations of the chip selection signal CS_n and the first through fourteenth command-address signals CA0-CA13 representing precharge commands PREab, PREsb and PREpb.

In FIGS. 23 through 25, H indicates a logic high level, L indicates a logic low level, V indicates a valid logic level corresponding to one of the logic high level H and the logic low level L, R0-R17 indicate bits of a row address, BA0 through BA2 indicate bits of a bank address, BG0 through BG2 indicate bits of a bank group address, and CID0 through CID3 indicate die identifiers of a memory die (or a memory chip) when the semiconductor memory device 200 is implemented with a stacked memory device including a plurality of memory dies. In addition, in FIGS. 23 and 24, C2-C10 indicate bits of a column address, and BLT indicates burst length flag, and in FIG. 24, AP indicates auto precharge flag.

Referring to FIG. 23, the active command ACT, the write command WR and the read command RD may be transferred during two cycles, for example, during the logic high level H and the logic low level L of the chip selection signal CS_n. The active command ACT may include the bank address bits BA0 and BA1 and the row address bits R0-R17.

Referring to FIG. 24, the write command WRA including an auto precharge and the read command RDA including an auto precharge may be transferred during two cycles, for example, during the logic high level H and the logic low level L of the chip selection signal CS_n, and may include the bank address bits BA0 and BA1 and the column address bits C3-C10 or C2-C10. Either the tenth command-address signal CA9 or the eleventh command-address signal CA10 of the write command WRA including an auto precharge and the read command RDA including an auto precharge may be used as an active count update flag.

In FIG. 25, PREpb is a precharge command to precharge a particular bank in a particular bank group, PREab is an all bank precharge command to precharge all banks in all bank groups and PREsb is a same bank precharge command to precharge the same bank in all bank groups.

Referring to FIG. 25, the ninth command-address signal CA8 or the tenth command-address signal CA9 of each of the precharge commands PREab and PREsb may be uses as an active count update flag designating the internal read-update-write operation.

Figure 26:
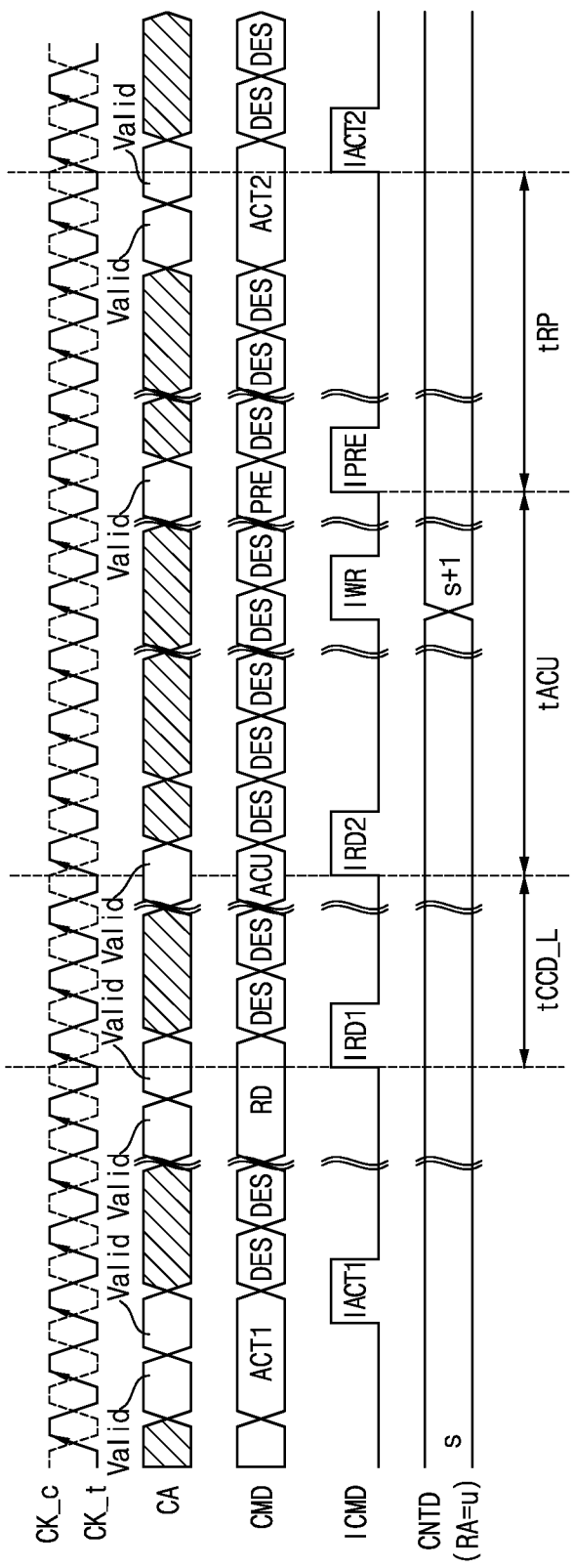
FIGS. 26 and 27 illustrate examples of command protocols of the memory system when the memory system uses the active count update command, respectively, according to an embodiment.
Figure 27:
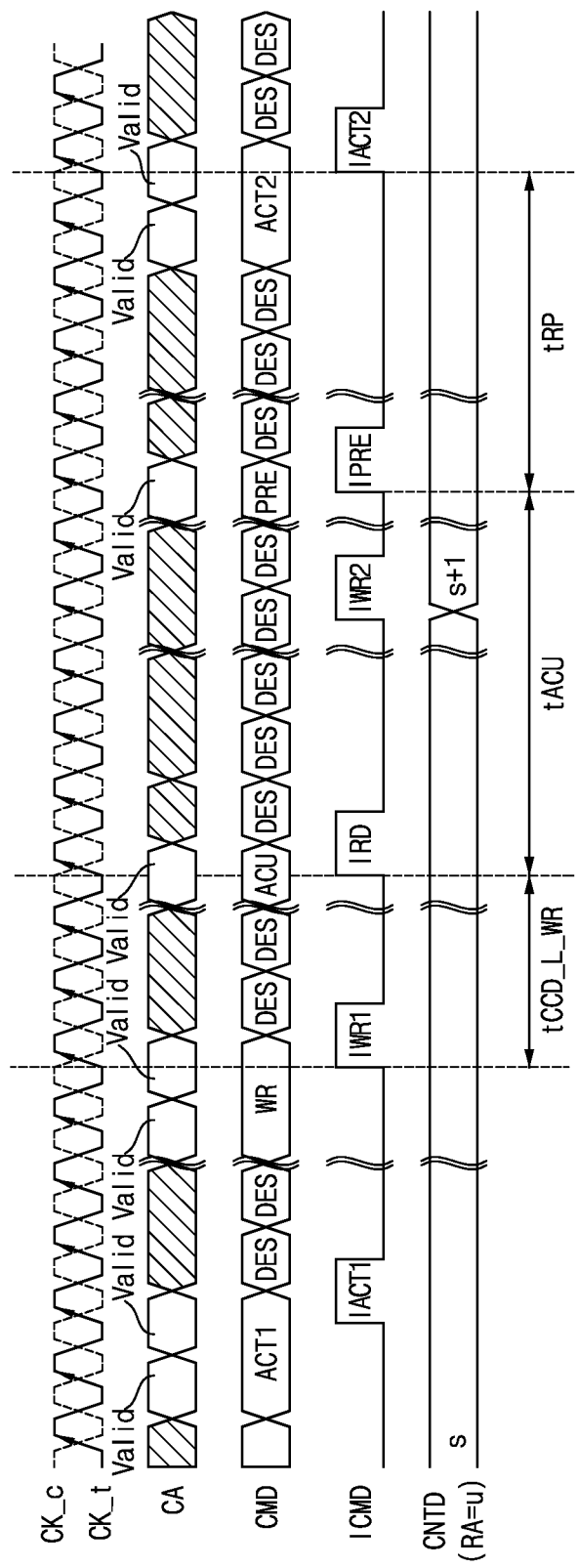

FIGS. 26 and 27 illustrate examples of command protocols of the memory system when the memory system uses the active count update command, respectively.

In FIGS. 26 and 27, differential clock signal pair CK_t and CK_c are illustrated.

Referring to FIGS. 1, 2, 3 and 26, the scheduler 55 applies a first active command ACT1 which is accompanied by a first target row address designating a first target memory cell row to the semiconductor memory device 200 in synchronization with an edge of the clock signal CK_t. In embodiments, a deselect command DES may indicate that the semiconductor memory device 200 is not currently selected, or that a command intended for the semiconductor memory device 200 is not currently received or applied.

The control logic circuit 210, in response to the first active command ACT1, enables the first target word-line connected to the first target memory cell row by enabling a first active signal IACT1.

After applying the first active command ACT1, the scheduler 55 applies a read command RD designating a read operation on the first target memory cell row to the semiconductor memory device 200 in synchronization with an edge of the clock signal CK_t. The control logic circuit 210, in response to the read command RD, performs a read operation on data stored in the first target memory cell row by enabling a first read signal IRD1.

After a time interval corresponding to a delay time of consecutive read commands to the same bank group tCCD_L from applying the read command RD, the scheduler 55 applies an active count update command ACU to the semiconductor memory device 200 in synchronization with an edge of the clock signal CK_t and the control logic circuit 210 reads the count data CNTD from the first target memory cell row, updates the read count data CNTD and stores the updated count data in the first target memory cell row by sequentially enabling a second read signal IRD2 and a write signal IWR in response to the active count update command ACU. Therefore, bit values stored in the first target memory cell row designated by the first target row address (e.g., RA=u) is increased by one from s to s+1.

After a time interval corresponding to a time tACU of performing the internal read-update-write operation from applying the active count update command ACU, the scheduler 55 applies a precharge command PRE to the semiconductor memory device 200 and the control logic circuit 210, in response to the precharge command PRE, precharges the first target word-line by enabling a precharge signal IPRE.

After a time interval corresponding to precharge time tRP, the scheduler 55 applies a second active command ACT2 associated with a second target memory cell row to the semiconductor memory device 200 and the control logic circuit 210, in response to the second active command ACT2, enables a second target word-line connected to the second target memory cell row by enabling a second active signal IACT2.

Referring to FIGS. 1, 2, 3 and 27, the scheduler 55 applies a first active command ACT1 which is accompanied by a first target row address designating a first target memory cell row to the semiconductor memory device 200 in synchronization with an edge of the clock signal CK_t.

The control logic circuit 210, in response to the first active command ACT1, enables the first target word-line connected to the first target memory cell row by enabling a first active signal IACT1.

After applying the first active command ACT1, the scheduler 55 applies a write command WR designating a write operation on the first target memory cell row to the semiconductor memory device 200 in synchronization with an edge of the clock signal CK_t. The control logic circuit 210, in response to the write command WR, performs a write operation to store data in the first target memory cell row by enabling a first write signal IWR1.

After a time interval corresponding to a delay time of consecutive write commands to the same bank group tCCD_L_WR from applying the write command WR, the scheduler 55 applies an active count update command ACU to the semiconductor memory device 200 in synchronization with an edge of the clock signal CK_t and the control logic circuit 210 reads the count data CNTD from the first target memory cell row, updates the read count data CNTD and stores the updated count data in the first target memory cell row by sequentially enabling a read signal IRD and a second write signal IWR2 in response to the active count update command ACU. Therefore, bit values stored in the first target memory cell row designated by the first target row address (e.g., RA=u) is increased by one from s to s+1.

After a time interval corresponding to a time tACU of performing the internal read-update-write operation from applying the active count update command ACU, the scheduler 55 applies a precharge command PRE to the semiconductor memory device 200 and the control logic circuit 210, in response to the precharge command PRE, precharges the first target word-line by enabling a precharge signal IPRE.

After a time interval corresponding to precharge time tRP, the scheduler 55 applies a second active command ACT2 associated with a second target memory cell row to the semiconductor memory device 200 and the control logic circuit 210, in response to the second active command ACT2, enables a second target word-line connected to the second target memory cell row by enabling a second active signal IACT2.

Figure 28:
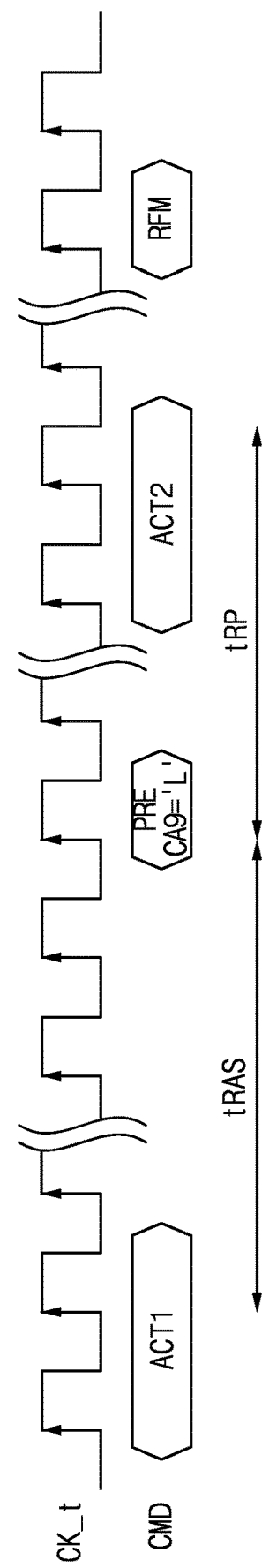
FIG. 28 illustrates an example of the command protocol of the memory system when the memory system updates the count data based on the precharge command, according to an embodiment.

FIG. 28 illustrates an example of the command protocol of the memory system when the memory system updates the count data based on the precharge command.

Referring to FIGS. 1, 2, 25 and 28, the scheduler 55 applies the first active command ACT1 to the semiconductor memory device 200 in synchronization with an edge of the clock signal CK_t, and applies the precharge command PRE designating an internal read-update-write operation on the count data stored in a target memory cell designated by a target row address accompanied by the first active command ACT1 to the semiconductor memory device 200 after a tRAS corresponding to active to precharge time elapses. In this case, the scheduler 55 may set the tenth command-address signal CA9 of the precharge command PRE to a logic low level L.

After a time interval corresponding to precharge time tRP, the scheduler 55 applies a second active command ACT2 to the semiconductor memory device 200 in synchronization with an edge of the clock signal CK_t and applies a refresh management command RFM to the semiconductor memory device 200. The semiconductor memory device 200 performs a hammer refresh operation on two victim memory cell rows physically adjacent to a memory cell row corresponding to the hammer address, in response to the refresh management command RFM.

Figure 29:
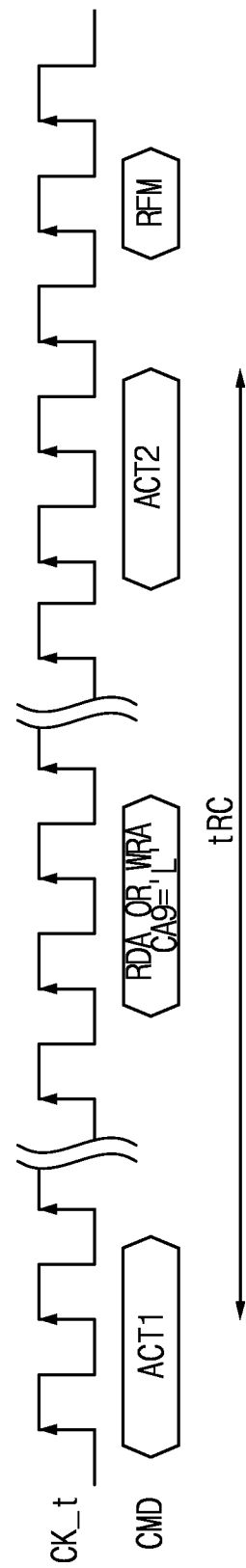
FIG. 29 illustrates an example of the command protocol of the memory system when the memory system updates the count data based on the read command including an auto precharge or the write command including an auto precharge, according to an embodiment.

FIG. 29 illustrates an example of the command protocol of the memory system when the memory system updates the count data based on the read command including an auto precharge or the write command including an auto precharge.

Referring to FIGS. 1, 2, 24 and 29, the scheduler 55 applies the first active command ACT1 to the semiconductor memory device 200 in synchronization with an edge of the clock signal CK_t, and applies the read command RDA including an auto precharge or the write command WRA including an auto precharge designating an internal read-update-write operation on the count data stored in a target memory cell designated by a target row address accompanied by the first active command ACT1 to the semiconductor memory device 200. In this case, the scheduler 55 may set the tenth command-address signal CA9 of the read command RDA including an auto precharge or the write command WRA including an auto precharge to a logic low level L. The row hammer management circuit 500 may perform the internal read-update-write operation in response to the logic low level L of the tenth command-address signal CA9.

After a time interval corresponding to active time tRC from applying the first active command ACT1, the scheduler 55 applies a second active command ACT2 to the semiconductor memory device 200 and applies a refresh management command RFM to the semiconductor memory device 200. The semiconductor memory device 200 performs a hammer refresh operation on two victim memory cell rows physically adjacent to a memory cell row corresponding to the hammer address, in response to the refresh management command RFM.

In FIG. 29, the scheduler 55 may selectively apply the read command RDA including an auto precharge or the write command WRA including an auto precharge to the semiconductor memory device 200.

Figure 30:
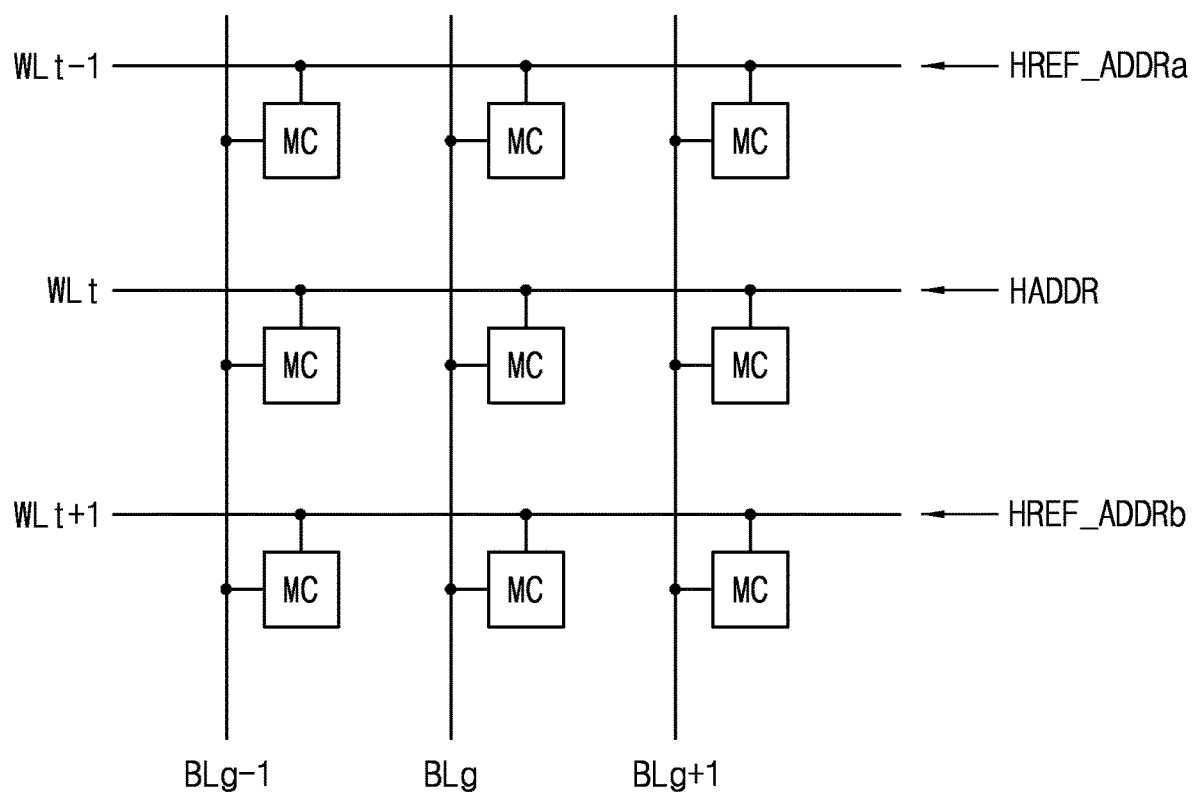
FIG. 30 is a diagram illustrating a portion of a memory cell array for describing generation of hammer refresh addresses, according to an embodiment.

FIG. 30 is a diagram illustrating a portion of a memory cell array for describing generation of hammer refresh addresses.

FIG. 30 illustrates three word-lines WLt−1, WLt and WLt+1, three bit-lines BLg−1, BLg and BLg+1 and memory cells MC coupled to the word-lines WLt−1, WLt and WLt+1 and the bit-lines BLg−1, BLg and BLg+1 in the memory cell array. The three word-lines WLt−1, WLt and WLt+1 are extended in the first direction D1 and arranged sequentially along the second direction D2. The three bit-lines BLg−1, BLg and BLg+1 are extended in the second direction D2 and arranged sequentially along the first direction D1. In embodiments, the word-lines WLt−1 and WLt may be physically directly adjacent to each other which may mean there are no intervening word-lines between the word-lines WLt−1 and WLt.

For example, the middle word-line WLt may correspond to the hammer address HADDR that has been intensively accessed. In embodiments, "an intensively-accessed word-line" may refer to a word-line that has a relatively higher activation number and/or has a relatively higher activation frequency. Whenever the hammer word-line (e.g., the middle word-line WLt) is accessed, the hammer word-line WLt is enabled and precharged, and the voltage level of the hammer word-line WLt is increased and decreased. Word-line coupling may cause the voltage levels of the adjacent word-lines WLt−1 and WLt+1 to fluctuate as the voltage level of the hammer word-line WLt varies, and thus the cell charges of the memory cells MC coupled to the adjacent word-lines WLt−1 and WLt+1 may be affected. As the hammer word-line WLt is accessed more frequently, the cell charges of the memory cells MC coupled to the adjacent word-lines WLt−1 and WLt+1 may be lost more rapidly.

The hammer refresh address generator 440 of FIG. 5 may provide the hammer refresh address HREF_ADDR representing the addresses HREF_ADDRa and HREF_ADDRb of the rows (e.g., the word-lines WLt−1 and WLt+1) that are physically adjacent to the row of the hammer address HADDR (e.g., the hammer word-line WLt), and a refresh operation for the adjacent word-lines WLt−1 and WLt+1 may be performed additionally based on (e.g., in response to) the hammer refresh address HREF_ADDR to reduce or possibly prevent the loss of data stored in the memory cells MC.

Figure 31:
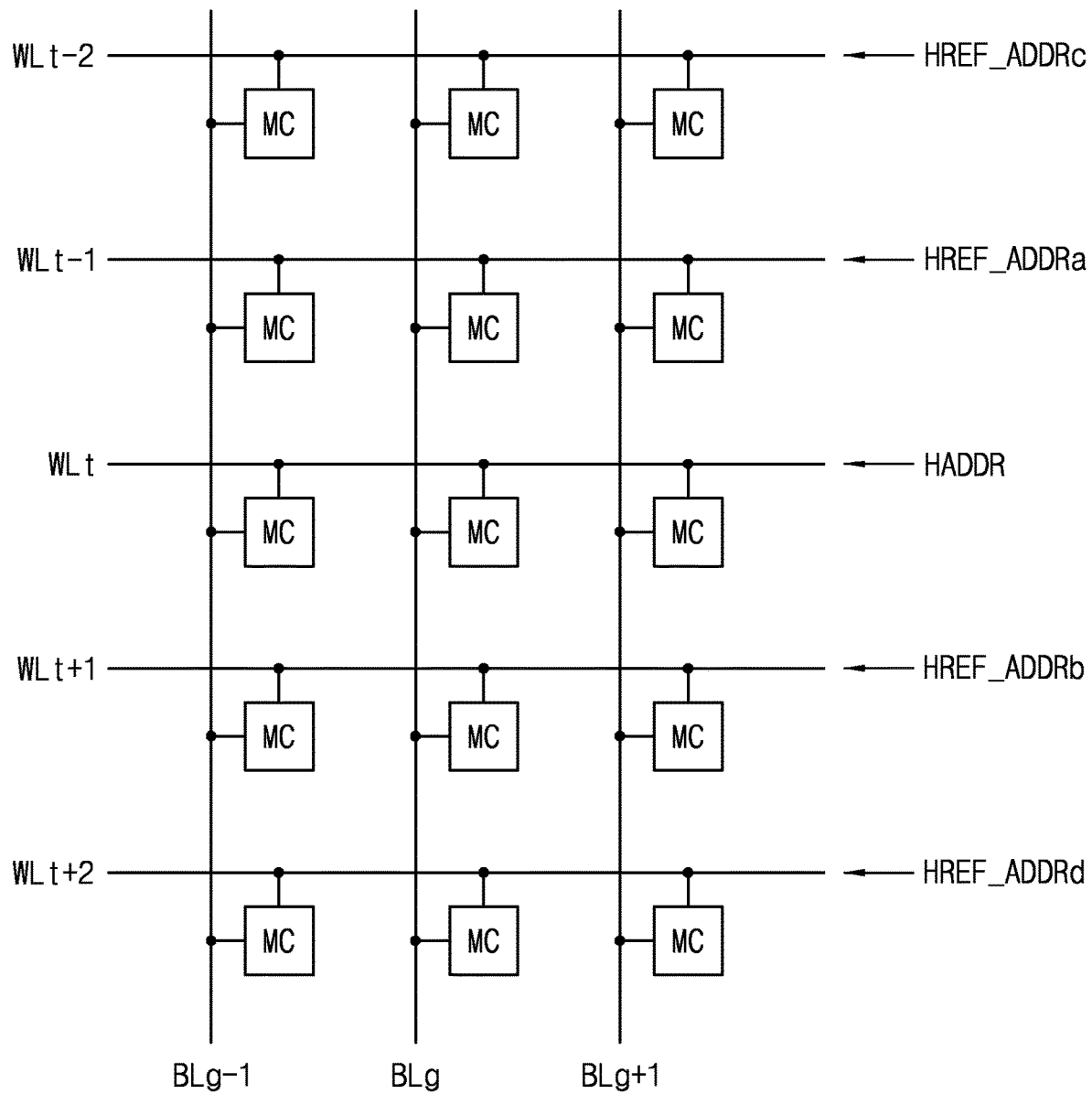
FIG. 31 is a diagram illustrating a portion of a memory cell array for describing generation of hammer refresh addresses in response to the second type of hammer address, according to an embodiment.

FIG. 31 is a diagram illustrating a portion of a memory cell array for describing generation of hammer refresh addresses in response to the second type of hammer address.

FIG. 31 illustrates five word-lines WLt−2, WLt−1, WLt, WLt+1 and WLt+2, three bit-lines BLg−1, BLg and BLg+1 and memory cells MC coupled to the word-lines WLt−2, WLt−1, WLt, WLt+1 and WLt+2 and the bit-lines BLg−1, BLg and BLg+1 in the memory cell array. The five word-lines WLt−2, WLt−1, WLt, WLt+1 and WLt+2 are extended in the first direction D1 and arranged sequentially along the second direction D2. In embodiments, the word-lines WLt−2, WLt−1, WLt, WLt+1 and WLt+2 may be physically directly adjacent to each other, which may mean that there are no intervening word-lines between the word-lines WLt−2, WLt−1, WLt, WLt+1 and WLt+2.

The hammer refresh address generator 440 of FIG. 5 may provide the hammer refresh address HREF_ADDR representing addresses HREF_ADDRa, HREF_ADDRb, HREF_ADDRc and HREF_ADDRd of the rows (e.g., the word-lines WLt−1, WLt+1, WLt−2 and WLt+2) that are physically adjacent to the row of the hammer address HADDR (e.g., the middle word-line WLt), and a refresh operation for the adjacent word-lines WLt−1, WLt+1, WLt−2 and WLt+2 may be performed additionally based on (e.g., in response to) the hammer refresh address HREF_ADDR to reduce or possibly prevent the loss of data stored in the memory cells MC.

Figure 32A:
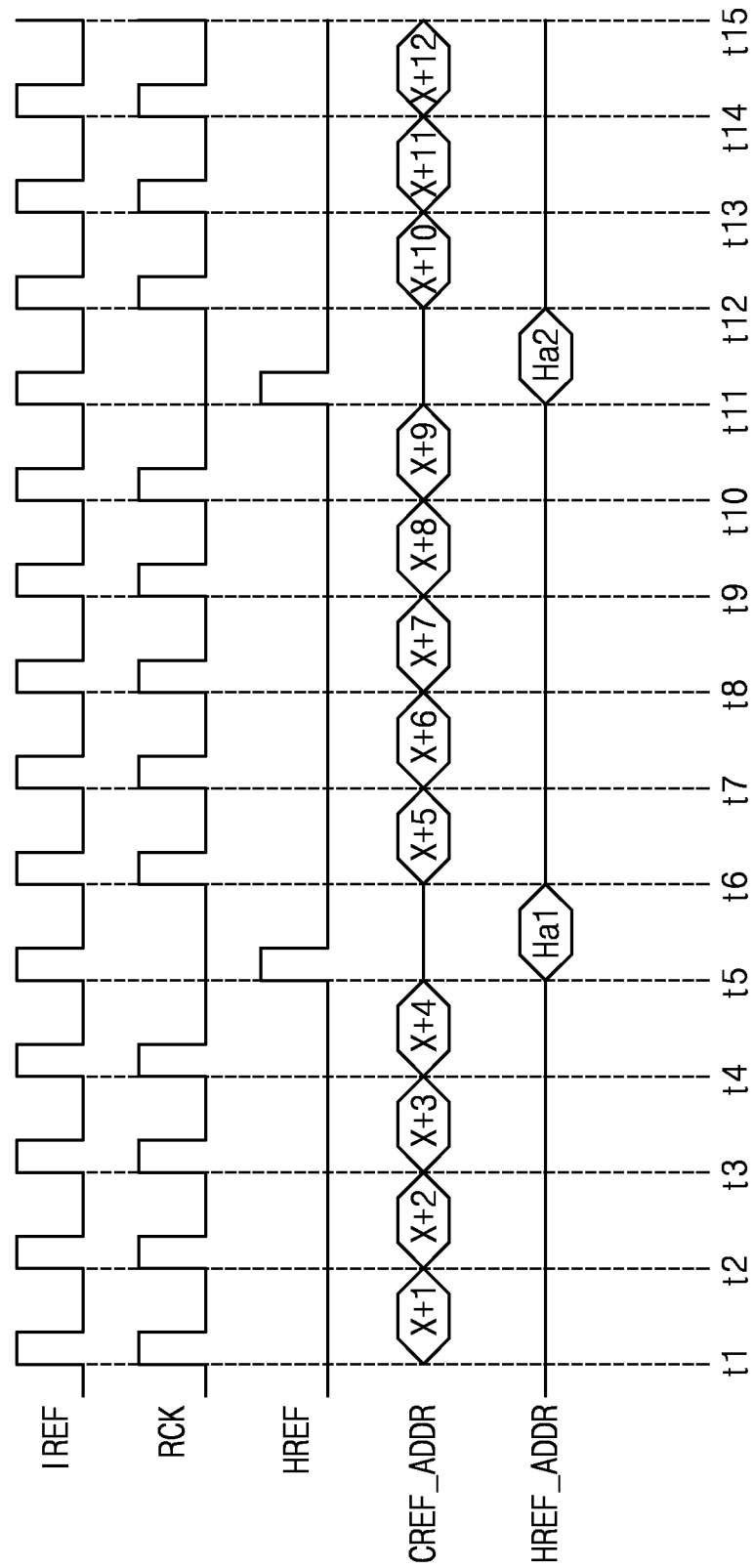
FIGS. 32A, 32B and 33 are timing diagrams illustrating example operations of a refresh control circuit of FIG. 5 according to an embodiment.
Figure 32B:
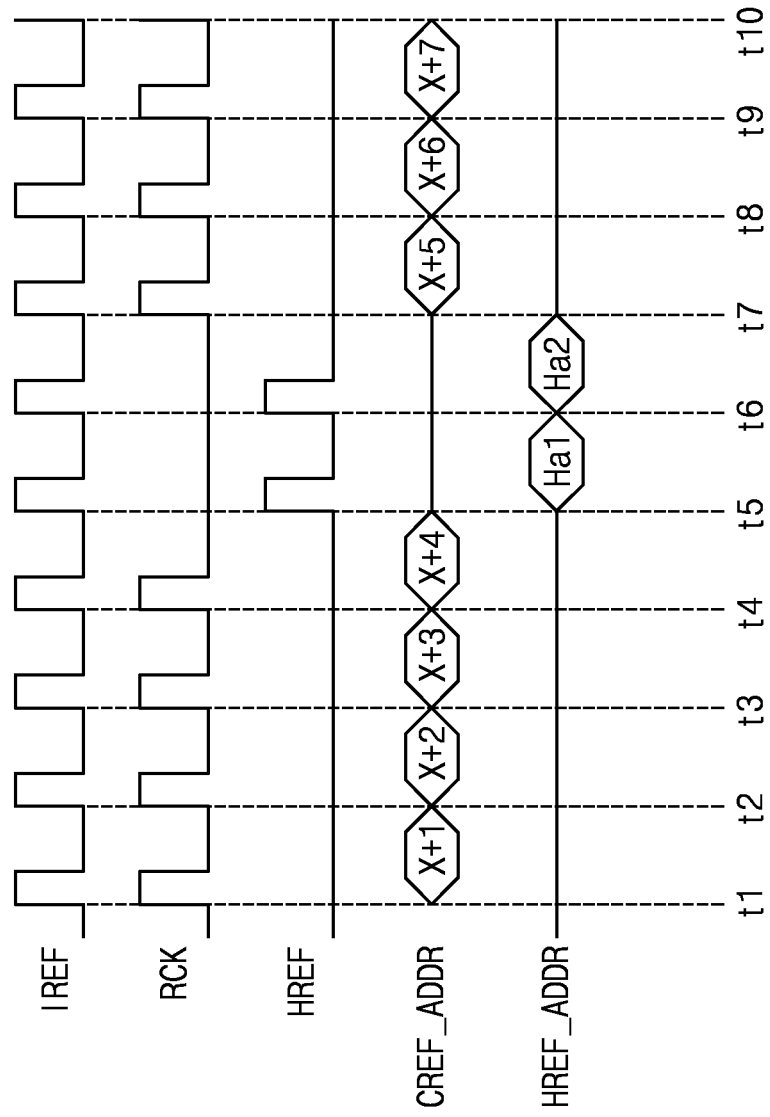
Figure 33:
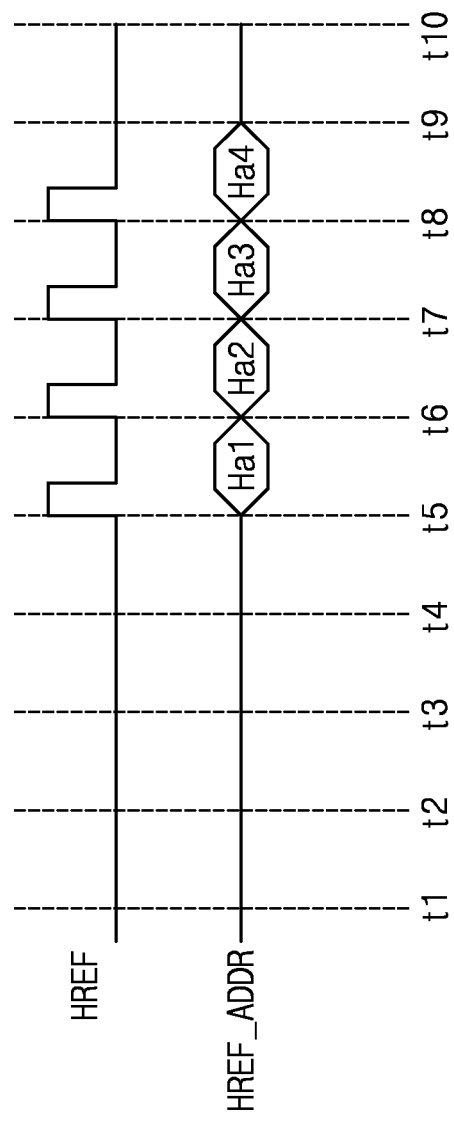

FIGS. 32A, 32B and 33 are timing diagrams illustrating example operations of a refresh control circuit of FIG. 5 according to example embodiments.

FIGS. 32A and 32B illustrate generations of a refresh clock signal RCK, a hammer refresh signal HREF, a counter refresh address CREF_ADDR, and a hammer refresh address HREF_ADDR, with respect to a refresh control signal IREF that is activated in a pulse shape at activation time points t1-t15 or at activation time points t1-t10. The intervals between the activation time points t1-t15 or the activation time points t1-t10 of the refresh control signal IREF may be regular or irregular.

Referring to FIGS. 5 and 32A, the refresh control logic 410 may activate the refresh clock signal RCK in synchronization with some time points t1-t4, t6-t10 and t12-t15 among the activation time points t1-t15 of the refresh control signal IREF, and may activate the hammer refresh signal HREF with the other time points t5 and t11.

The refresh counter 430 may generate the counter refresh address CREF_ADDR representing the sequentially changing addresses X+1-X+12 in synchronization with the activation time points t1-t4, t6-t10 and t12-t14 of the refresh clock signal RCK. The hammer refresh address generator 440 may generate the hammer refresh address HREF_ADDR representing the addresses of the rows that are physically adjacent to the row of the hammer address in synchronization with the activation time points of the hammer refresh signal HREF. For example, the hammer refresh address generator 440 may generate the hammer refresh address HREF_ADDR representing the address Ha1 in synchronization with the activation time point t5 of the hammer refresh signal HREF, and may generate the hammer refresh address HREF_ADDR representing the address Ha2 in synchronization with the activation time point t11 of the hammer refresh signal HREF.

Referring to FIGS. 5 and 32B, the refresh control logic 410 may activate the refresh clock signal RCK in synchronization with some time points t1-t4 and t7-t10 among the activation time points t1-t10 of the refresh control signal IREF, and may activate the hammer refresh signal HREF in synchronization with the other time points t5 and t6.

The refresh counter 430 may generate the counter refresh address CREF_ADDR representing the sequentially changing addresses X+1-X+7 in synchronization with the activation time points t1-t4 and t7-t9 of the refresh clock signal RCK. The hammer refresh address generator 440 may generate the hammer refresh address HREF_ADDR representing the addresses Ha1 and Ha2 of the rows that are physically adjacent to the row of the hammer address in synchronization with the activation time points t5 and t6 of the hammer refresh signal HREF.

Referring to FIGS. 5 and 33, the hammer refresh address generator 440 may generate the hammer refresh address HREF_ADDR representing the addresses Ha1, Ha2, Ha3 and Ha4 of the rows that are physically adjacent to the row of the hammer address in synchronization with the activation time points t5, t6, t7, t8 of the hammer refresh signal HREF.

Figure 34:
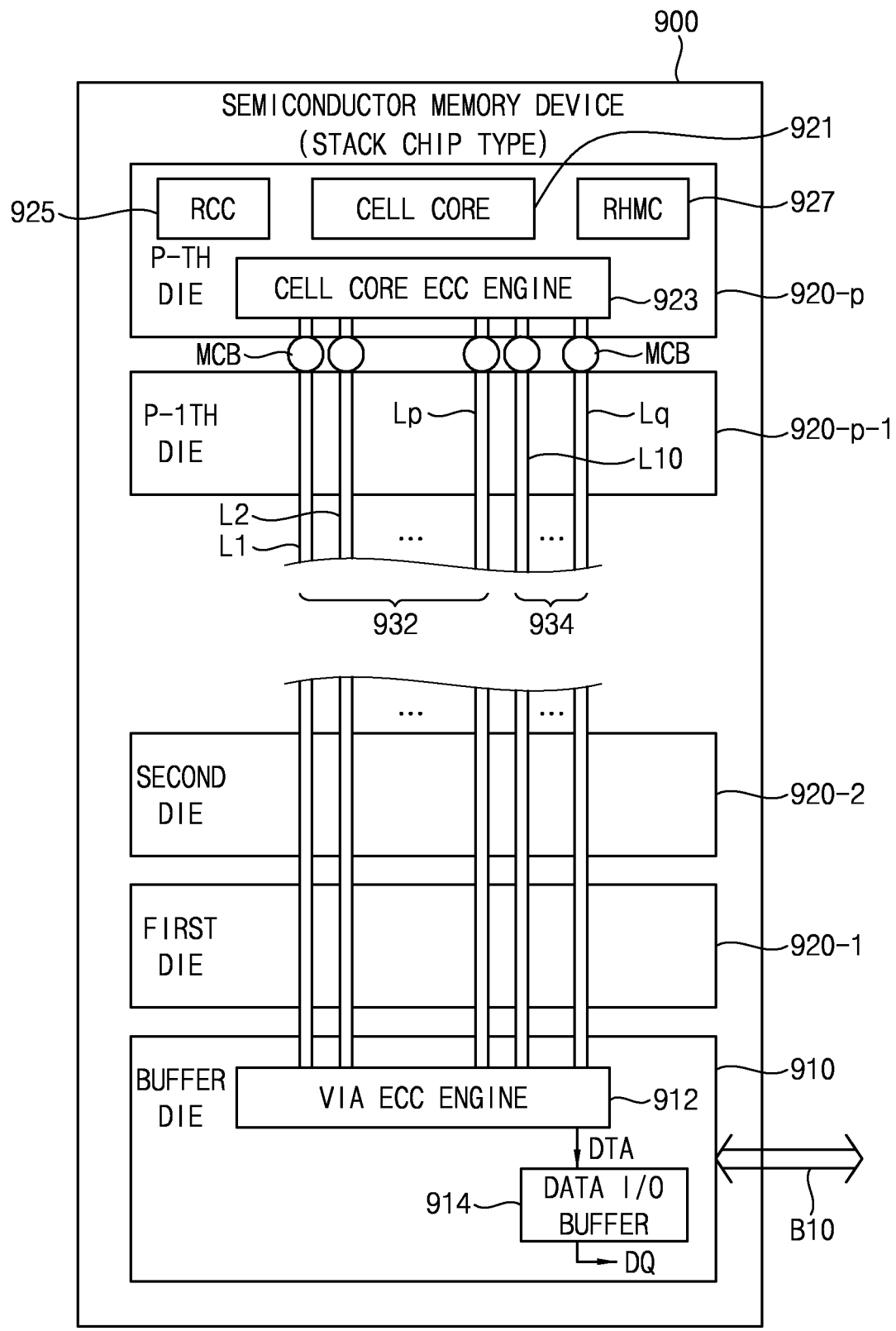
FIG. 34 is a block diagram illustrating a semiconductor memory device according to an embodiment.

FIG. 34 is a block diagram illustrating a semiconductor memory device according to example embodiments.

Referring to FIG. 34, a semiconductor memory device 900 may include at least one buffer die 910 and a plurality of memory dies 920-1 to 920-p, where p is a natural number equal to or greater than three, providing a soft error analyzing and correcting function in a stacked chip structure.

The plurality of memory dies 920-1 to 920-p are stacked on the buffer die 810 and conveys data through a plurality of through silicon via (TSV) lines.

Each of the plurality of memory dies 920-1 to 920-p may include a cell core 921 to store data, a cell core ECC engine 923 which generates transmission parity bits (e.g., transmission parity data) based on transmission data to be sent to the at least one buffer die 910, a refresh control circuit (RCC) 925 and a row hammer management circuit (RHMC) 927. The cell core 921 may include a plurality of memory cells having DRAM cell structure.

The RCC 925 may employ the refresh control circuit 400 of FIG. 5 and the row hammer management circuit 927 may employ the row hammer management circuit 500 of FIG. 8. The row hammer management circuit 927 may automatically store random count data in count cell in each of a plurality of memory cell rows, may store active count of each of the plurality of memory cell rows in the count cells in each of the plurality of memory cell rows as count data, may update the count data based on a subsequent command which is applied after the active command, and thus may manage row hammer of all of the memory cell rows. The row hammer management circuit 927 may include a hammer address queue. The hammer address queue may transition a logic level of an alert signal provided to a memory controller from a first logic level to a second logic level in response to candidate hammer addresses being stored in all of FIFO registers in the hammer address queue, and may output one of the candidate hammer addresses as a hammer address. The refresh control circuit 925 may receive the hammer address from the row hammer management circuit 927 and may perform a hammer refresh operation on one or more victim memory cell rows physically adjacent to a memory cell row corresponding to the hammer address.

The buffer die 910 may include a via ECC engine 912 which corrects a transmission error using the transmission parity bits when a transmission error is detected from the transmission data received through the TSV liens and generates error-corrected data.

The buffer die 810 may further include a data I/O buffer 914. The data I/O buffer 914 may generate the data signal DQ by sampling the data DTA from the via ECC engine 812 and may output the data signal DQ to an outside.

The semiconductor memory device 900 may be a stack chip type memory device or a stacked memory device which conveys data and control signals through the TSV lines. The TSV lines may be also called 'through electrodes'.

The cell core ECC engine 823 may perform error correction on data which is outputted from the memory die 820-p before the transmission data is sent.

A data TSV line group 932 which is formed at one memory die 920-p may include TSV lines L1, L2, ..., Lp, and a parity TSV line group 934 may include TSV lines L10 to Lq. The TSV lines L1, L2, ..., Lp of the data TSV line group 932 and the parity TSV lines L10 to Lq of the parity TSV line group 834 may be connected to micro bumps MCB which are correspondingly formed among the memory dies 920-1 to 920-p.

The semiconductor memory device 900 may have a three-dimensional (3D) chip structure or a 2.5D chip structure to communicate with the host through a data bus B10. The buffer die 910 may be connected with the memory controller through the data bus B10.

According to example embodiments, as illustrated in FIG. 34, the cell core ECC engine 923 may be included in the memory die, the via ECC engine 912 may be included in the buffer die. Accordingly, it may be possible to detect and correct soft data fail. The soft data fail may include a transmission error which is generated due to noise when data is transmitted through TSV lines.

Figure 35:
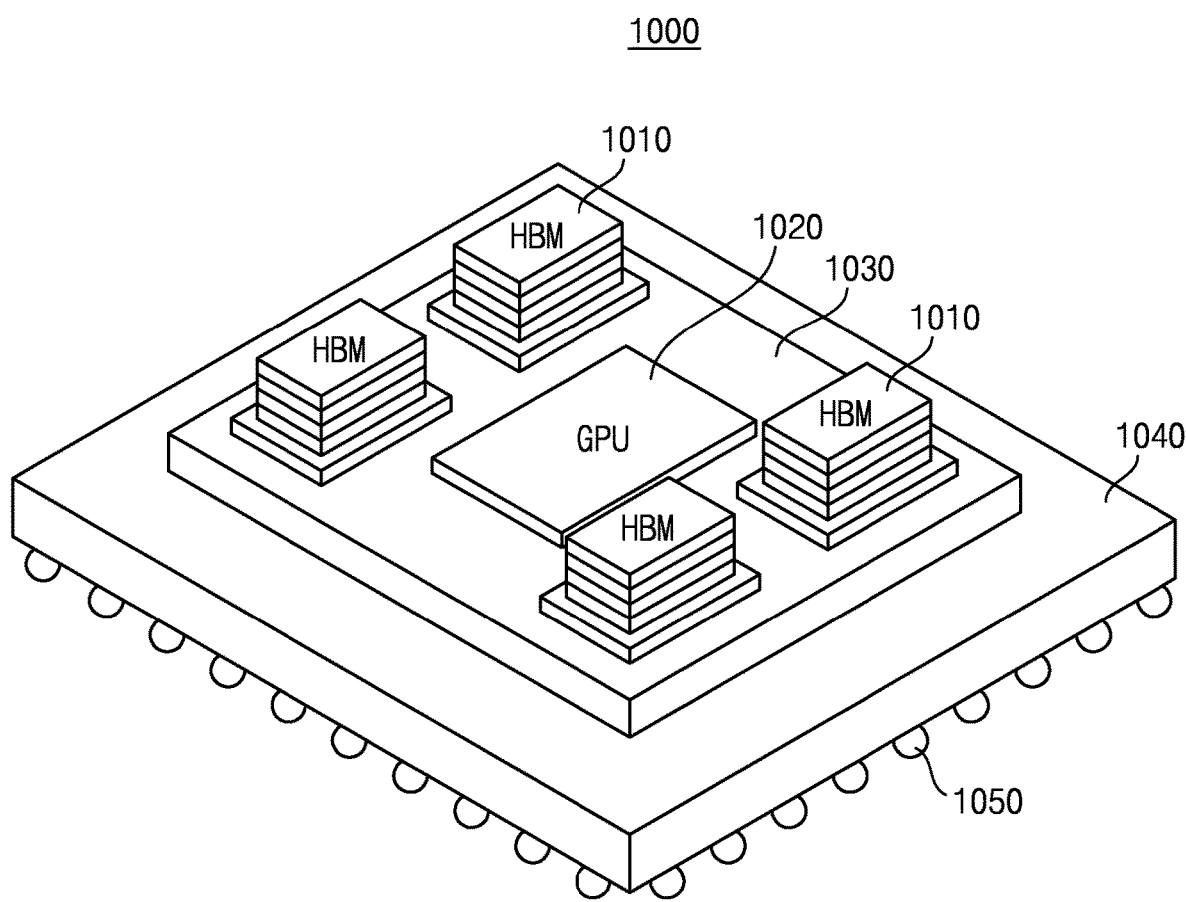
FIG. 35 is a configuration diagram illustrating a semiconductor package including the stacked memory device according to an embodiment.

FIG. 35 is a configuration diagram illustrating a semiconductor package including the stacked memory device according to example embodiments.

Referring to FIG. 35, a semiconductor package 1000 may include one or more stacked memory devices 1010 and a graphic processing unit (GPU) 1020.

The stacked memory devices 1010 and the GPU 1020 may be mounted on an interposer 1030, and the interposer on which the stacked memory device 1010 and the GPU 1020 are mounted may be mounted on a package substrate 940 mounted on solder balls 1050. The GPU 1020 may correspond to a semiconductor device which may perform a memory control function, and for example, the GPU 1020 may be implemented as an application processor (AP). The GPU 1020 may include a memory controller having a scheduler.

The stacked memory device 1010 may be implemented in various forms, and the stacked memory device 1010 may be a memory device in a high bandwidth memory (HBM) form in which a plurality of layers are stacked. Accordingly, the stacked memory device 1010 may include a buffer die and a plurality of memory dies and each of the plurality of memory dies include a refresh control circuit and a row hammer management circuit.

The plurality of stacked memory devices 1010 may be mounted on the interposer 1030, and the GPU 1020 may communicate with the plurality of stacked memory devices 910. For example, each of the stacked memory devices 1010 and the GPU 1020 may include a physical region, and communication may be performed between the stacked memory devices 1010 and the GPU 1020 through the physical regions. Meanwhile, when the stacked memory device 1010 includes a direct access region, a test signal may be provided into the stacked memory device 1010 through conductive elements (e.g., solder balls 1050) mounted under package substrate 1040 and the direct access region.

Figure 36:
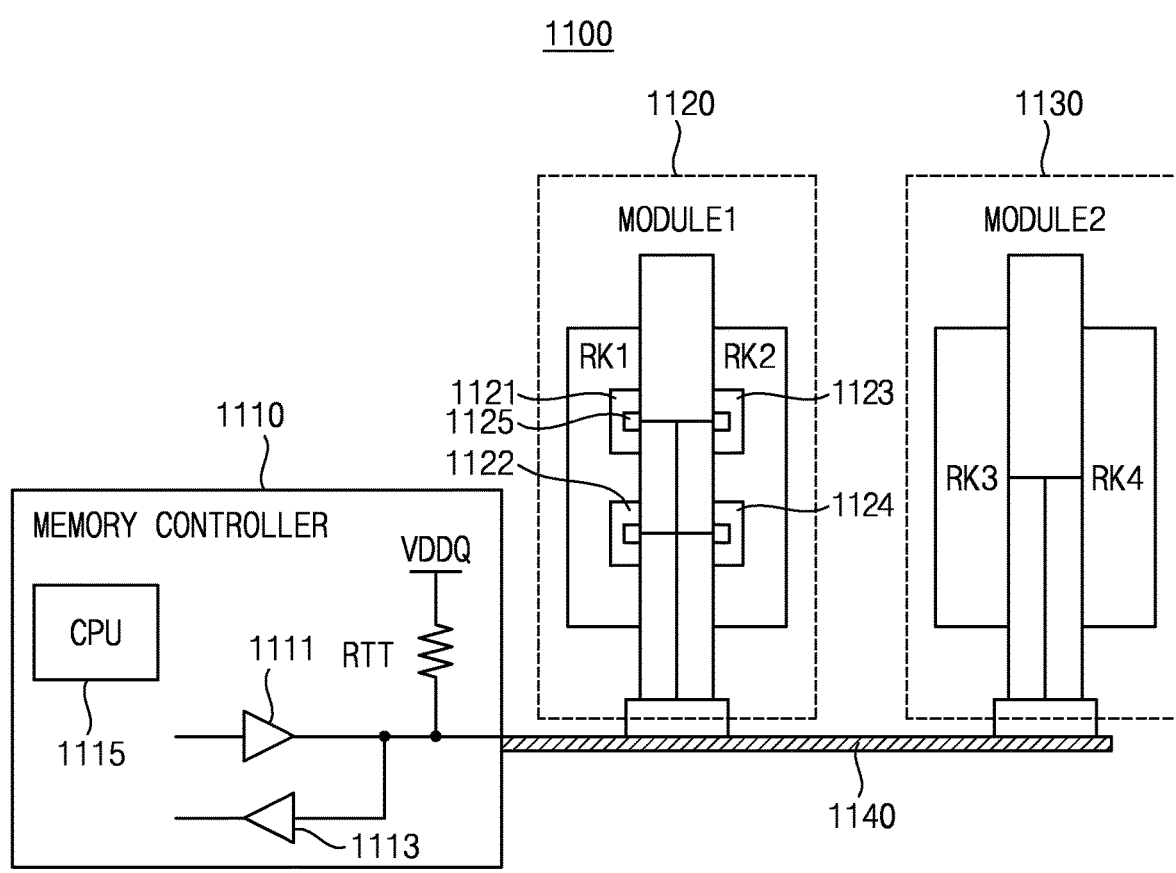
FIG. 36 is a block diagram illustrating a memory system having quad-rank memory modules according to an embodiment.

FIG. 36 is a block diagram illustrating a memory system having quad-rank memory modules according to example embodiments.

Referring to FIG. 36, a memory system 1100 may include a memory controller 1110 and/or memory modules 1120 and 1130. While two memory modules are depicted in FIG. 36, more or fewer memory modules may be included in the memory system 1000, according to some example embodiments.

The memory controller 1110 may control a memory module 1120 and/or 1130 so as to perform a command supplied from a processor and/or host. The memory controller 1110 may be implemented using processing circuitry (e.g., a processor) and/or may be implemented with a host, an application processor or a system-on-a-chip (SoC). For signal integrity, a source termination may be implemented with a resistor RTT on a bus 1140 of the memory controller 1110. The resistor RTT may be coupled to a power supply voltage VDDQ. The memory controller 1110 may include a transmitter 1111, which may transmit a signal to at least one of the memory modules 1120 and/or 1130, and a receiver 1113 that may receive a signal from at least one of the memory modules 1120 and/or 1130. The memory controller 1110 may include a CPU 1115.

The memory modules 1120 and 1130 may be referred to as a first memory module 1120 and a second memory module 1130. The first memory module 1120 and the second memory module 1130 may be coupled to the memory controller 1110 through the bus 1140. Each of the first memory module 1120 and the second memory module 1130 may include a plurality of semiconductor memory devices and/or a registered clock driver. The first memory module 1120 may include memory ranks RK1 and RK2, and the second memory module 1130 may include memory ranks RK3 and RK4.

The memory rank RK1 may include semiconductor memory devices 1121 and 1122 and the memory rank RK2 may include semiconductor memory devices 1123 and 1124. Although not illustrated, each of the memory ranks RK3 and RK4 may include semiconductor memory devices. Each of the semiconductor memory devices 1121, 1122, 1123 and 1124 may employ or otherwise correspond to the semiconductor memory device 200 of FIG. 3.

Each of the semiconductor memory devices 1121, 1122, 1123 and 1124 may be connected to the memory controller 1110 through an alert pin 1125 and the bus 1140. Each semiconductor memory device 1121, 1122, 1123 and 1124 may notify the memory controller 1110 of an error state by changing a logic level of an alert signal through the alert pin 1125.

The alert pin 1125 of each of the semiconductor memory devices 1121, 1122, 1123 and 1124 may be commonly connected to the bus 1040. When at least one of the semiconductor memory devices 1121, 1122, 1123 and 1124 changes a logic level of the alert signal, a voltage across the resistor RTT is changed and thus, the CPU 1115 may identify that a situation of a hammer address queue being full occurs in at least one of the semiconductor memory devices 1121, 1122, 1123 and 1124.

Figure 37:
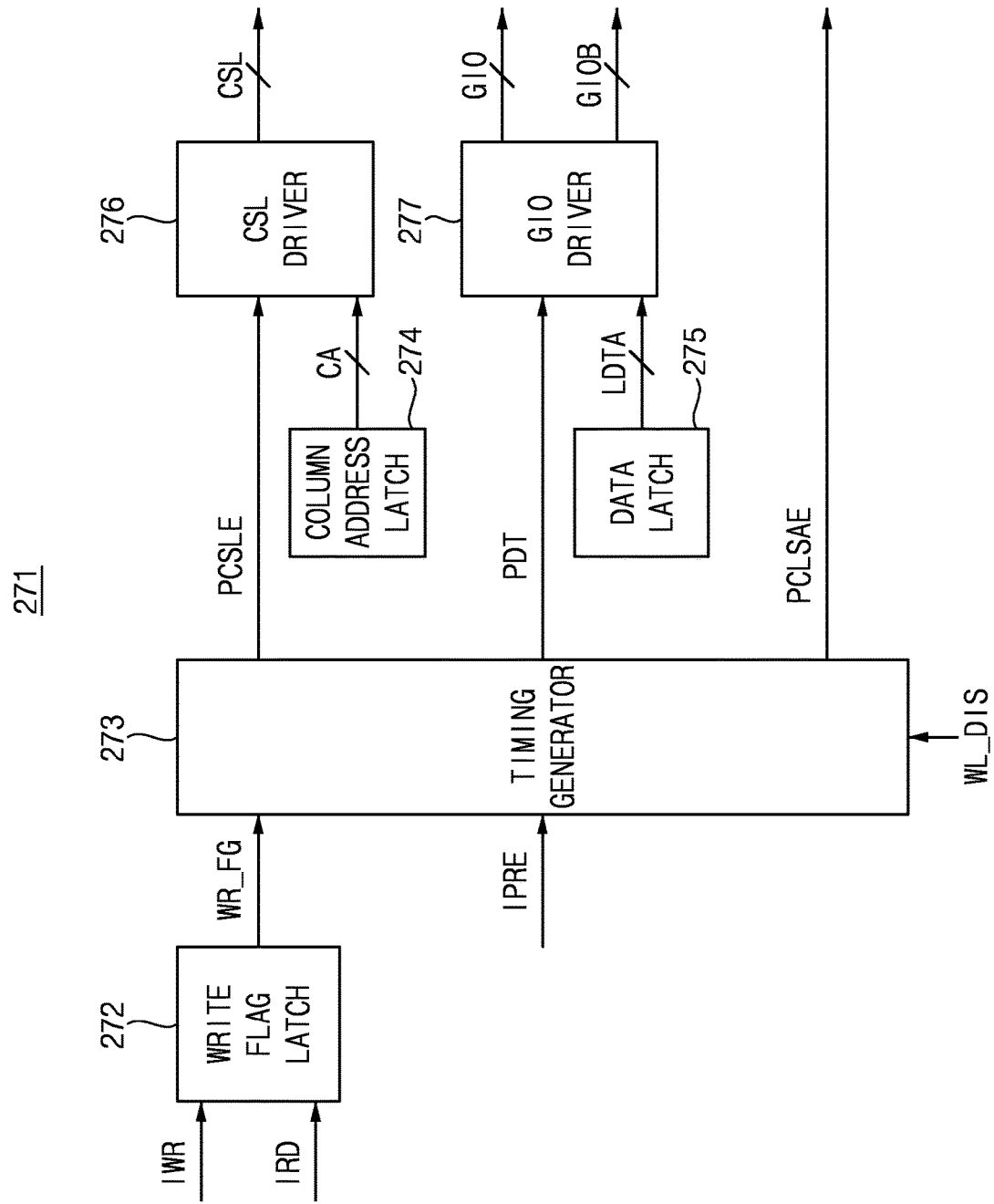
FIG. 37 is a block diagram illustrating an example of a write timing controller that may be included in the column decoder of FIG. 3 according to an embodiment.

FIG. 37 is a block diagram illustrating an example of a write timing controller that may be included in the column decoder of FIG. 3 according to example embodiments.

For convenience of explanation, an example of a write timing controller 271 is explained together with FIG. 17.

Referring to FIG. 37, the write timing controller 271 may include a write flag latch 272, a timing generator 273, a column address latch 274, a data latch 275, a column selection line (CSL) driver 276 and a global I/O (GIO) driver 277.

When the write timing controller 271 is included in the first column decoder 270*a*, the first column decoder 270*a* may access first memory cells in the target memory cell row through first bit-lines, based on the column address COL_ADDR, perform a first write operation to write data in the first memory cells using the first power supply voltage VINTA until a precharge command is applied to the semiconductor memory device 200, and may perform a second write operation to write the data in the first memory cells using the second power supply voltage VLSA from a first time point at which that the precharge command is applied to the semiconductor memory device 200 until a second time point at which the first word-line is disabled. The column decoder 270*a* may reduce a write time interval to store the data in the first memory cells. A voltage level of the second power supply voltage VLSA is greater than a voltage level of the first power supply voltage VINTA.

The write flag latch 272 may store a write flag signal WR_FG based on a write signal WR from the control logic circuit 210. The write flag latch 272 may receive a read signal IRD from the control logic circuit 210.

The timing generator 273 may generate a column selection pulse PCSLE, a local sense enable signal PCLSAE that enables the local sense amplifier 785, and a driving signal PDT, based on the write flag signal WR_FG stored in the write flag latch 272 and a precharge signal IPRE corresponding to the precharge command. The timing generator 273 may be reset in response to a disablement WL_DIS of a word-line.

The column address latch 274 may store a column address CA associated with the first write operation. The data latch 275 may store data associated with the first write operation and provide a latched data LDTA.

The column selection line driver 276 may generate a column selection signal CSL applied to column selection switches N6 and N7 that connect the bit-line pair including the bit-line BL and the complementary bit-line BLB and the local I/O line pair including the local I/O line LIO1 and the complementary local I/O line LIOB1, based on the column selection pulse PCSLE and the latched column address CA.

The global I/O driver 277 may be connected to the local sense amplifier 785 through the global I/O line pair including the global I/O line GIO1 and the complementary global I/O line GIOB1, and may drive the global I/O pair GIO1 and GIOB1 based on the driving signal PDT and the latched data LDTA.

Figure 38:
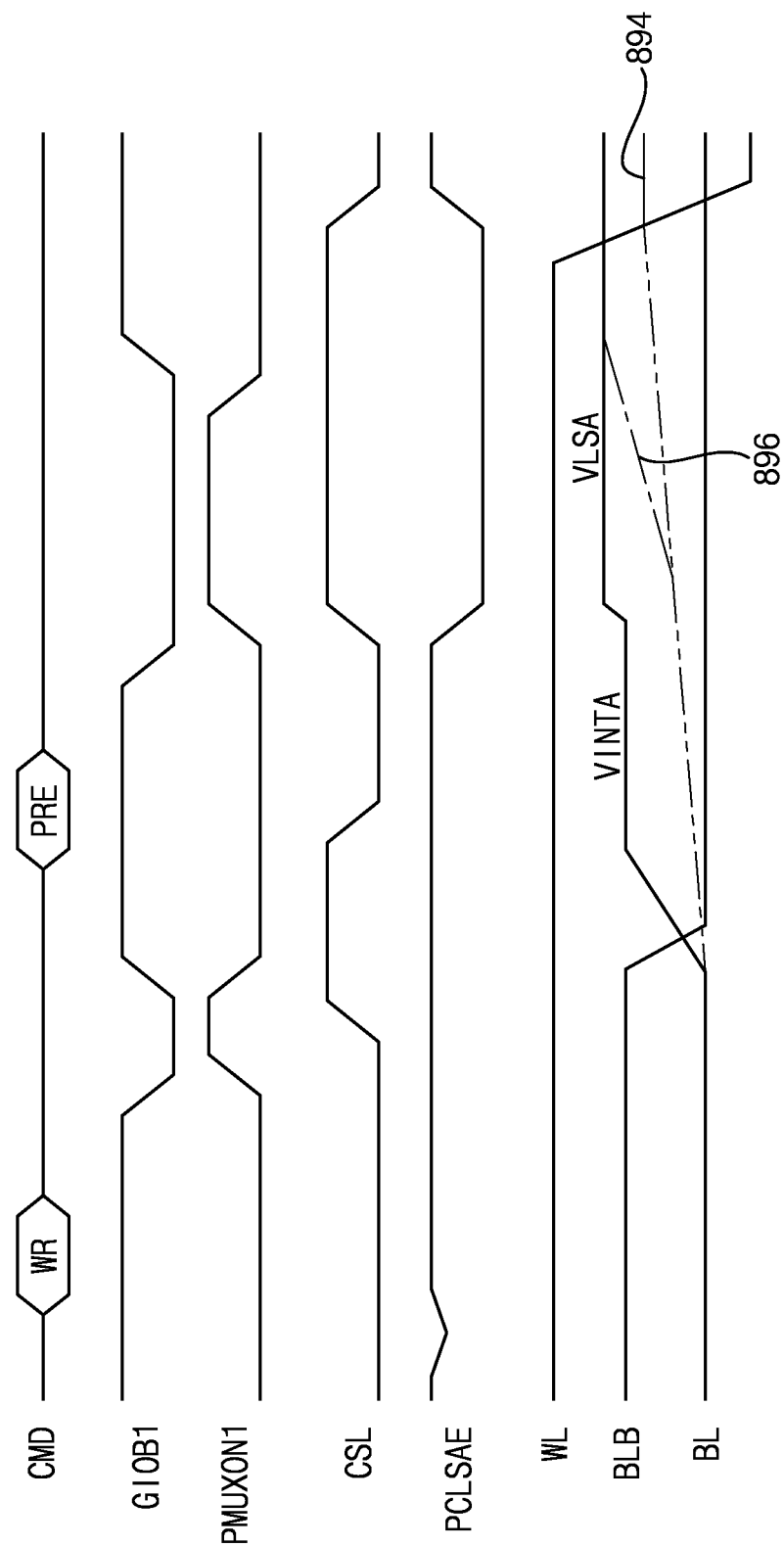
FIG. 38 is a timing diagram illustrating an operation of the write timing controller of FIG. 37 according to an embodiment.

FIG. 38 is a timing diagram illustrating an operation of the write timing controller of FIG. 37 according to example embodiments.

Referring to FIGS. 3, 17, 37 and 38, the word-line WL coupled to the memory cell MC is enabled in response to an active command and the write command WR and the precharge command PRE are sequentially applied to the semiconductor memory device 200.

While data having a logic low level, accompanied by the write command WR is input through the complementary global I/O line GIOB1 and data having a logic high level, accompanied by the write command WR is input through the global I/O line GIO1, the first connection control signal PMUXON1 is activated with a logic high level and the NMOS transistors 791 and 792 are turned-on or activated. Accordingly, the global I/O line GIO1 is connected to the local I/O line LIO1 and the complementary global I/O line GIO1B is connected to the complementary local I/O line LIO1B. In addition, when the column selection switches N6 and N7 are turned-on or activated in response to the column selection signal CSL, the local I/O line LIO1 is connected to the bit-line BL and the complementary local I/O line LIO1B is connected to the complementary bit-line BLB. Accordingly, the first write operation is performed when the charges based on the first power supply voltage VINTA are stored in the cell capacitor CC through the first path PTH1. When the first write operation is performed, the write flag signal WR_FG is latched in the write flag latch 272, the column address CA is latched in the column address latch 274 and the write data is latched in the data latch 275.

From a first time point at which that the precharge command PRE is applied to the semiconductor memory device 200 until a second time point at which the word-line WL is disabled, the timing generator 273 may generate the column selection pulse PCSLE, may activate the local sense enable signal PCLSAE and may activate the driving signal PDT, based on the write flag signal WR_FG and the precharge signal IPRE.

From the first time point at which that the precharge command PRE is applied to the semiconductor memory device 200 until the second time point at which the word-line WL is disabled, while the data LDTA latched in the data latch 275 is input through the global I/O line pair GIO1 and GIOB1, the first connection control signal PMUXON1 is activated with a logic high level and the NMOS transistors 791 and 792 are turned-on or activated. Accordingly, the global I/O line GIO1 is connected to the local I/O line LIO1 and the complementary global I/O line GIO1B is connected to the complementary local I/O line LIO1B. In addition, when the column selection switches N6 and N7 are turned-on or activated in response to the column selection signal CSL, the local I/O line LIO1 is connected to the bit-line BL and the complementary local I/O line LIO1B is connected to the complementary bit-line BLB. Accordingly, the second write operation is performed when the charges based on the second power supply voltage VLSA are stored in the cell capacitor CC through the second path PTH2.

A voltage level of the bit-line BL may increase to a voltage level of the first power supply voltage VINTA during the first write operation and may increase to a voltage level of the second power supply voltage VLSA during the second write operation. A voltage level of the cell capacitor CC may increase as indicated by a reference numeral 894 during the first write operation and a voltage level of the cell capacitor CC may increase as indicated by a reference numeral 896 during the second write operation.

The column selection line driver 276 may activate the column selection signal CSL during a first time interval when the first write operation is performed and may activate the column selection signal CSL during a second time interval greater than the first time interval when the second write operation is performed. The timing generator 273 may activate the local sense enable signal PCLSAE with a logic low level during the second write operation.

Therefore, the semiconductor memory device according to example embodiments may additionally perform a second write operation to store the data in the target memory cells using the second power supply voltage from a first time point at which that the precharge command is applied until a second time point at which the word-line is disabled, and thus, may reduce write time interval associated with storing the data in the target memory cells.

Aspects of the present disclosure may be applied to systems using semiconductor memory devices that employ volatile memory cells. For example, aspects of the present inventive concept may be applied to systems such as be a smart phone, a navigation system, a notebook computer, a desk top computer and a game console that use the semiconductor memory device as a working memory.

At least one of the components, elements, modules and units (collectively "components" in this paragraph) represented by a block in the drawings described above may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) a microprocessor, or the like that performs the respective functions The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. A semiconductor memory device comprising:
   a memory cell array comprising a plurality of memory cell rows, wherein each memory cell row of the plurality of memory cell rows comprises a plurality of memory cells;
   a row hammer management circuit configured to:
      count a number of accesses to the each memory cell row based on an active command received from an external memory controller and store the counted number in at least one count cell in the each memory cell row as count data, and
      based on a first command received after the active command, perform an internal read-update-write operation to read the count data from the at least one count cell in a target memory cell row from among the plurality of memory cell rows, to update the read count data, and to write the updated count data in the at least one count cell in the target memory cell row; and
   a column decoder configured to:
      access a first memory cell from among a first plurality of memory cells included in a first memory cell row from among the plurality of memory cell rows using a first bit-line, based on a column address; and
      store data in the first memory cell using a first power supply voltage, or perform an internal write operation to store the count data in the first memory cell using a second power supply voltage during an internal write time interval smaller than a reference write time interval,
   wherein a voltage level of the second power supply voltage is greater than a voltage level of the first power supply voltage.

2. The semiconductor memory device of claim 1, wherein the column decoder is further configured to:
perform a normal write operation to write the data in the first memory cell using the first power supply voltage during a first write time interval which is equal to or greater than the reference write time interval; and
perform the internal write operation using the second power supply voltage during a second write time interval which is smaller than the reference write time interval,
wherein the first power supply voltage is provided to a bit-line sense amplifier connected to the first memory cell, and
wherein the second power supply voltage is provided to a local sense amplifier connected to the first memory cell.

3. The semiconductor memory device of claim 2, wherein the column decoder is further configured to increase an amount of charges provided to the first memory cell based on the second power supply voltage during the internal write operation to be greater than an amount of charges provided to the first memory cell during the normal write operation.

4. The semiconductor memory device of claim 2, wherein the column decoder is further configured to increase an amount of charges provided to the first memory cell by increasing at least one of activation interval of a column selection signal and a voltage level of the column selection signal, and
wherein in the column selection signal is provided to a column selection switch which connects the local sense amplifier with the first bit-line during the internal write operation.

5. The semiconductor memory device of claim 2, wherein the column decoder is further configured to increase an amount of charges provided to the first memory cell by increasing an activation interval of a local sense enable signal which enables the local sense amplifier.

6. The semiconductor memory device of claim 1, further comprising:
a control logic circuit configured to receive the first command and to activate a first flag signal during a first time interval;
a first bit-line sense amplifier connected to the first memory cell; and
a first local sense amplifier circuit connected to the first bit-line sense amplifier through a first local input/output (I/O) line pair, the first local sense amplifier circuit comprising a first local sense amplifier,
wherein the column decoder comprises a sub column decoder configured to control the first bit-line sense amplifier and the first local sense amplifier circuit based on the first flag signal and the column address.

7. The semiconductor memory device of claim 6, wherein the sub column decoder comprises:
a column selection line driver configured to generate a first column selection signal associated with storing the data;
a local sense amplifier driver configured to generate a first local sense enable signal associated with storing the data and enabling the first local sense amplifier;
a first signal generator configured to generate a second column selection signal associated with storing the count data based on the first column selection signal and the first flag signal, and to provide one of the first column selection signal and the second column selection signal as a column selection signal; and
a second signal generator configured to generate a second local sense enable signal associated with storing the count data and enabling the first local sense amplifier based on the first local sense enable signal and the first flag signal, and to provide one of the first local sense enable signal and the second local sense enable signal as a local sense enable signal.

8. The semiconductor memory device of claim 7,
wherein the first signal generator includes:
a first latch configured to latch the first flag signal based on a rising transition of the first column selection signal to provide the second column selection signal; and
a first multiplexer configured to provide one of the first column selection signal and the second column selection signal as the column selection signal based on the first flag signal, and
wherein the second signal generator includes:
a second latch configured to latch the first flag signal based on a falling transition of the first local sense enable signal to provide the second local sense enable signal; and
a second multiplexer configured to provide one of the first local sense enable signal and the second local sense enable signal as the local sense enable signal based on the first flag signal.

9. The semiconductor memory device of claim 8, wherein the first multiplexer is configured to select the second column selection signal as the column selection signal based on the first flag signal having a first logic level, and
wherein the second multiplexer is configured to select the second local sense enable signal as the local sense enable signal based on the first flag signal having the first logic level.

10. The semiconductor memory device of claim 7, wherein the first local sense amplifier comprises:
a first p-channel metal-oxide semiconductor (PMOS) transistor connected between the second power supply voltage and a first node, wherein a gate of the first PMOS transistor is configured to receive the local sense amplifier signal;
a second PMOS transistor connected between the first node and a local I/O line of the first local I/O line pair, wherein a gate of the second PMOS transistor is connected to a complementary local I/O line of the first local I/O line pair; and
a third PMOS transistor connected between the first node and the complementary local I/O line, wherein a gate of the third PMOS transistor is connected to the local I/O line,
wherein the first bit-line is connected to the local I/O line by a column selection switch,
wherein the column selection switch includes an n-channel metal-oxide semiconductor (NMOS) transistor which is connected between the first bit-line and the local I/O line, and
wherein a gate of the NMOS transistor is configured to receive the column selection signal.

11. The semiconductor memory device of claim 1, further comprising:
a refresh control circuit configured to:
receive a hammer address, and
perform a hammer refresh operation on one or more victim memory cell rows which are physically adjacent to a memory cell row corresponding to the hammer address, wherein the row hammer management circuit comprises:
a hammer address queue configured to:
store one or more candidate hammer addresses, which are intensively accessed, from among the plurality of memory cell rows, based on a comparison between the counted number and a reference number;
output a candidate hammer address from among the one or more candidate hammer addresses as the hammer address, and
based on a number of the one or more candidate hammer addresses stored therein reaching a first number, change a logic level of an alert signal provided to a memory controller.

12. The semiconductor memory device of claim 11, wherein the row hammer management circuit further comprises:
an adder configured to update the read count data from the at least one count cell in the target memory cell row to output the updated count data; and
a comparator configured to compare the read count data with the reference number to output a first comparison signal, and
wherein the hammer address queue is further configured to store a target access address designating the target memory cell row based on the first comparison signal indicating that the read count data is equal to or greater than the reference number.

13. The semiconductor memory device of claim 12, wherein the hammer address queue comprises:
a plurality of first-in first-out (FIFO) registers configured to store the one or more candidate hammer addresses, wherein a number of the plurality of FIFO registers corresponds to the first number; and
a monitor logic connected with the plurality of FIFO registers and configured to:
manage the plurality of FIFO registers;
monitor whether each of the plurality of FIFO registers stores a respective candidate hammer address of the one or more candidate hammer addresses;
based on the number of the one or more candidate hammer addresses stored in the plurality of FIFO registers being equal to the first number, output a candidate hammer address which was input first from among the one or more candidate hammer addresses as the hammer address; and
change the logic level of the alert signal from a first logic level to a second logic level different from the first logic level based on the hammer address being output, and
wherein the refresh control circuit is further configured to perform the hammer refresh operation on the one or more victim memory cell rows based on a refresh management signal corresponding to a refresh management command applied by the memory controller based on the changing of logic level of the alert signal.

14. The semiconductor memory device of claim 1, further comprising:
an error correction code (ECC) engine configured to:
perform a first ECC encoding operation on data to be stored in at least one normal cell in the each memory cell row to generate parity data; and
perform a second ECC encoding operation on the count data to generate count parity data; and
a control logic circuit configured to control the row hammer management circuit and the ECC engine.

15. The semiconductor memory device of claim 14, wherein the memory cell array comprises:
a normal cell region which includes the at least one normal cell configured to store the data and the at least one count cell configured to store the count data; and
a parity cell region configured to store the parity data and the count parity data,
wherein the normal cell region comprises a plurality of sub array blocks arranged in a first direction and a second direction crossing the first direction, wherein each sub array block of the plurality of sub array blocks includes volatile memory cells, and
wherein a portion of the plurality of sub array blocks includes the at least one count cell.

16. A semiconductor memory device comprising:
a memory cell array comprising a plurality of memory cell rows, wherein each memory cell row of the plurality of memory cell rows comprises a plurality of memory cells;
a row decoder configured to enable a first word-line connected to a target memory cell row from among the plurality of memory cell rows, based on a row address accompanied by a write command received from an external memory controller; and
a column decoder configured to:
access first memory cells in the target memory cell row using first bit-lines, based on a column address;
perform a first write operation to store data in the first memory cells using a first power supply voltage until a precharge command is applied to the semiconductor memory device; and
perform a second write operation to store the data in the first memory cells using a second power supply voltage from a first time point at which the precharge command is applied to the semiconductor memory device until a second time point at which the first word-line is disabled,
wherein a voltage level of the second power supply voltage is greater than a voltage level of the first power supply voltage.

17. The semiconductor memory device of claim 16, further comprising:
control logic circuit configured to receive the write command and to generate a write signal based on the write command;
first bit-line sense amplifiers connected to the first memory cells; and
first local sense amplifiers connected to the first bit-line sense amplifiers through first local input/output (I/O) lines,
wherein the column decoder comprises:
a write flag latch configured to latch a write flag signal based on the write signal;
a timing generator configured to generate a column selection pulse, a local sense enable signal which enables the first local sense amplifiers, and a driving signal, based on the write flag signal stored in the write flag latch and a precharge signal corresponding to the precharge command;
a column address latch configured to latch a column address associated with the first write operation;
a data latch configured to latch data associated with the first write operation;
a column selection line driver configured to generate a column selection line signal applied to column selection switches which connect the first bit-lines and the first local I/O lines, based on the column selection pulse and the latched column address; and a global I/O driver connected to the first local sense amplifiers using a first global I/O line, and configured to drive the first global I/O line based on the driving signal and the latched data.

18. The semiconductor memory device of claim 17, wherein the column selection line driver is configured to activate the column selection signal during a first time interval in which the first write operation is performed, and to activate the column selection signal during a second time interval in which the second write operation is performed, wherein the second time interval is longer than the first time interval, and wherein the timing generator is configured to activate the local sense enable signal with a logic low level while the second write operation is performed.

19. A memory system comprising:

a semiconductor memory device; and a memory controller configured to control the semiconductor memory device, wherein the semiconductor memory device comprises:

a memory cell array comprising a plurality of memory cell rows, wherein each memory cell row of the plurality of memory cell rows comprises a plurality of memory cells;

a row hammer management circuit configured to:

count a number of accesses to the each memory cell row based on an active command received from an external memory controller and store the counted number in at least one count cell in the each memory cell row as count data, and based on a first command applied after the active command, perform an internal read-update-write operation to read the count data from the at least one count cell in a target memory cell row from among the plurality of memory cell rows, to update the count data, and to store the updated count data in the at least one count cell in the target memory cell row; and a column decoder configured to:

access a first memory cell from among a first plurality of memory cells included in a first memory cell row from among the plurality of memory cell rows using a first bit-line, based on a column address; and store data in the first memory cell using a first power supply voltage or perform an internal write operation to store the count data in the first memory cell using a second power supply voltage during an internal write time interval smaller than a reference write time interval, wherein a voltage level of the second power supply voltage is greater than a voltage level of the first power supply voltage.

20. The semiconductor memory device of claim 1, wherein the data is stored in the first memory cell using the first power supply voltage based on the first memory cell being selected as a normal cell, and wherein the internal write operation is performed to store the count data in the first memory cell using the second power supply voltage based on the first memory cell being selected as a count cell from among the at least one count cell.

\* \* \* \* \*